(12) United States Patent
Boduch et al.

(10) Patent No.: US 10,284,932 B2
(45) Date of Patent: *May 7, 2019

(54) METHOD AND APPARATUS FOR OPTICAL NODE CONSTRUCTION USING SOFTWARE PROGRAMMABLE ROADMS

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/694,946

(22) Filed: Sep. 4, 2017

(65) Prior Publication Data

US 2017/0366291 A1    Dec. 21, 2017

Related U.S. Application Data

(63) Continuation-in-part of application No. 14/485,970, filed on Sep. 15, 2014, now Pat. No. 9,788,088.

(60) Provisional application No. 61/880,860, filed on Sep. 21, 2013.

(51) Int. Cl.
   *H04J 14/02*    (2006.01)
   *H04Q 11/00*    (2006.01)
   *H04B 10/294*   (2013.01)

(52) U.S. Cl.
   CPC ..... *H04Q 11/0005* (2013.01); *H04B 10/2941* (2013.01); *H04J 14/0204* (2013.01); *H04J 14/0205* (2013.01); *H04J 14/0206* (2013.01); *H04J 14/0212* (2013.01); *H04J 14/0217* (2013.01); *H04Q 2011/0009* (2013.01); *H04Q 2011/0015* (2013.01); *H04Q 2011/0016* (2013.01)

(58) Field of Classification Search
   CPC .. H04J 14/0209; H04J 14/021–14/0212; H04J 14/0215–14/022; H04Q 2011/0024; H04Q 2011/0009; H04Q 2011/0015
   See application file for complete search history.

(56) References Cited

U.S. PATENT DOCUMENTS

| | | | |
|---|---|---|---|
| 9,008,514 B2 | 4/2015 | Boduch et al. | |
| 9,276,695 B2 | 3/2016 | Boduch et al. | |
| 9,374,186 B1 | 6/2016 | Boduch et al. | |
| 9,667,374 B2 | 5/2017 | Boduch et al. | |
| 2006/0098981 A1* | 5/2006 | Miura | H04J 14/0209 398/45 |
| 2009/0226168 A1* | 9/2009 | Boduch | H01J 14/0204 398/48 |
| 2013/0195449 A1* | 8/2013 | Ghioni | H04J 14/0204 398/48 |
| 2013/0195451 A1* | 8/2013 | Ghioni | H04J 14/0212 398/50 |

(Continued)

*Primary Examiner* — Casey L Kretzer

(57) ABSTRACT

Example embodiments of the present invention relate to a software programmable reconfigurable optical add drop multiplexer (ROADM) comprising of a plurality of wavelength switches and a plurality of waveguide switches, wherein when the plurality of waveguide switches are set to a first switch configuration, the software programmable ROADM provides n degrees of an n-degree optical node, and wherein when the waveguide switches are set to a second switch configuration, the software programmable ROADM provides k degrees of an m-degree optical node.

18 Claims, 49 Drawing Sheets

(56) References Cited

U.S. PATENT DOCUMENTS

2013/0259474 A1* 10/2013 Ji ...................... H04J 14/0212
                                                            398/48

* cited by examiner

WAVELENGTH EQUALIZER

METHOD AND APPARATUS FOR OPTICAL NODE CONSTRUCTION USING SOFTWARE PROGRAMMABLE ROADMS

RELATED APPLICATION

This application is a continuation-in-part of U.S. application Ser. No. 14/485,970 filed Sep. 15, 2014, which claims the benefit of: U.S. Provisional Application No. 61/880,860, filed on Sep. 21, 2013.

The entire teachings of the above application are incorporated herein by reference.

BACKGROUND

As the bandwidth needs of end customers increases, larger amounts of optical bandwidth will need to be manipulated closer to the end customers. A new breed of optical processing equipment will be needed to provide high levels of optical bandwidth manipulation at the lower cost points demanded by the networks closest to the end customers. This new breed of optical processing equipment will require new levels of optical signal processing integration.

SUMMARY

A method and corresponding apparatus in an example embodiment of the present invention relates to providing a means of quickly creating application specific optical nodes using field programmable photonics (FPP) within software programmable Reconfigurable Optical Add Drop Multiplexers (ROADMs). The example embodiments include a light processing apparatus utilizing field programmable photonics and field programmable photonic devices, whose level of equipment redundancy matches the economics associated with the location of the apparatus within provider networks. Additionally, the example embodiments include a light processing apparatus utilizing application specific photonics and application specific photonic devices.

An optical signal processor is presented. The optical signal processor comprises: at least one wavelength equalizing array, a plurality of optical amplifying devices, and at least one field programmable photonic device. Within the optical signal processor, the plurality of optical amplifiers may comprise an optical amplifier array. Additionally, within the optical signal processor, the field programmable photonic device may comprise a plurality of optical coupler devices that are interconnected with optical switches. The optical coupler devices and the optical switches may be integrated together on a substrate. Additionally, the plurality of optical coupler devices may be interconnected to input and output ports with optical switches.

The optical switches within the field programmable photonic device are configurable using software running on a digital microprocessor residing on or external to the optical signal processor. By reconfiguring (i.e., programming) the optical switches, the functionality of the optical signal processor may be altered. This allows the optical signal processor to emulate the behaviors of many different types of Reconfigurable Optical Add Drop Multiplexers (ROADMs). Therefore, the optical signal processor may also be referred to as a software programmable Reconfigurable Optical Add Drop Multiplexers (ROADM), or simply as a software programmable ROADM.

An optical node is presented. The optical node comprises: at least one wavelength equalizing array, a plurality of optical amplifying devices, and at least one field programmable photonic device. The optical node may comprise at least two optical degrees. The at least one wavelength equalizing array may be used to select wavelengths for the at least two optical degrees, and to perform directionless steering for add/drop ports. Alternatively, the optical node may comprise at least three optical degrees. Alternatively, the optical node may comprise at least four optical degrees. The optical node may further comprise a plurality of directionless add/drop ports.

A ROADM circuit pack is presented. The ROADM circuit pack comprises: at least one wavelength equalizing array, a plurality of optical amplifying devices, and at least one field programmable photonic device.

An optical signal processor is presented. The optical signal processor comprises: at least one wavelength equalizing array, a plurality of optical amplifying devices, and at least one application specific photonic device. The application specific photonic device comprises a plurality of optical coupler devices. The plurality of optical coupler devices are integrated together on a substrate. The optical signal processor may comprise at least two optical degrees. Alternatively, the optical signal processor may comprise at least three optical degrees. Alternatively, the optical signal processor may comprise at least four optical degrees. The optical signal processor may further comprise a plurality of directionless add/drop ports.

Several software programmable ROADMs are presented. The software programmable ROADMs can be programmed to perform the operations of several different types of optical nodes. A single software programmable ROADM can be programmed to perform the functions of an optical node of a first size. Two identical software programmable ROADMs may be interconnected and programmed to perform the functions of an optical node of a second size, wherein the second size is larger than the first size.

A ROADM containing several passively interconnected wavelength selective switches is presented. A single ROADM of this type may be used to perform the functions of an optical node of a first size. Two identical such ROADMs may be interconnected to perform the functions of an optical node of a second size, wherein the second size is larger than the first size.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1A:
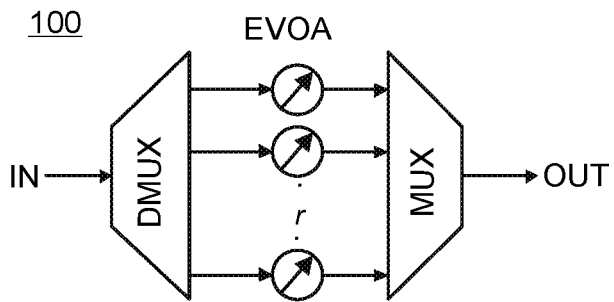
FIG. 1A is an illustration of a wavelength equalizer.

FIG. 1A is an illustration of a wavelength equalizer 100 consisting of; a wavelength de-multiplexer (DMUX) that is used to separate a composite Wavelength Division Multiplexed (WDM) signal into r number of individual wavelengths, a plurality of Electrical Variable Optical Attenuators (EVOAs) used to partially or fully attenuate the individual wavelengths, and a wavelength multiplexer (MUX) that is used to combine r number of individual wavelengths into a composite Wavelength Division Multiplexed (WDM) signal. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

Figure 1B:
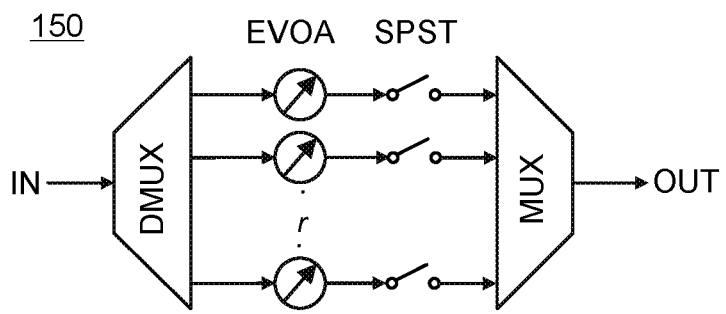
FIG. 1B is an illustration of a wavelength equalizer.

FIG. 1B shows a wavelength equalizer 150 that illustrates an alternative way of viewing the wavelength equalizer 100 of FIG. 1A. In FIG. 1B each EVOA for each wavelength connects to a single pole single throw (SPST) optical switch. Each SPST optical switch provides the ability to either forward a given wavelength to the optical multiplexer (MUX) or prevent the forwarding of the given wavelength to the optical multiplexer. Each EVOA then needs to only operate over a limited attenuation range—the range required to equalize the optical power level of a given wavelength to optical power levels of other wavelengths. Given the structure of 150, the wavelength equalizer 150 can be thought of as a wavelength switch, in that it is able to selectively switch individual wavelengths.

Figure 2:
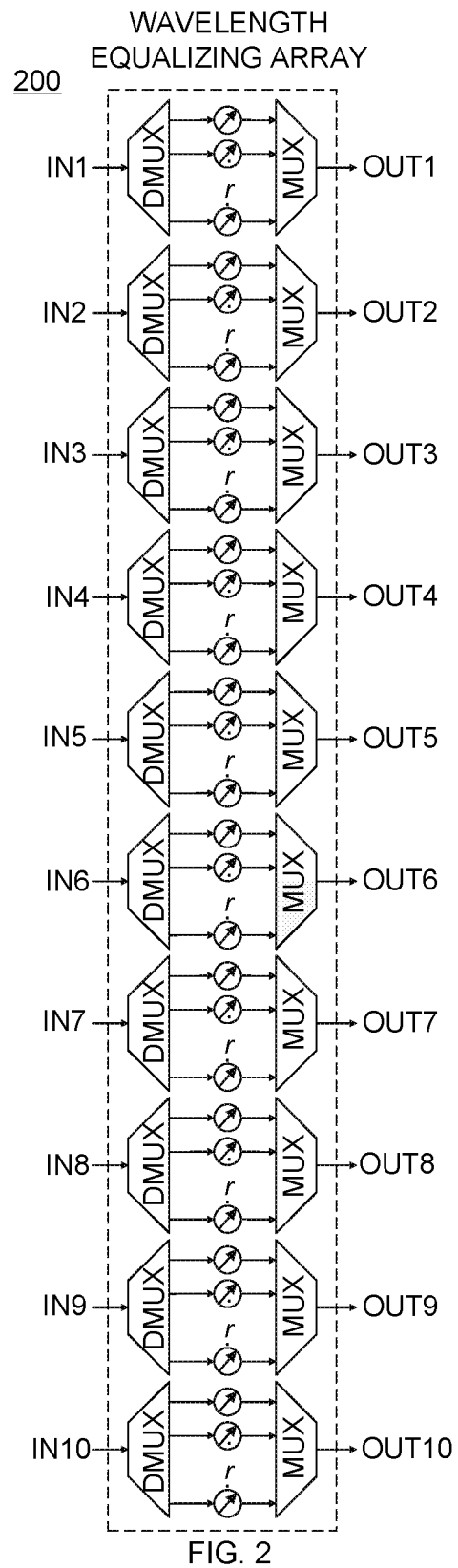
FIG. 2 is an illustration of a wavelength equalizing array containing ten wavelength equalizers.

FIG. 2 is an illustration of a wavelength equalizing array 200 contained within a single device. The wavelength equalizing array contains ten wavelength equalizers that may be of the type 100 illustrated in FIG. 1A or of the type 150 illustrated in FIG. 1B.

The wavelength equalizing array 200 contains ten optical inputs (IN1-IN10) that are attached to the inputs of the wavelength equalizers, and ten optical outputs (OUT1-OUT10) that are attached to the outputs of the wavelength equalizers. The electronic circuitry (not shown) used to control the EVOAs may reside within the wavelength equalizing array device, or may reside external to the wavelength equalizing array device.

Figure 3:
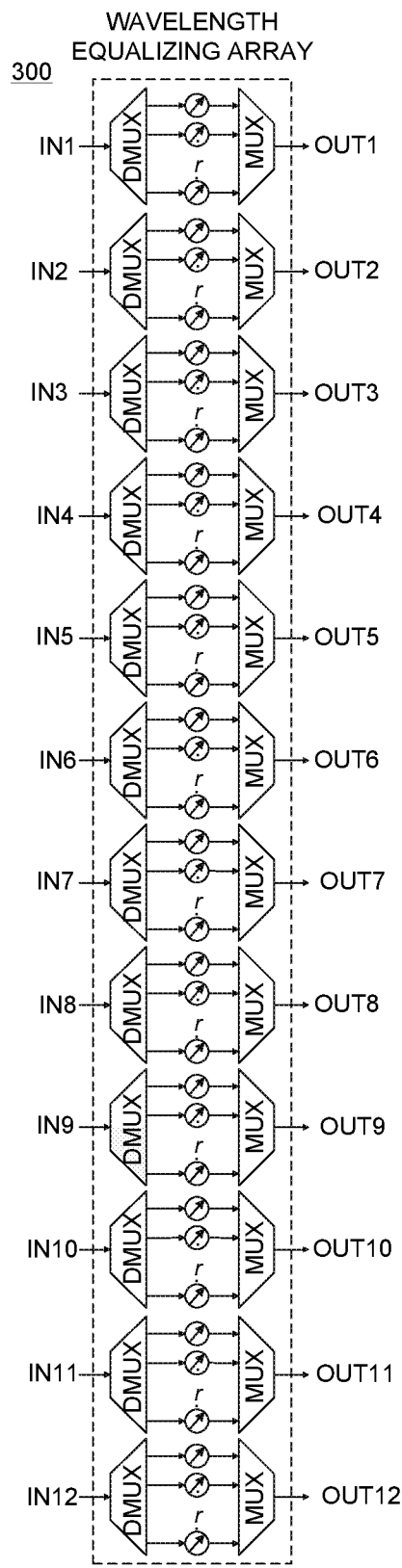
FIG. 3 is an illustration of a wavelength equalizing array containing twelve wavelength equalizers.

FIG. 3 is an illustration of a wavelength equalizing array 300 containing twelve wavelength equalizers that may be of the type 100 illustrated in FIG. 1A or of the type 150 illustrated in FIG. 1B. The array may be contained within a single physical device.

Although wavelength equalizing arrays 200 and 300 illustrate arrays with ten and twelve wavelength equalizers respectively, in general there is no limit to the number of wavelength equalizers that can be placed within a single device. Therefore, arrays with fifteen, sixteen, twenty-four, or thirty-two wavelength equalizers may be possible.

Multiple different technologies may be used to implement the wavelength equalizing arrays 200 and 300, including Planer Lightwave Circuit (PLC) technology and various free-space optical technologies such as Liquid Crystal on Silicon (LCoS). The Wavelength Processing Array (WPA-12) from Santec Corporation is an example of a commercially available wavelength equalizing array containing twelve wavelength equalizers. The wavelength equalizing arrays 200 and 300 may be implemented by placing PLC based EVOAs and multiplexers (Arrayed Waveguide Gratings (AWG)) on a single substrate.

Figure 4:
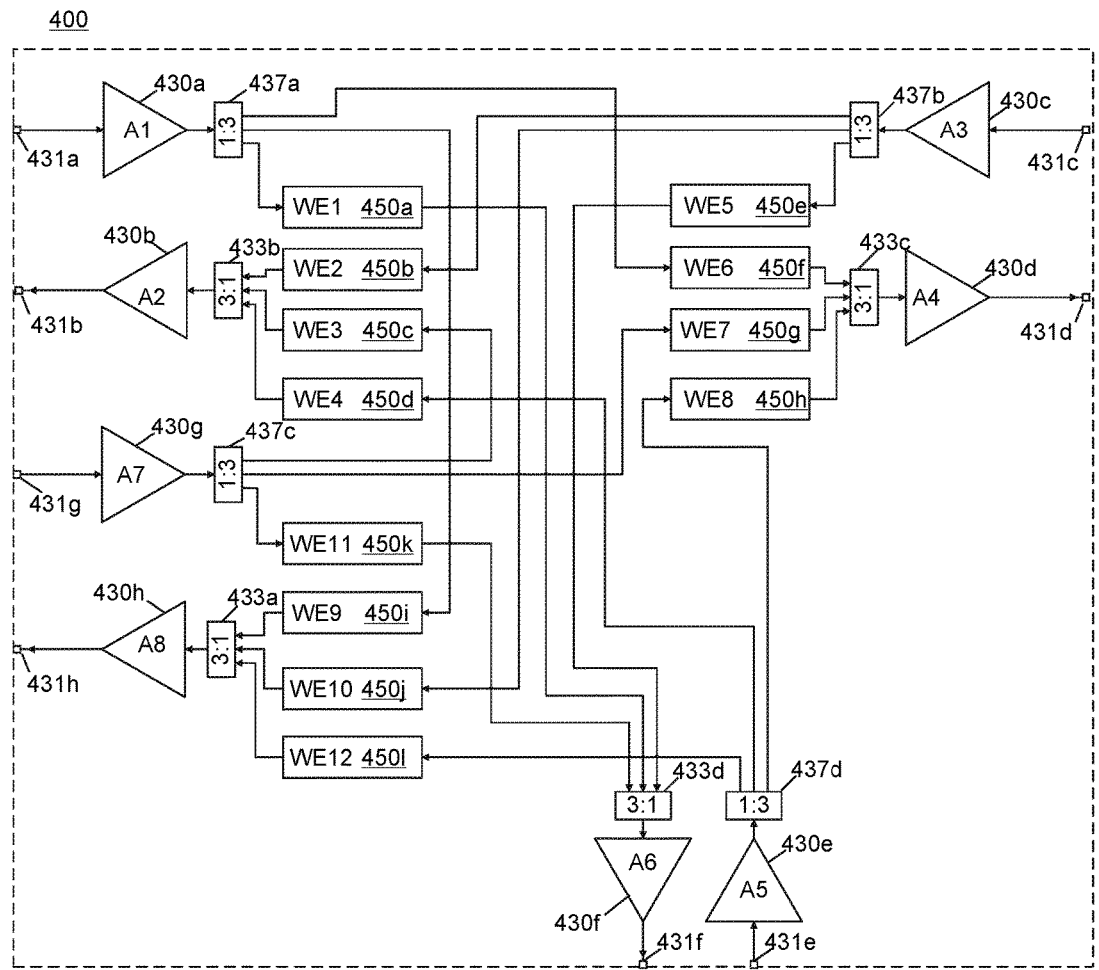
FIG. 4 is an illustration of an optical signal processor used to create a three-degree optical node.

FIG. 4 shows an optical signal processor (OSP) 400 consisting of eight optical amplifiers 430a-h, and twelve wavelength equalizers 450a-l that may be contained within a single wavelength equalizing array 300. The wavelength equalizing array is a wavelength processing device. A wavelength processing device is defined as any optical device that optically operates on individual wavelengths of a WDM signal. For example, the wavelength equalizing array can attenuate and block individual wavelengths within a plurality of multiplexed wavelengths. Each of the wavelength equalizers 450a-l is also a wavelength switching device, as each wavelength equalizers 450a-l is operable to switch induvial wavelengths, as depicted in FIG. 1B.

The optical signal processor 400 receives four WDM signals; one from each of the four interfaces 431a, 431c, 431e, and 431g. These four signals are then amplified by optical amplifiers 430a, 430c, 430e, and 430g. Following amplification, each of the four signals is broadcasted to three different wavelength equalizers 450a-l using 1:3 couplers 437a-d. The wavelength equalizers 450a-l can be configured to attenuate each individual wavelength by some programmable amount. Alternatively each of the wavelength equalizers 450a-l can be configured to substantially block the individual wavelengths that pass through it. After passing through the wavelength equalizers, WDM signals are combined into groups of three using optical couplers 433a-d. The combined WDM signals are then amplified using optical amplifiers 430b, 430d, 430f, and 430h, before being outputted to optical interfaces 431b, 431d, 431f, and 431h.

The optical signal processor (OSP) 400 can be used to construct a three or four-degree WDM optical node. If the optical circuitry associated with the optical signal processor 400 is wholly placed on a single circuit pack, the circuit pack would contain a fully integrated three or four-degree ROADM. The ROADM circuit pack could serve as a four-degree ROADM with no add/drop ports by using each input/output port pair 431a-b, 431c-d, 431e-f, and 431g-h as an optical degree. Alternatively, if combined with some form of wavelength multiplexing/demultiplexing circuitry, the ROADM circuit pack could serve as a three-degree ROADM. For this case, input/output interface 431e-f may serve as the port used to interface to the wavelength multiplexing/demultiplexing circuitry. In order to complete the three-degree node, optical transponders would be attached to add and drop ports of the wavelength multiplexing/demultiplexing circuitry.

Alternatively, any of the other three input/output interfaces 431a-b, 431c-d, 431g-h may serve as the interface to the wavelength multiplexing/demultiplexing circuitry, as each input/output interface is identical with respect to the function of and interconnection to all other input/output interfaces.

When operating as a three or four degree ROADM, the wavelength equalizers are programmed to pass and/or block wavelengths in order to pass or block wavelengths between input/output port pairs. For example, a wavelength arriving at input port 431a could be passed to output port 431d by programming wavelength equalizer 450f to pass the wavelength. In a similar manner, a wavelength arriving at input port 431g could be blocked from output port 431b by programming wavelength equalizer 450c to block the wavelength.

If a circuit pack containing wavelength multiplexing/demultiplexing circuitry is attached to input/output interface 431e-f, then that circuit pack is able to add and drop wavelengths to and from any of the three other input/output interfaces (431a-b, 431c-d, and 431g-h). Because of this functionality, it can be said that input/output interface 431e-f provides directionless add/drop ports for the other three interfaces (i.e., the add/drop ports are not dedicated to a sole degree direction).

Figure 5A:
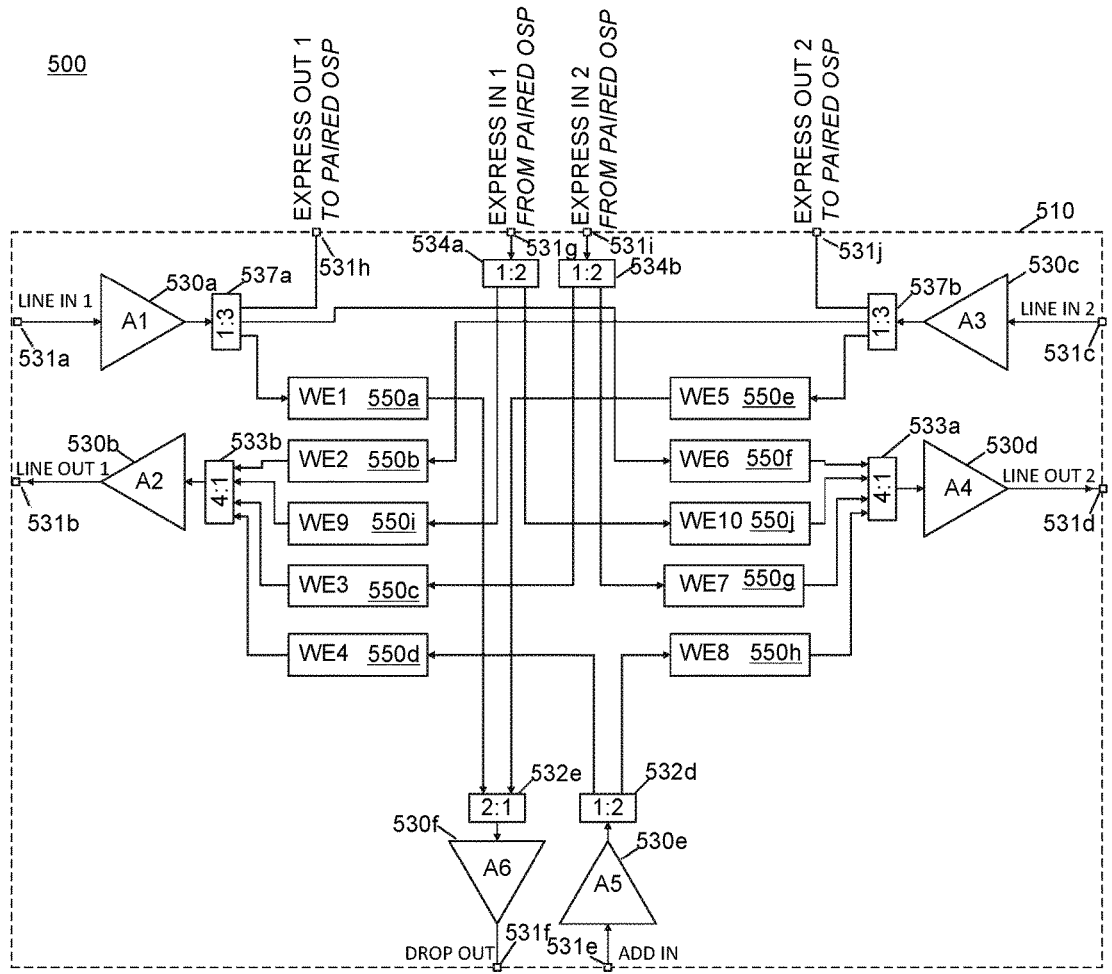
FIG. 5A is an illustration of an optical signal processor used to create a four-degree optical node.

FIG. 5A shows an optical signal processor (OSP) 510 consisting of six optical amplifiers 530a-f, and ten wavelength equalizers 550a-h that may be contained within a single wavelength equalizing array 200. The wavelength equalizing array is a wavelength processing device. A wavelength processing device is defined as any optical device that optically operates on individual wavelengths of a WDM signal. The optical signal processor 510 receives three WDM signals; one from each of the three interfaces 531a, 531c, and 531e. These three signals are then amplified by optical amplifiers 530a, 530c, and 530e. Following amplification, each of the three signals is broadcasted to two different wavelength equalizers 550a/550f, 550b/550e, and 550d/550h using couplers 537a, 537b, and 532d. In addition, the WDM signals on interfaces 531a and 531c are broadcasted to the interfaces 531h and 531j respectively. Also, the WDM signals on input interfaces 531g and 531i are broadcasted to wavelength equalizers 550*i*/550*j* and 550*c*/550*g* respectively using couplers 534*a* and 534*b*. The wavelength equalizers 550*a-h* can be configured to attenuate each individual wavelength by some programmable amount. Alternatively each of the wavelength equalizers 550*a-h* can be configured to substantially block the individual wavelengths that pass through it. After passing through the wavelength equalizers, WDM signals are combined into two groups of four using optical couplers 533*a-b*, and one group of two using optical coupler 532*e*. The combined WDM signals are then amplified using optical amplifiers 530*b*, 530*d*, and 530*f*, before being outputted to optical interfaces 531*b*, 531*d*, and 531*f*.

Figure 5B:
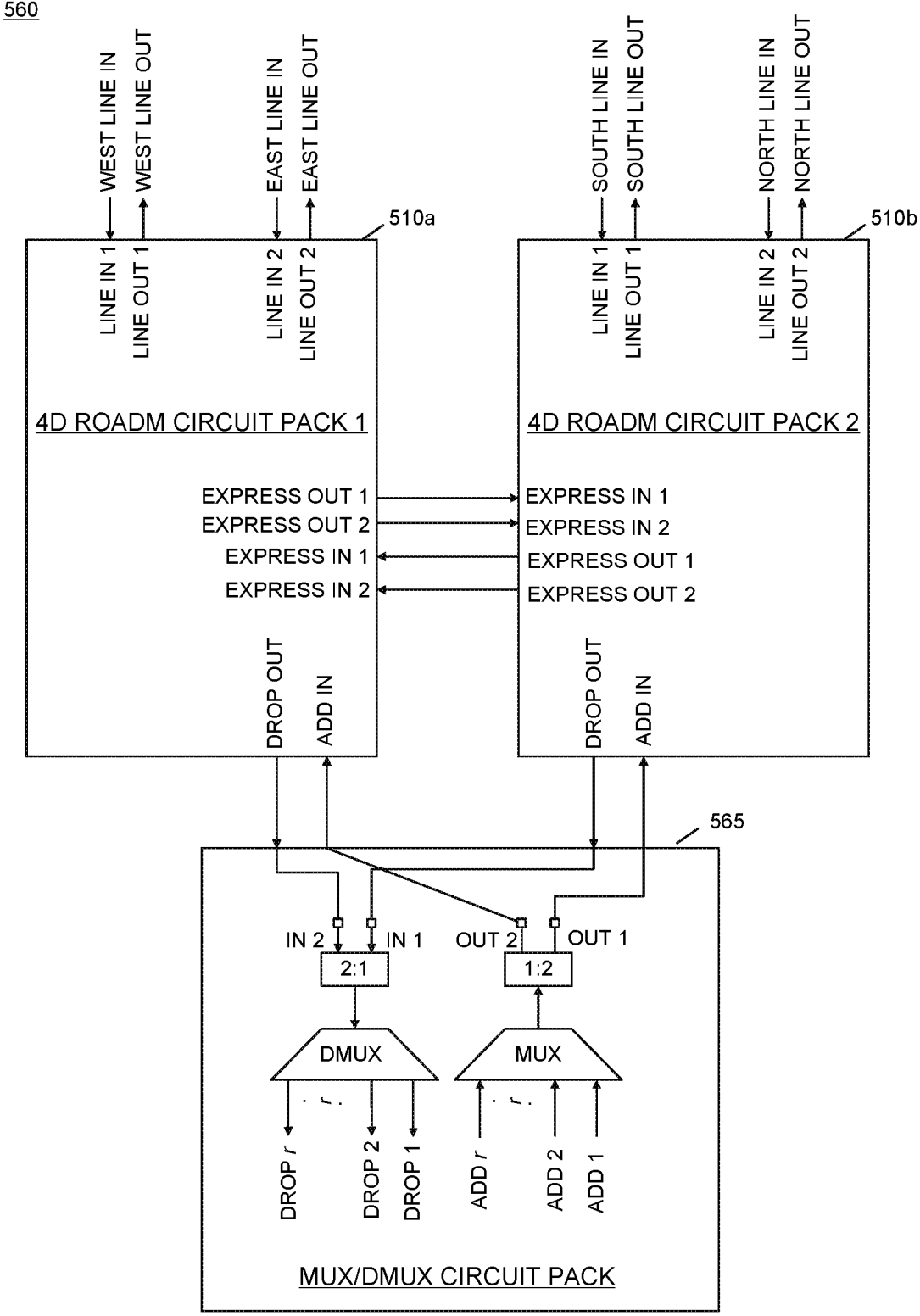
FIG. 5B is an illustration of a single multiplexing/demultiplexing circuit pack attached to two four-degree ROADM circuit packs.
Figure 5C:
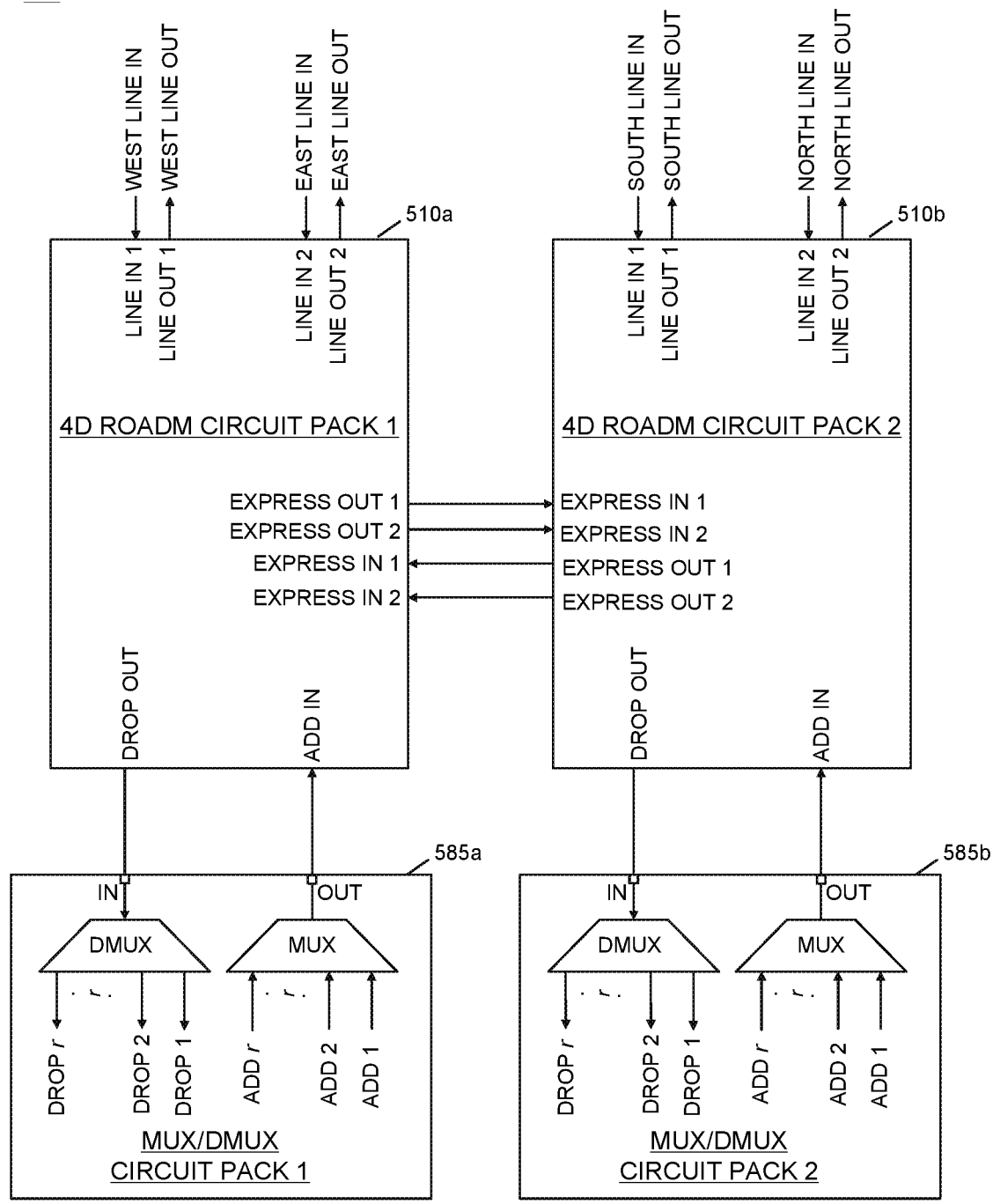
FIG. 5C is an illustration of two multiplexing/de-multiplexing circuit packs attached to two four-degree ROADM circuit packs.

The optical signal processor (OSP) 510 can be used to construct a two or four degree WDM optical node. If the optical circuitry associated with the optical signal processor 510 is wholly placed on a single circuit pack, the circuit pack would contain a fully integrated two degree ROADM that can be expanded to support a four degree node if two such ROADMs are paired. If combined with some form of wavelength multiplexing/demultiplexing circuitry, the ROADM circuit pack could serve as a two degree ROADM. For this case, input/output interface 531*e-f* may serve as the port used to interface to the wavelength multiplexing/demultiplexing circuitry. In order to complete the two degree node, optical transponders would be attached to add and drop ports of the wavelength multiplexing/demultiplexing circuitry. If two of the ROADM circuit packs are paired, by optically connecting Express Out 1 and Express Out 2 on the first ROADM circuit pack to Express In 1 and Express In 2 on the second ROADM circuit pack, and vice versa, a four degree node is formed. For the four degree case, either a single set of multiplexing/demultiplexing circuitry 565 could be shared between the two ROADM circuit packs 560 (FIG. 5B), or each ROADM circuit pack could have its own dedicated multiplexing/demultiplexing circuitry 580 (FIG. 5C). In four degree node 560 and node 580, ports Line In 1 and Line Out 1 may be interfaces 531*a* and 531*b* respectively, and ports Line In 2 and Line Out 2 may be interfaces 531*c* and 531*d* respectively, while the ports Add In and Drop Out may be the interfaces 531*e* and 531*f* respectively. In 560, all the add/drop interfaces are able to send and receive from any of the four line interfaces, and therefore are considered directionless add/drop ports. In 580, the add/drop ports can only send and receive wavelengths to and from the two line interfaces that are associated with the ROADM circuit pack that they are attached to, and therefore, the add/drop ports are said to be partially directionless add/drop ports.

If in 580 the ROADM circuit pack 510*a* is used in a two degree node application without a paired ROADM 510*b*, then the add/drop ports of the multiplexing/demultiplexing circuit pack 585*a* are (fully) directionless with respect to the two degree node. The wavelength equalizing array on the ROADM circuit pack 510*a* is used to both select wavelengths for each degree, and to perform directionless steering for the add/drop ports of each degree.

When operating as a two or four degree ROADM, the wavelength equalizers are programmed to pass and/or block wavelengths in order to pass or block wavelengths between input/output port pairs. For example, a wavelength arriving at input port 531*a* could be passed to output port 531*d* by programming wavelength equalizer 550*f* to pass the wavelength. In a similar manner, a wavelength arriving at input port 531*c* could be blocked from output port 531*b* by programming wavelength equalizer 550*b* to block the wavelength.

In order to either limit the number of supported circuit packs or in order to simplify the manufacturing process, field configurable or field programmable photonics can be introduced.

Figure 6:
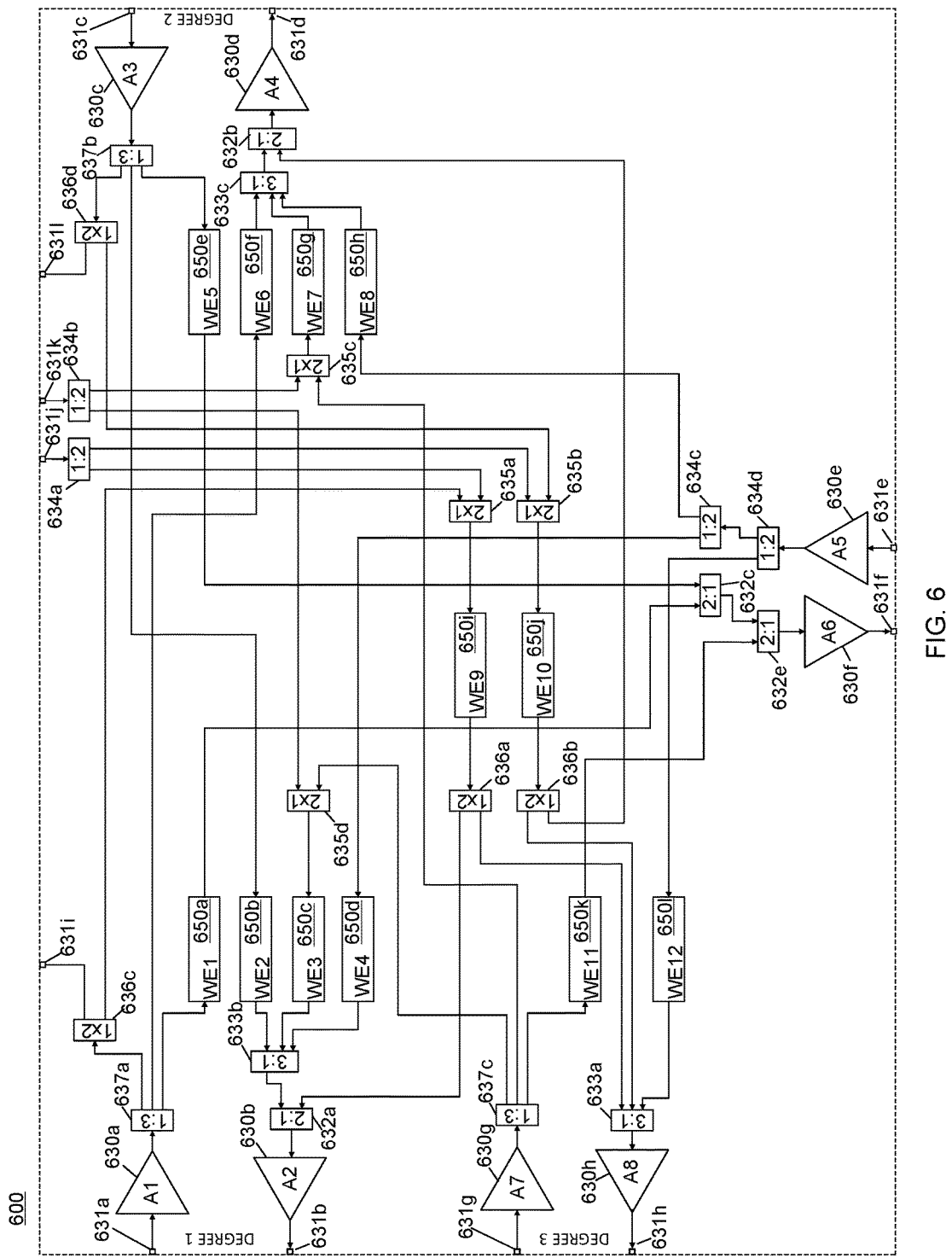
FIG. 6 is an illustration of a software programmable ROADM used to create a three or four degree optical node.

FIG. 6 shows an optical signal processor 600 that can perform the function of either optical signal processor 400 or optical signal processor 510. The dual functionality is enabled by the use of a set of 1 by 2 (636*a-d*) and 2 by 1 (635*a-d*) Single Pole Double Throw (SPDT) optical switches. Each of the optical switches 636*a-d* are broadband optical switches, meaning that each switch either forwards all the wavelengths entering the pole terminal of the switch to the first throw terminal of the switch (and forwards no wavelengths to the second throw terminal of the switch), or forwards all the wavelengths entering the pole terminal of the switch to the second throw terminal of the switch (and forwards no wavelengths to the first throw terminal of the switch). For such a switch, there is no ability to selectively forward some number of wavelengths to the first throw terminal while simultaneously forwarding some number of wavelengths to the second throw terminal—its instead designed to forward all the incoming wavelengths to a single throw terminal. Similarly, each of the optical switches 635*a-d* are broadband optical switches, meaning that all the wavelengths exiting the pole terminal of a switch are received from the first throw terminal of the switch (and no wavelengths are received from the second throw terminal of the switch), or all the wavelengths exiting the pole terminal of the switch are received from the second throw terminal of the switch (and no wavelengths are received from the first throw terminal of the switch). For such a switch, there is no ability to selectively forward some number of wavelengths from the first throw terminal while simultaneously forwarding some number of wavelengths from the second throw terminal—its instead designed to forward all the outgoing wavelengths from a single throw terminal.

In addition to the broadband switches, some of the optical couplers may ideally be replaced with variable coupling ratio optical couplers (i.e., variable optical couplers, or VC). A common wavelength equalizing array containing twelve wavelength equalizers 300 can be used to support both functions (400, 510). An optical amplifier array containing eight amplifiers can be used to support both optical signal processor functions 400 and 510 within 600. Alternatively, if the optical signal processor is customized during manufacturing, two different optical amplifier arrays could be used, or a plurality of discrete pluggable amplifier sets could be used (one set for each pair of input/output amplifiers). Yet another alternative would be to place the optical signal processor 600 on a circuit pack with a front panel that contained slots to populate pairs of input/output amplifiers. This would easily allow an end user to populate the amplifier pair 630*g-h* only when operating the optical signal processor as a three-degree ROADM. This arrangement would also allow an end user to populate input amplifiers 630*a*, 630*c*, and 630*g* with different gain ranges in order to more efficiently accommodate optical spans of varying length.

In the optical signal processor 600, the three degree function 400 can be programmed by programming optical switch 636*c* to forward its inputted wavelengths to optical switch 635*a*, programming optical switch 636*d* to direct its inputted wavelengths to optical switch 635*b*, programming optical switches 636*a* and 636*b* to direct their inputted wavelengths to optical coupler 633*a*, programming optical switches 635*c* and 635*d* to forward the wavelengths from optical coupler 637*c*, programming optical switch 635*a* to forward wavelengths from optical coupler 636*c*, and programming optical switch 635b to forward wavelengths from optical coupler 636d. In addition, ideally, optical couplers 632a and 632b should be variable optical couplers wherein in the 400 application all the light exiting them should originate from optical couplers 633b and 633c respectively. In addition, ideally, optical coupler 632a and 632b should be variable optical couplers wherein in the 510 application one quarter (¼) of the light exiting couplers 632a and 632b respectively should come from optical switches 636a and 636b respectively. Using other variable optical couplers in place of fixed coupling ratio optical couplers may also further optimize the application for the lowest insertion losses through various optical paths.

In optical signal processor 600, the four degree function 510 can be programmed using software by programming optical switch 636c to direct its inputted wavelengths to optical interface 631i, programming optical switch 636d to direct its inputted wavelengths to optical interface 631l, programming optical switches 636a and 636b to direct their inputted wavelengths to optical couplers 632a and 632b respectively, programming optical switches 635c and 635d to forward wavelengths from optical coupler 634b, and programming optical switches 635a and 635b to forward wavelengths from optical coupler 634a. Using other variable optical couplers in place of fixed coupling ratio optical couplers may also further optimize the application for the lowest insertion losses through various optical paths.

From the diagram in FIG. 6, it can be seen that wavelength equalizers 650k and 650l are used only for the 400 function, and in addition optical amplifiers 630g and 630h—and their associated external interfaces 631g and 631h—are used only for the 400 function. Lastly, external interfaces 631i, 631j, 631k, and 631l are only used for the 510 function. Because the optical signal processor 600 can be software programmed to perform two different ROADM functions (i.e., applications), the optical signal processor 600 may be referred to as a software programmable ROADM.

In the optical signal processor (software programmable ROADM) 600, the broadband optical switches 636a-d, 635a-d each switch (i.e. direct) wavelength division multiplexed signals, while the wavelength equalizers 650a-h each switch individual wavelengths within the wavelength division multiplexed signals.

The optical signal processor (software programmable ROADM) 600 comprises a field programmable photonic device comprising a plurality of optical switches 635a-d, each having at least one optical output and a first optical input and at least a second optical input, and used to direct a first wavelength division multiplexed signal from the first optical input to the at least one optical output when programmed for a first function, and used to direct a second wavelength division multiplexed signal from the at least a second optical input to the at least one optical output when programmed for a second function.

The optical signal processor (software programmable ROADM) 600 further comprises a first wavelength equalizer 650f, having only one optical input and only one optical output, and used to pass and block individual wavelengths from a first optical degree to a second optical degree when the plurality of optical switches are programmed for the first function and the second function.

The optical signal processor (software programmable ROADM) 600 further comprises a second wavelength equalizer 650b, having only one optical input and only one optical output, and used to pass and block individual wavelengths from the second optical degree to the first optical degree when the plurality of optical switches are programmed for the first function and the second function.

The optical signal processor (software programmable ROADM) 600 further comprises a third wavelength equalizer 650c, having only one optical input and only one optical output, and used to pass and block individual wavelengths from a third optical degree to the first optical degree when the plurality of optical switches are programmed for the first function, and used to pass and block individual wavelengths from an express interface 631k to the first optical degree when the plurality of optical switches are programmed for the second function.

The optical signal processor (software programmable ROADM) 600 further comprises a fourth wavelength equalizer 650g, having only one optical input and only one optical output, and used to pass and block individual wavelengths from the third optical degree to the second optical degree when the plurality of optical switches are programmed for the first function, and used to pass and block individual wavelengths from the express interface 631k to the second optical degree when the plurality of optical switches are programmed for the second function.

The field programmable photonic device within the optical signal processor (software programmable ROADM) 600 further comprises a second plurality of optical switches 636a-d, each having at least one optical input and a first optical output and at least a second optical output, and used to direct an inputted wavelength division multiplexed signal from the at least one optical input to the first optical output when programmed for the first function, and used to direct the inputted wavelength division multiplexed signal from the at least one optical input to the at least a second optical output when programmed for the second function. When programmed for the first function a first optical switch 636a of the second plurality of optical switches directs wavelengths from a fifth wavelength equalizer 650i to the third optical degree, and a second optical switch 636b of the second plurality of optical switches directs wavelengths from a sixth wavelength equalizer 650j to the third optical degree, and wherein when programmed for the second function the first optical switch 636a of the second plurality of optical switches directs wavelengths from the fifth wavelength equalizer 650i to the first optical degree, and the second optical switch 636b of the second plurality of optical switches directs wavelengths from the sixth wavelength equalizer 650j to the second optical degree. When programmed for the second function, a third optical switch 636c of the second plurality of optical switches directs wavelengths to the express interface 631i, and wherein when programmed for the first function, the third optical switch 636c of the second plurality of optical switches directs wavelengths away from the express interface 631i.

Within the optical signal processor (software programmable ROADM) 600, when programmed for the first function a first optical switch 635a of the plurality of optical switches directs wavelengths from the first optical degree to the fifth wavelength equalizer 650i, and wherein when programmed for the second function the first optical switch 635a of the plurality of optical switches directs wavelengths from a second express interface 631j to the fifth wavelength equalizer 650i.

Within the optical signal processor (software programmable ROADM) 600, when programmed for the first function a second optical switch 635b of the plurality of optical switches directs wavelengths from the second optical degree to the sixth wavelength equalizer 650j, and wherein when programmed for the second function the second optical switch 635*b* of the plurality of optical switches directs wavelengths from the second express interface 631*j* to the sixth wavelength equalizer 650*j*.

The optical signal processor (software programmable ROADM) 600 further comprises a wavelength equalizing array comprising the first wavelength equalizer 650*f*, the second wavelength equalizer 650*b*, the third wavelength equalizer 650*c* and the fourth wavelength equalizer 650*g*.

The optical signal processor (software programmable ROADM) 600 can further be described as comprising a plurality of optical inputs 631*a*, 631*c*, 631*j*, 631*k* a plurality of optical outputs 631*b*, 631*d*, 631*h* a plurality of wavelength equalizers 650*i-j* each comprising: a single optical input, a wavelength de-multiplexer connected to the single optical input, a plurality of variable optical attenuators connected to the wavelength de-multiplexer, a wavelength multiplexer connected to the plurality of variable optical attenuators, and a single optical output connected to the wavelength multiplexer, and a field programmable photonic device residing external to the plurality of wavelength equalizers. The field programmable photonic device may comprise: a first plurality of optical switches 635*a-b*, each having at least one optical output and a first optical input and at least a second optical input, and used to switch a first wavelength division multiplexed signal from the first optical input to the at least one optical output when programmed for a first function, and used to switch a second wavelength division multiplexed signal from the at least a second optical input to the at least one optical output when programmed for a second function, and a second plurality of optical switches 636*a-b* each having at least one optical input and a first optical output and at least a second optical output, and used to switch a wavelength division multiplexed signal from the at least one optical input to the first optical output when programmed for the first function, and used to switch the wavelength division multiplexed signal from the at least one optical input to the at least a second optical output when programmed for the second function. Within the optical signal processor (software programmable ROADM) 600, the first plurality of optical switches 635*a-b* are used to switch wavelength division multiplexed signals from the plurality of optical inputs 631*a*, 631*c*, 631*j*, 631*k* to the plurality of wavelength equalizers 650*i-j*, and wherein the second plurality of optical switches 636*a-b* are used to switch wavelength division multiplexed signals from the plurality of wavelength equalizers 650*i-j* to the plurality of optical outputs 631*b*, 631*d*, 631*h*. The plurality of wavelength equalizers 650*i-j* are used to pass and block individual wavelengths within wavelength division multiplexed signals from the first plurality of optical switches.

The optical signal processor (software programmable ROADM) 600 can further be described as comprising a wavelength equalizing array, wherein the wavelength equalizing array comprises a plurality of wavelength equalizers each comprising: a single optical input, a wavelength de-multiplexer connected to the single optical input, a plurality of variable optical attenuators connected to the wavelength de-multiplexer, a wavelength multiplexer connected to the plurality of variable optical attenuators, and a single optical output connected to the wavelength multiplexer. Additionally, the optical signal processor (software programmable ROADM) 600 further comprises a plurality of optical amplifying devices and at least one field programmable photonic device residing external to the wavelength equalizing array and comprising a plurality of optical switches that are programmable to perform a first function and a second function. When the plurality of optical switches are programmed to perform the first function, the plurality of wavelength equalizers pass and block individual wavelengths for three degrees of a three degree optical node, and wherein when the plurality of optical switches are programmed to perform the second function, the plurality of wavelength equalizers pass and block individual wavelengths for two degrees of a four degree optical node.

The plurality of optical switches comprises a first plurality of optical switches having at least one optical output and a first optical input and at least a second optical input and operational to direct a first inputted wavelength division multiplexed signal from the first optical input to the at least one optical output when programmed for the first function and operational to direct a second inputted wavelength division multiplexed signal from the at least a second optical input to the at least one optical output when programmed for the second function, and a second plurality of optical switches having at least one optical input and a first optical output and at least a second optical output and operational to direct an inputted wavelength division multiplexed signal from the at least one optical input to the first optical output when programmed for the first function and operational to direct the inputted wavelength division multiplexed signal from the at least one optical input to the at least a second optical output when programmed for the second function.

The optical signal processor (software programmable ROADM) 600 further comprises a plurality of optical inputs and a plurality of optical outputs, wherein the first plurality of optical switches are used to direct wavelength division multiplexed signals from the plurality of optical inputs to a portion of the plurality of wavelength equalizers, and wherein the portion of the plurality of wavelength equalizers are used to pass and block individual wavelengths within wavelength division multiplexed signals from the first plurality of optical switches, and wherein a number of the second plurality of optical switches are used to direct wavelength division multiplexed signals from the portion of the plurality of wavelength equalizers to the plurality of optical outputs.

Within the optical signal processor (software programmable ROADM) 600, the field programmable photonic device further comprises at least one optical coupler, used to optically combine wavelength division multiplexed signals from at least two wavelength equalizers of the plurality of wavelength equalizers. Furthermore, the field programmable photonic device further comprises at least one optical coupler, used to distribute a wavelength division multiplexed signal to a first wavelength equalizer of the plurality of wavelength equalizers and to a second wavelength equalizer of the plurality of wavelength equalizers.

Furthermore, the single optical input of each wavelength equalizer is used to input an input wavelength division multiplexed signal, and wherein the single optical output of each wavelength equalizer is used to output an output wavelength division multiplexed signal, and wherein the wavelength de-multiplexer within each wavelength equalizer is used to separate the input wavelength division multiplexed signal into a plurality of individual wavelengths, and wherein the plurality of variable optical attenuators within each wavelength equalizer are used to attenuate the plurality of individual wavelengths by some programmable amount, and wherein the wavelength multiplexer within each wavelength equalizer is used to combine the plurality of individual wavelengths from the plurality of variable optical attenuators into the output wavelength division multiplexed signal from each wavelength equalizer.

The optical signal processor (software programmable ROADM) 600 can further be described as comprising a first optical interface, a second optical interface, a third optical interface, a fourth optical interface, and a wavelength equalizing array, wherein the wavelength equalizing array comprises a plurality of wavelength equalizers each comprising: one optical input, a wavelength de-multiplexer connected to the one optical input, a plurality of variable optical attenuators connected to the wavelength de-multiplexer, a wavelength multiplexer connected to the plurality of variable optical attenuators, and one optical output connected to the wavelength multiplexer. The optical signal processor (software programmable ROADM) 600 further comprises a field programmable photonic device residing external to the wavelength equalizing array and comprising a plurality of optical switches that are programmable to perform a first function and a second function. When the plurality of optical switches are programmed to perform the first function, the plurality of wavelength equalizers pass and block individual wavelengths from the third optical interface to the first optical interface and from the third optical interface to the second optical interface, and the plurality of wavelength equalizers do not pass and block individual wavelengths from the fourth optical interface to the first optical interface and from the fourth optical interface to the second optical interface. Conversely, when the plurality of optical switches are programmed to perform the second function, the plurality of wavelength equalizers pass and block individual wavelengths from the fourth optical interface to the first optical interface and from the fourth optical interface to the second optical interface, and the plurality of wavelength equalizers do not pass and block individual wavelengths from the third optical interface to the first optical interface and from the third optical interface to the second optical interface.

Within the optical signal processor (software programmable ROADM) 600, the plurality of optical switches comprises of a first plurality of optical switches and a second plurality of optical switches. The first plurality of optical switches each have at least one switch output and a first switch input and at least a second switch input, wherein when programmed to perform the first function, light received from the first switch input is directed to the at least one switch output, and wherein when programmed to perform the second function, light received from the at least a second switch input is directed to the at least one switch output. The second plurality of optical switches each have at least one switch input and a first switch output and at least a second switch output, wherein when programmed to perform the first function, light received from the at least one switch input is directed to the first switch output, and wherein when programmed to perform the second function, light received from the at least one switch input is directed to the at least a second switch output.

The first optical interface of the optical signal processor (software programmable ROADM) 600 may be a first optical degree of an optical node, and the second optical interface may be a second optical degree of the optical node, and the third optical interface may be a third optical degree of the optical node, and the fourth optical interface may be a first express interface.

The optical signal processor (software programmable ROADM) 600 may further comprise a fifth optical interface, wherein when the plurality of optical switches are programmed to perform the first function, the plurality of wavelength equalizers do not pass and block individual wavelengths from the fifth optical interface to the first optical interface and from the fifth optical interface to the second optical interface, and wherein when the plurality of optical switches are programmed to perform the second function, the plurality of wavelength equalizers pass and block individual wavelengths from the fifth optical interface to the first optical interface and from the fifth optical interface to the second optical interface.

Within the optical signal processor (software programmable ROADM) 600, the first optical interface may be a first optical degree of an optical node, and the second optical interface may be a second optical degree of the optical node, and the third optical interface may be a third optical degree of the optical node, and the fourth optical interface may be a first express interface, and the fifth optical interface may be a second express interface.

Within the optical signal processor (software programmable ROADM) 600, when the plurality of optical switches are programmed to perform the first function, the plurality of wavelength equalizers pass and block individual wavelengths between the first optical interface and the second optical interface, and when the plurality of optical switches are programmed to perform the second function, the plurality of wavelength equalizers pass and block individual wavelengths between the first optical interface and the second optical interface.

Figure 7:
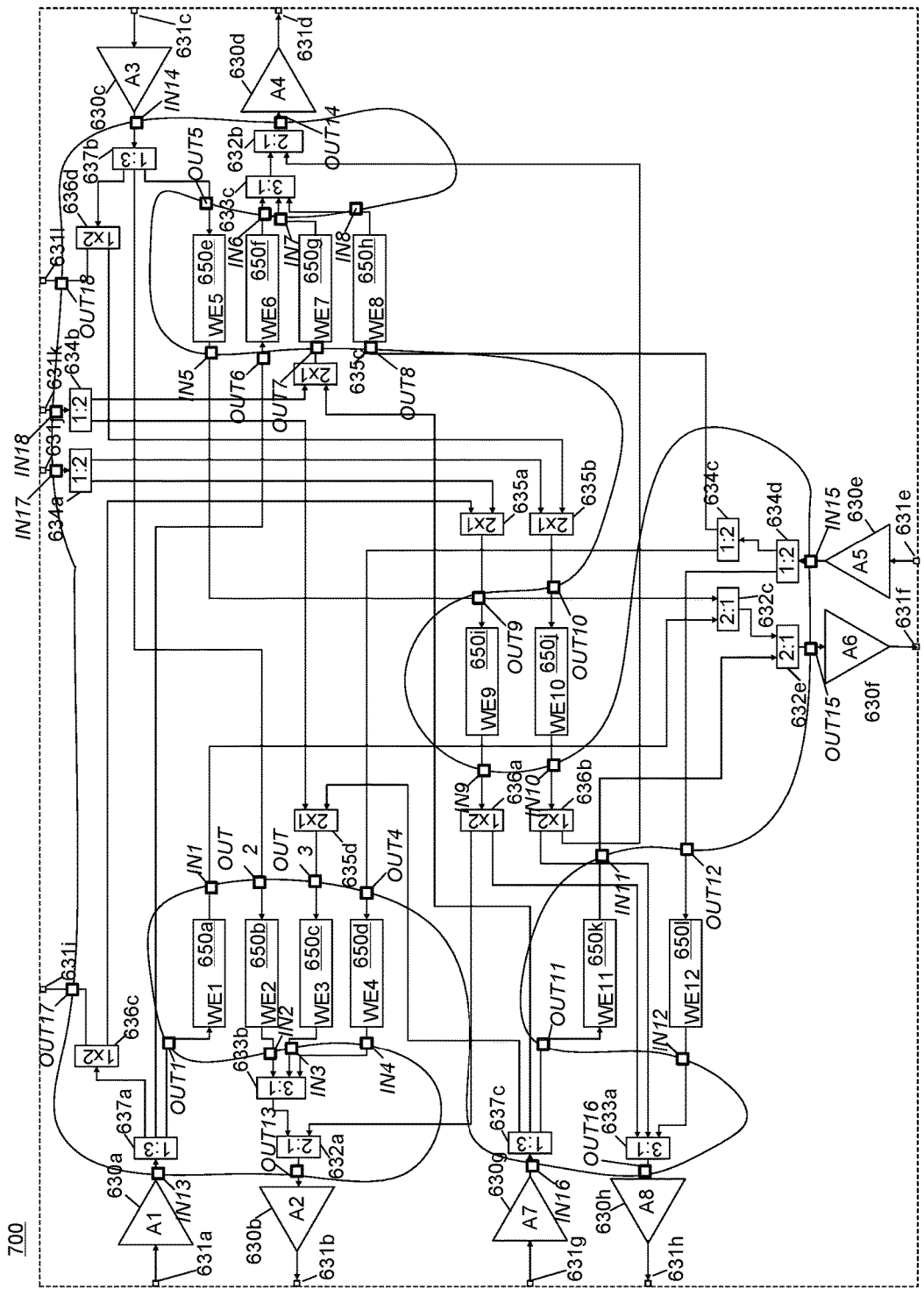
FIG. 7 is a detailed illustration of a software programmable ROADM used to create a three or four-degree optical node, with field programmable photonics.

FIG. 7 illustrates the optical elements of 600 that would be placed in a field programmable photonic device. As can be seen in 700, the elements that would be placed in the field programmable photonic device have been circled, and only the optical amplifiers and wavelength equalizers are placed outside of the field programmable photonic device. Additionally PLC based wavelength equalizers may be placed within the field programmable photonic device if this makes economic sense in the future. The inputs and outputs of the field programmable photonic device have been labeled as INi and OUTi in FIG. 7. As can be seen, there are 18 optical inputs to the FPP device, and 18 optical outputs.

Figure 8:
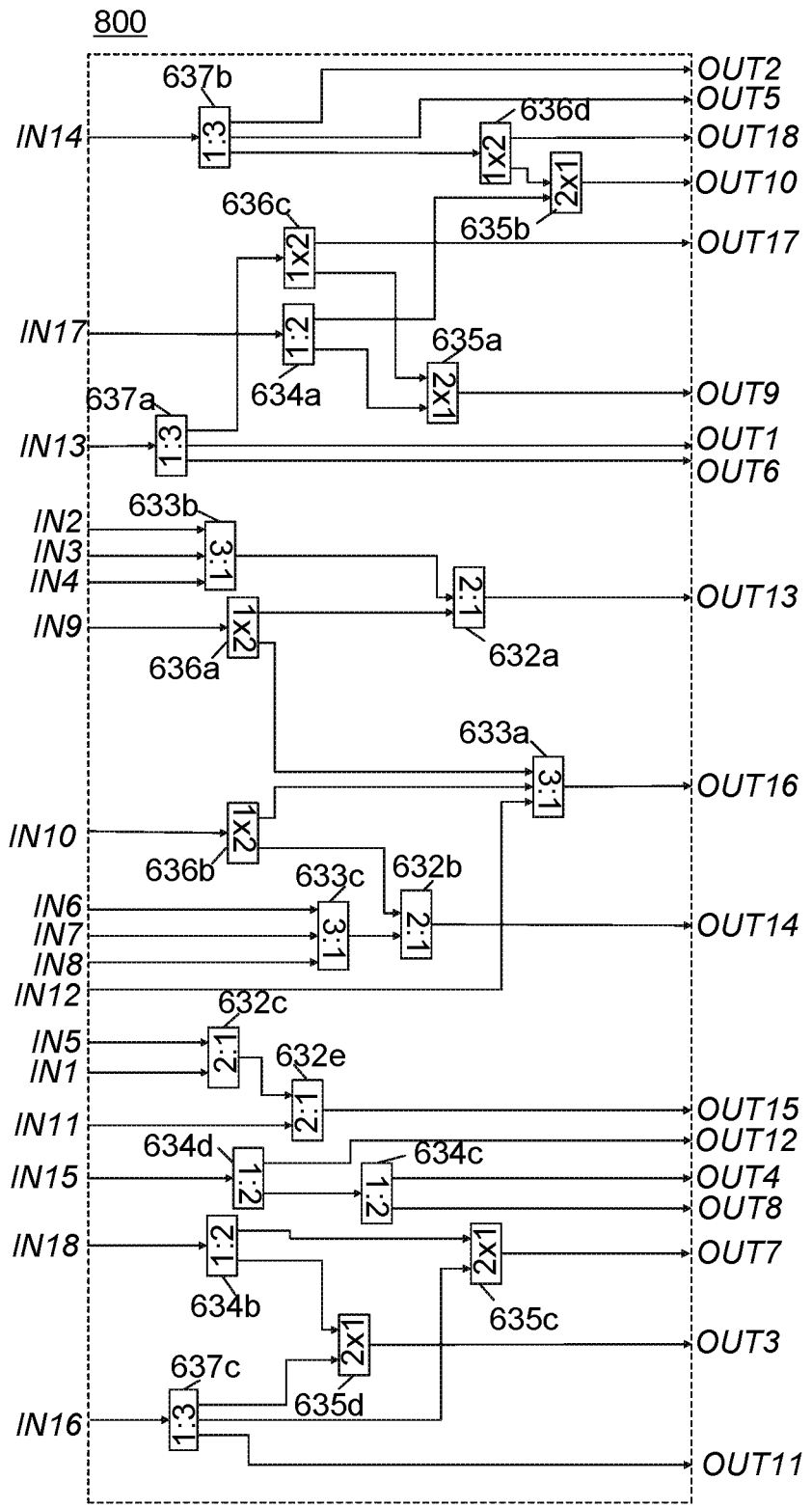
FIG. 8 is a detailed look inside of a field programmable photonic device.

FIG. 8 shows the field programmable photonic elements of 700 grouped together into one field programmable photonic (FPP) device 800, wherein the entry and exit labels INi and OUTi in 800 correspond to the labels INi and OUTi of the entry and exit points of the FPP in 700. As can be seen, the field programmable photonic device 800 is comprised of a plurality of optical coupler devices whose interconnection to the input and output ports of the device is done using optical switches. Additionally (not shown), optical switches could be used to interconnect one or more optical couplers together within the field programmable photonic device, in order to add additional functionality. The optical couplers and optical switches in 800 may be integrated together on a common substrate in order to enable the mass manufacture of the field programmable photonic device.

Figure 9:
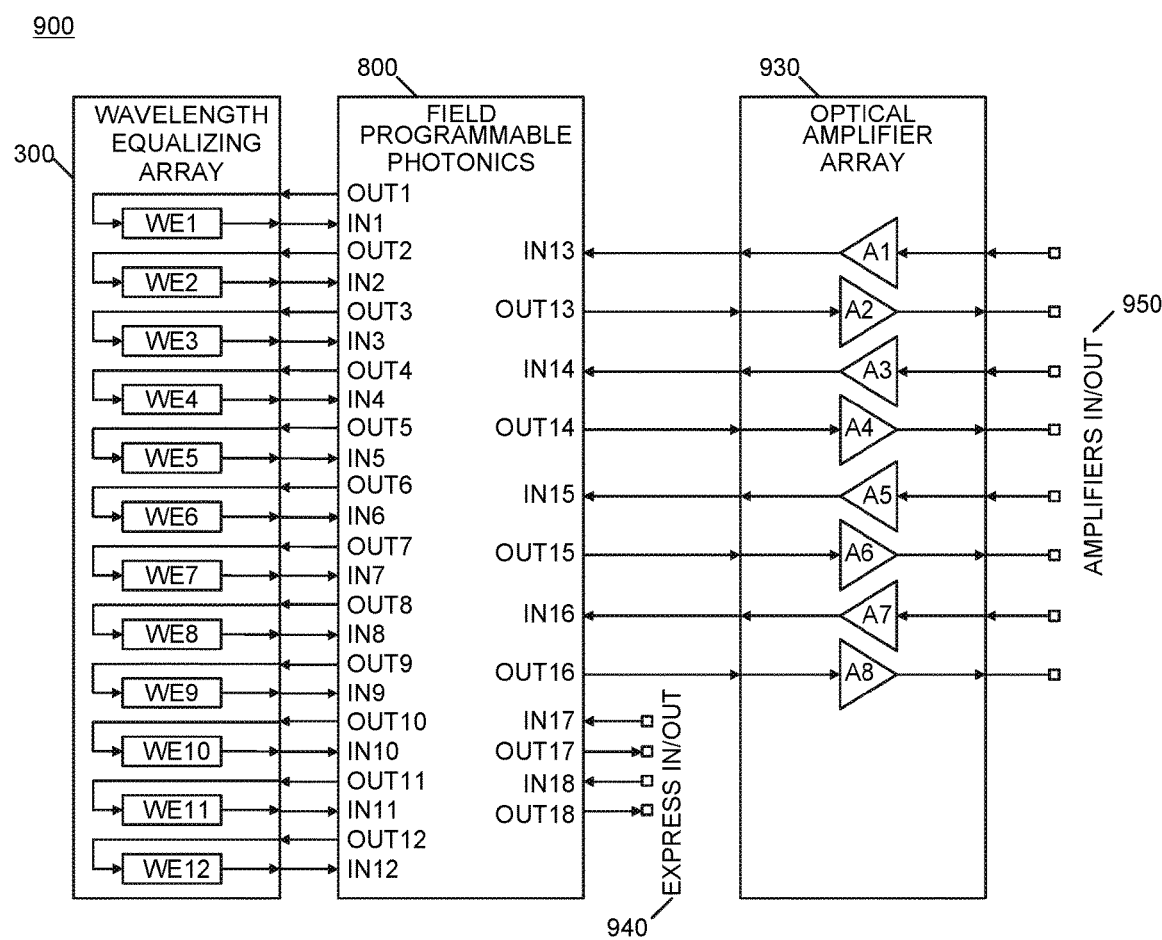
FIG. 9 is a high-level diagram showing the three optical building blocks of a software programmable ROADM used to create a three or four-degree optical node.

FIG. 9 is a high level diagram showing the three optical building blocks of an optical signal processor (software programmable ROADM) that can be used to create a three or four degree optical node. Interconnection between the three major components may most easily be done by using parallel fiber optic cables with MTP optical connectors. The wavelength equalizing array 300 may be substantially the same as the wavelength equalizing array 300 discussed in reference to FIG. 3. The field programmable photonic device 800 may be substantially the same as the field programmable photonic device 800 discussed in reference to FIG. 8.

Based upon the previous embodiments, it is clear that the wavelength equalizing array becomes a common building block that can be paired with field programmable optics to build optical signal processors with any number of functions—limited only by the complexity of the field programmable photonics. For instance, in addition to the two, three, and four degree integrated ROADM products that can be built with the described field programmable photonics, additional optical circuitry could be added to the FPP that would provide for some number of colorless optical add/drop ports for a non-expandable two degree ROADM.

Figure 10A:
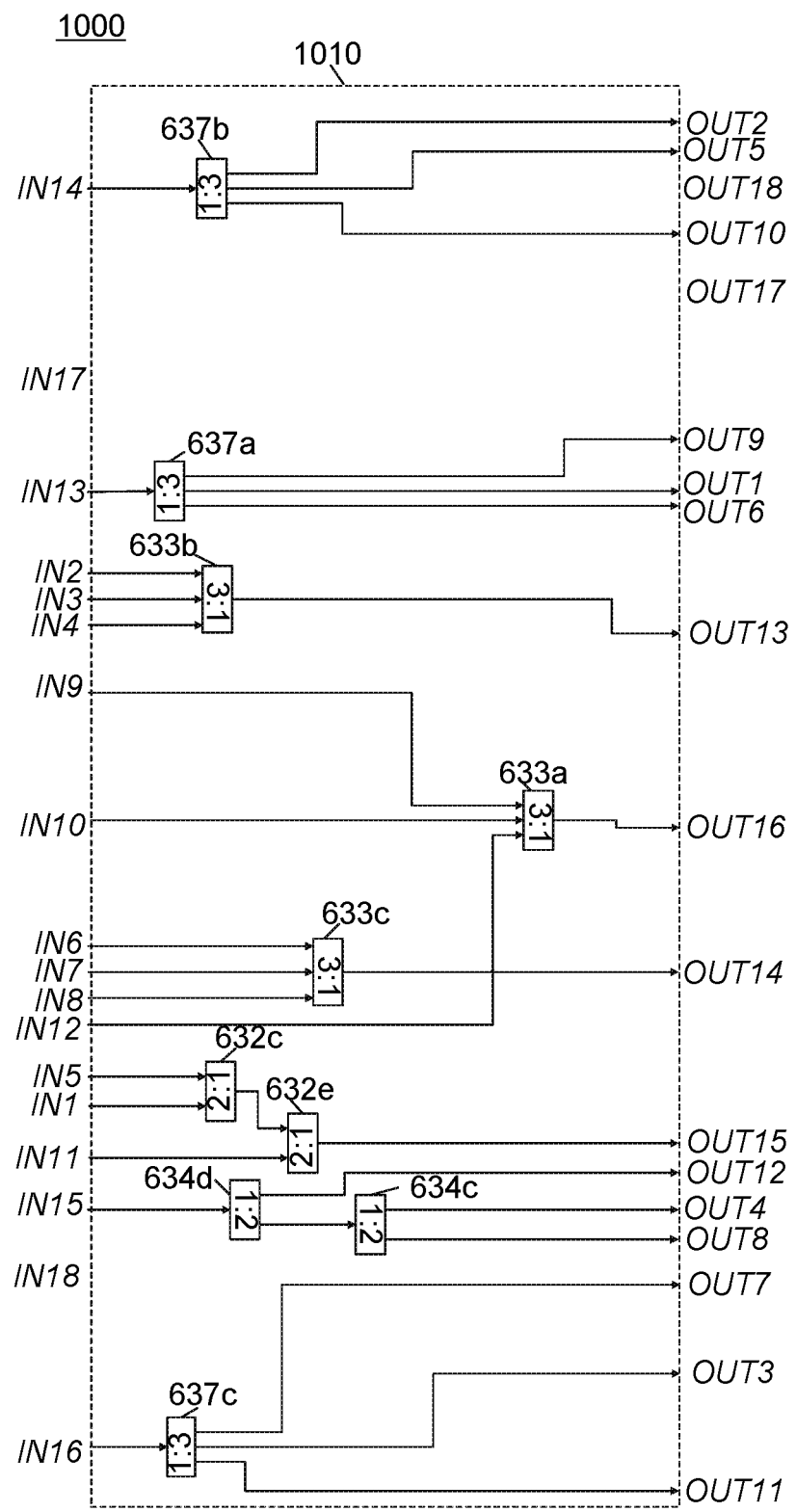
FIG. 10A is a detailed look inside of an application specific photonic device used to construct a three-degree optical node.
Figure 10B:
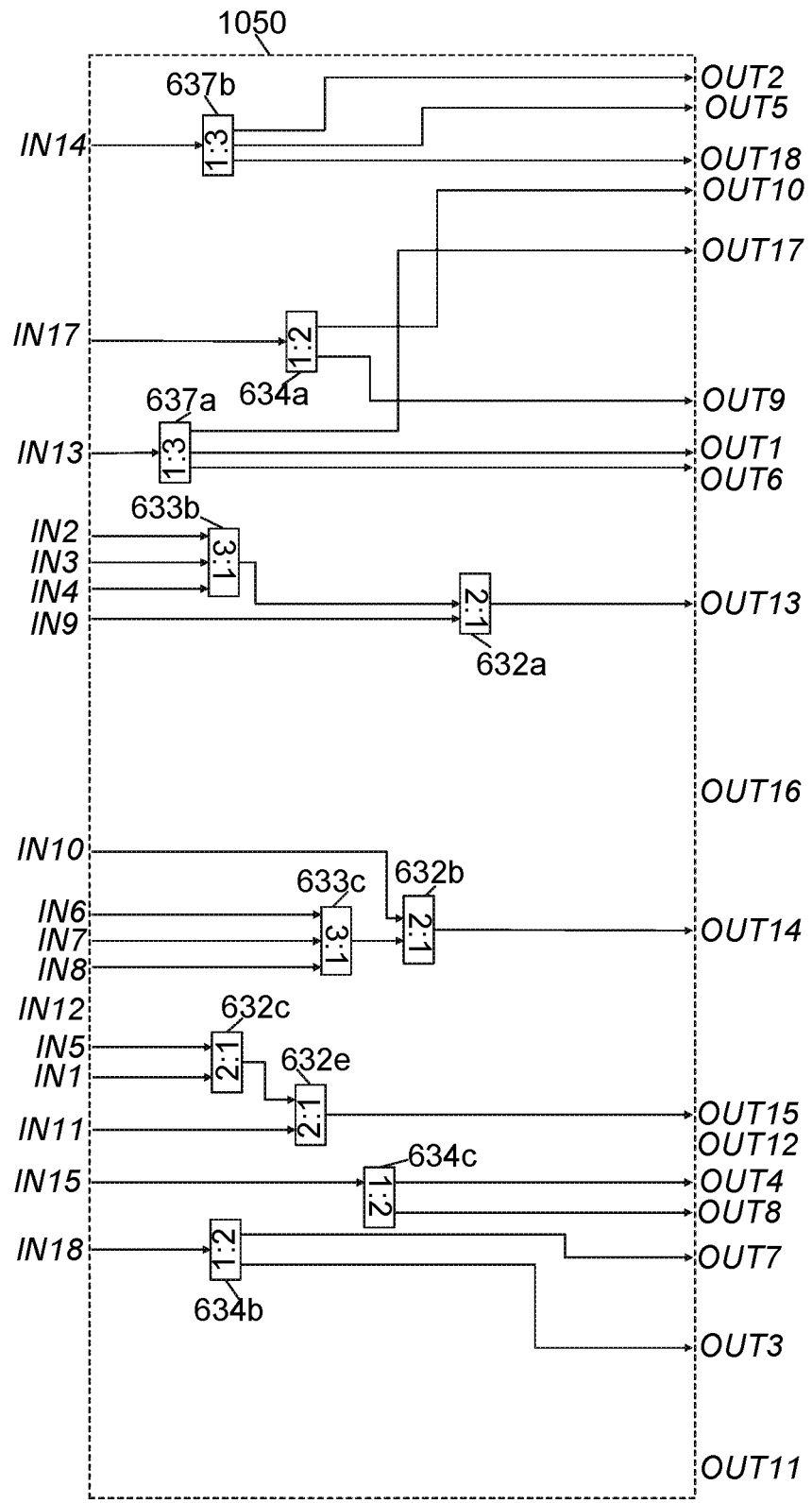
FIG. 10B is a detailed look inside of an application specific photonic device used to construct a four-degree optical node.

As an alternative to using a single field programmable photonic device 800, multiple Application Specific Photonic (ASP) devices may be used to create optical signal processors with differing capabilities. The Application Specific Photonic devices may have substantially the same physical form factor, electrical connectors, and optical connectors, in order to allow one to easily swap between different single-application photonic devices when configuring the optical signal processor for various applications. For instance, FIG. 10A and FIG. 10B show two Application Specific Photonic devices 1010, 1050 which could be used in place of the field programmable photonic device 800 on optical signal processor 900 in FIG. 9.

Application Specific Photonic device 1010 is used to implement the optical signal processor 400, while Application Specific Photonic device 1050 is used to implement the optical signal processor 510.

As indicated, the application specific photonic devices 1010 and 1050 are comprised of a plurality of optical coupler devices. Additionally (not shown), other fixed and programmable optical devices could be contained within the application specific photonic devices in order to provide additional functionality. The optical couplers (and optionally other fixed and programmable optical devices) in 1010 and 1050 may be integrated together on a common substrate in order to enable the mass manufacture of the application specific photonic device.

A method of constructing an optical signal processor may consist of utilizing at least one wavelength processing device to operate on individual wavelengths, a plurality of optical amplifying devices to amplify groups of wavelengths, and a field programmable photonic device to allow the optical signal processor and to perform multiple networking applications.

Figure 11:
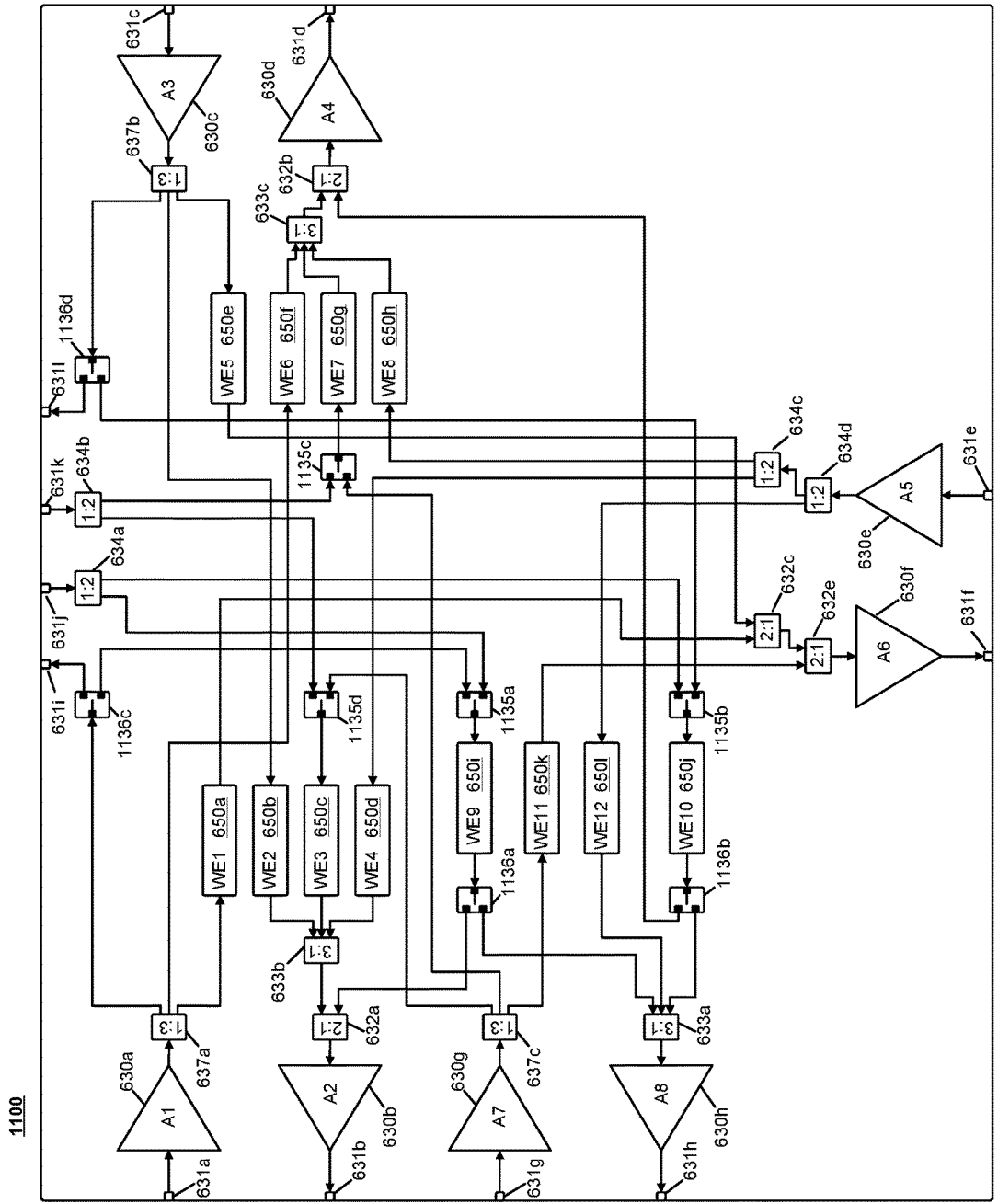
FIG. 11 is an illustration of a software programmable ROADM used to create a three or four-degree optical node.

FIG. 11 illustrates a redrawn version of the optical signal processor (software programmable ROADM) 600 of FIG. 6, now identified as 1100. In FIG. 11, each of the single-pole double-throw 2×1 optical switches 635a-d have been redrawn 1135a-d to explicitly show the single-pole and double-throw connections of each switch. Similarly, each of the single-pole double-throw 1×21 optical switches 636a-d have been redrawn 1136a-d to explicitly show the single-pole and double-throw connections of each switch. In FIG. 11 each of the single-pole double-throw switches are drawn as having their poles connected to neither throw position in order to indicate that a connection can be made from the pole of a switch to either throw position.

Each of the optical switches 1136a-d (636a-d) are broadband optical switches, meaning that each switch either forwards all the wavelengths entering the pole terminal of the switch to the first throw terminal of the switch (and forwards no wavelengths to the second throw terminal of the switch), or forwards all the wavelengths entering the pole terminal of the switch to the second throw terminal of the switch (and forwards no wavelengths to the first throw terminal of the switch). For such a switch, there is no ability to selectively forward some number of wavelengths to the first throw terminal while simultaneously forwarding some number of wavelengths to the second throw terminal—its instead designed to forward all the incoming wavelengths to a single throw terminal. For a given optical switch 1136a-d (636a-d), since all the wavelengths of the waveguide attached to the pole of the optical switch 1136a-d are forwarded to the waveguide connected to the first throw terminal of the given switch (and none to the second throw terminal of the given switch), or all the wavelengths of the waveguide attached to the pole of the optical switch 1136a-d are forwarded to the waveguide connected to the second throw terminal of the given switch (and none to the first throw terminal of the given switch), each of the optical switches 1136a-d (636a-d) can also be referred to as waveguide switches. Similarly, each of the optical switches 1135a-d (635a-d) can also be referred to as waveguide switches. Each waveguide switch 1135a-d, 1136a-d (635a-d, 636a-d) may be constructed using one or more Mach-Zehnder interferometers (MZIs), or they be constructing using other optical techniques.

Conversely, since the wavelength equalizers 650a-h are able to be configured to selectively pass some wavelengths while blocking other wavelengths, the wavelength equalizers 650a-h may be referred to as wavelength switches. A wavelength selective switch (WSS) is also a type of wavelength switch.

Figure 12:
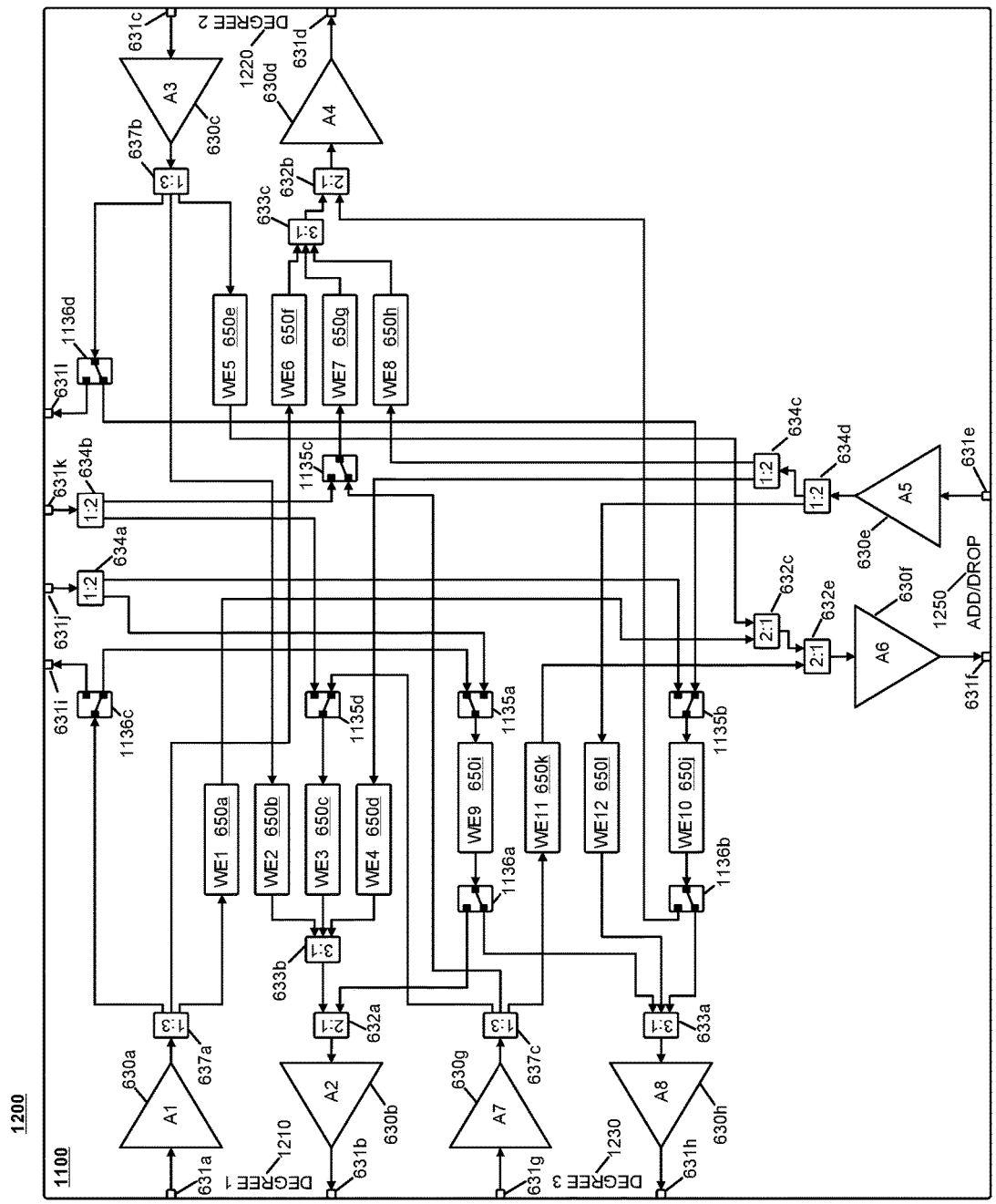
FIG. 12 is an illustration of the FIG. 11 software programmable ROADM configured to create a three-degree optical node.

FIG. 12 is an illustration of the FIG. 11 optical signal processor (software programmable ROADM) 1100 configured as a three-degree optical node 1200. For this configuration, optical degree one 1210 comprises of the optical interfaces 631a-b, optical degree two 1220 comprises of the optical interfaces 631c-d, optical degree three 1230 comprises of the optical interfaces 631g-h, and the directionless add/drop port 1250 comprises of the optical interfaces 631e-f. As shown in FIG. 12, the optical switches 1136c, 1135a, and 1136a are configured to forward wavelengths from degree one 1210 towards degree three 1230, and optical switches 1136d, 1135b, and 1136b are configured to forward wavelengths from degree two 1220 towards degree three 1230, and optical switch 1135d is configured to forward wavelengths from degree three 1230 towards degree one 1210, and optical switch 1135c is configured to forward wavelengths from degree three 1230 towards degree two 1220.

In FIG. 12, optical switch 1136c is configured to forward a copy of all the wavelengths arriving at degree one 1210 to optical switch 1135a (instead of to the express output of interface 631i). In FIG. 12, optical switch 1135a is configured to forward all the wavelengths from optical switch 1136c to the wavelength equalizer 650i. In FIG. 12, the wavelength equalizer 650i is configured to selectively pass and block individual wavelengths from optical switch 1135a to optical switch 1136a. In FIG. 12, optical switch 1136a is configured to forward all the wavelengths from wavelength equalizer 650i to degree three 1230.

In FIG. 12, optical switch 1136d is configured to forward a copy of all the wavelengths arriving at degree two 1220 to optical switch 1135b (instead of to the express output of interface 631l). In FIG. 12, optical switch 1135b is configured to forward all the wavelengths from optical switch 1136d to the wavelength equalizer 650j. In FIG. 12, the wavelength equalizer 650j is configured to selectively pass and block individual wavelengths from optical switch 1135b to optical switch 1136b. In FIG. 12, optical switch 1136b is configured to forward all the wavelengths from wavelength equalizer 650j to degree three 1230.

In FIG. 12, optical switch 1135d is configured to forward a copy of all the wavelengths from degree three 1230 to the wavelength equalizer 650c. In FIG. 12, the wavelength equalizer 650c is configured to selectively pass and block individual wavelengths from optical switch 1135d to degree one 1210.

In FIG. 12, optical switch 1135c is configured to forward a copy of all the wavelengths from degree three 1230 to the wavelength equalizer 650g. In FIG. 12, the wavelength equalizer 650g is configured to selectively pass and block individual wavelengths from optical switch 1135c to degree two 1220.

In FIG. 12, wavelength equalizers 650b-d are used to pass and block individual wavelengths from degree two 1220, from degree three 1230, and from the directionless add/drop port 1250, to degree one 1210, while wavelength equalizers 650f-h are used to pass and block individual wavelengths from degree one 1210, from degree three 1230, and from the directionless add/drop port 1250, to degree two 1220, while wavelength equalizers 650i, 650j, and 650l are used to pass and block individual wavelengths from degree one 1210, from degree two 1220, and from the directionless add/drop port 1250, to degree three 1230, while wavelength equalizers 650a, 650e, and 650k are used to pass and block individual wavelengths from degree one 1210, from degree two 1220, and from degree three 1230, to the add/drop port 1250.

In FIG. 12, the express interfaces 631i, 631j, 631k, and 631l are not used.

Figure 13A:
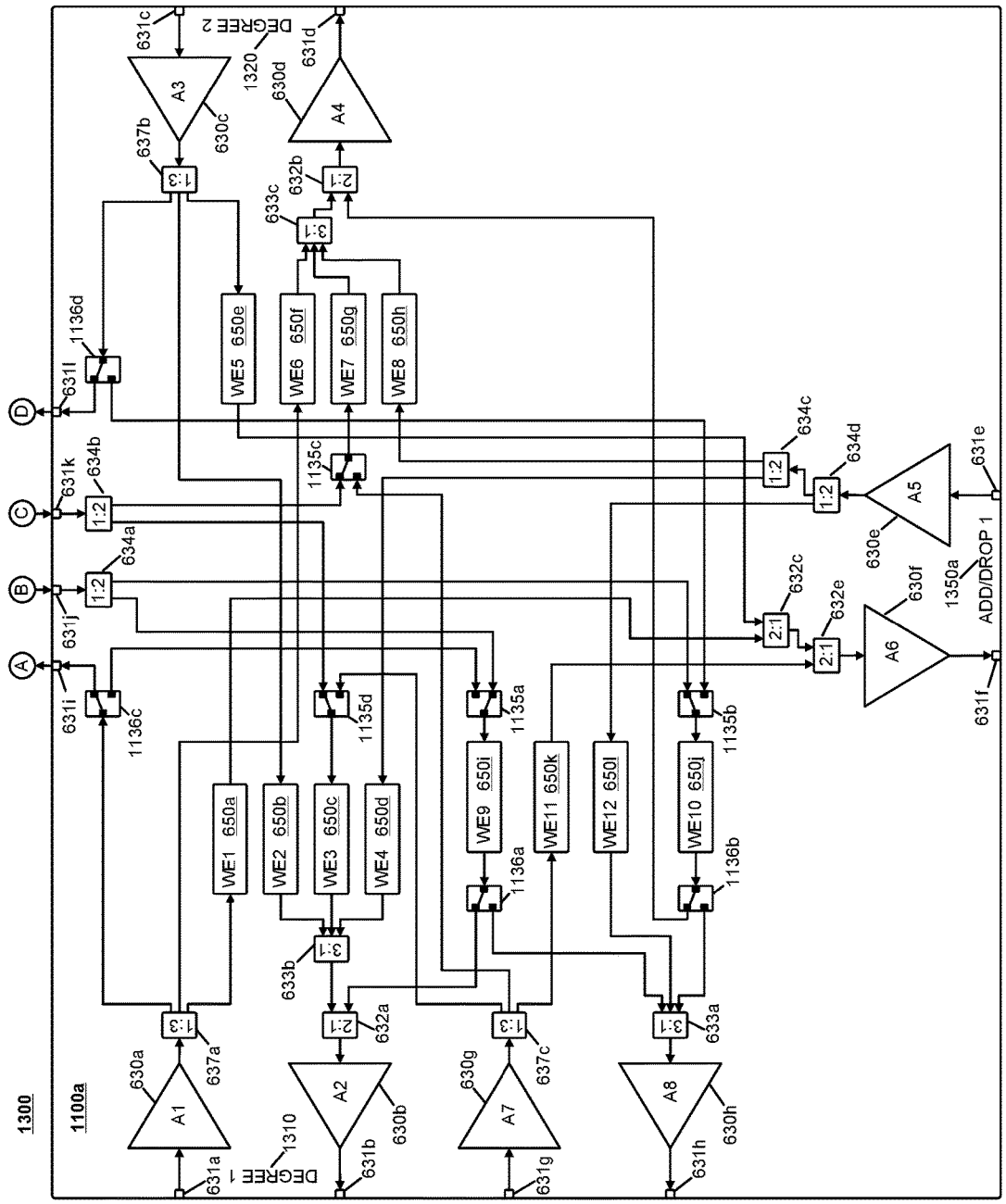
FIGS. 13A and 13B illustrate two FIG. 11 software programmable ROADMs connected and configured to create a four-degree optical node.
Figure 13B:
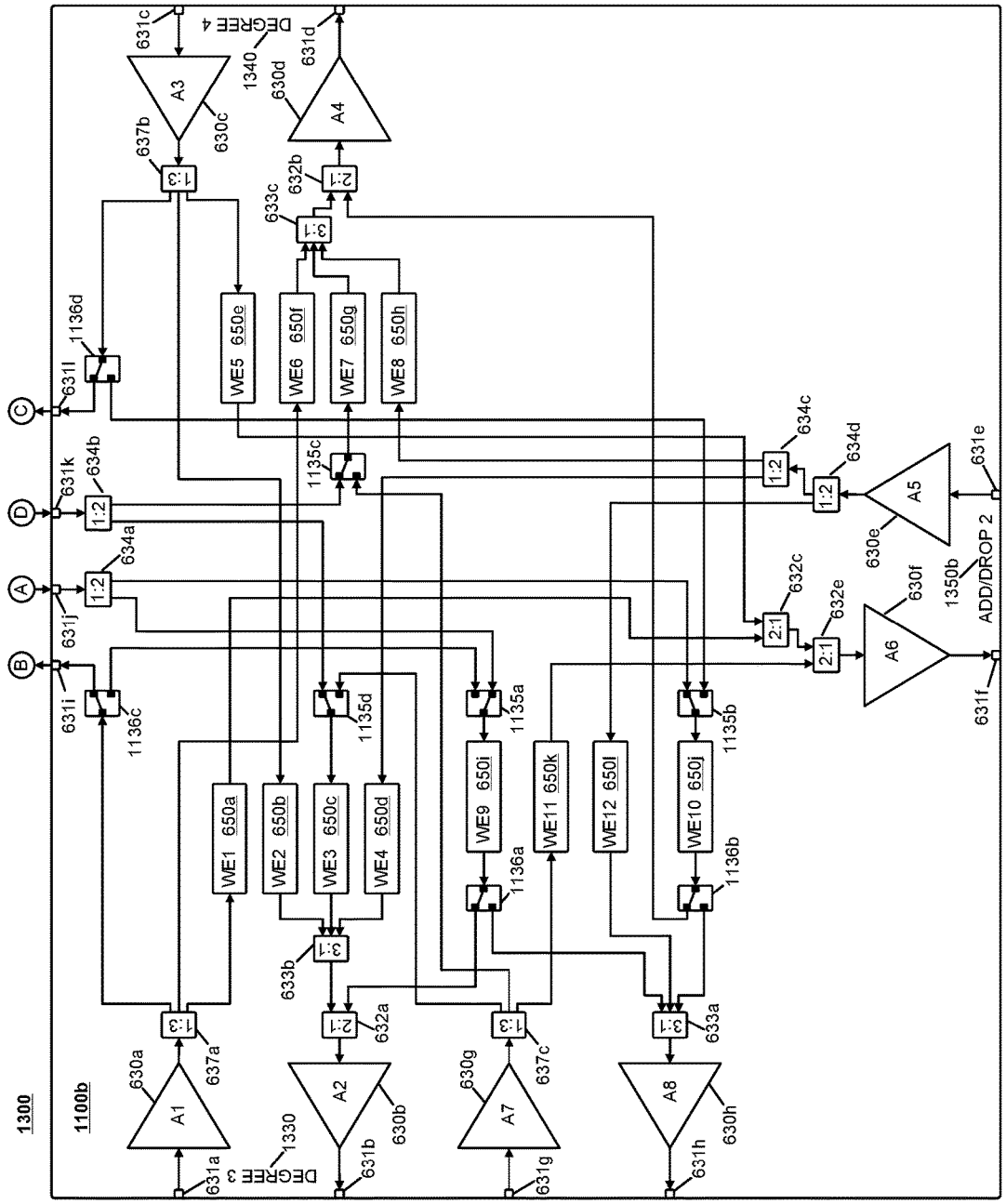

FIG. 13A and FIG. 13B is an illustration of two of the FIG. 11 optical signal processors (software programmable ROADMs) 1100a, 1100b configured as a four-degree optical node. For this configuration, optical degree one 1310 comprises of the optical interfaces 631a-b of FIG. 13A, optical degree two 1320 comprises of the optical interfaces 631c-d of FIG. 13A, optical degree three 1330 comprises of the optical interfaces 631a-b of FIG. 13B, optical degree four 1340 comprises of the optical interfaces 631c-d of FIG. 13B, directionless add/drop port one 1350a comprises of the optical interfaces 631e-f of FIG. 13A, and directionless add/drop port two 1350b comprises of the optical interfaces 631e-f of FIG. 13B.

In FIG. 13A and FIG. 13B, optical interface 631i of 1100a is connected to optical interface 631j of 1100b, optical interface 631j of 1100a is connected to optical interface 631i of 1100b, optical interface 631k of 1100a is connected to optical interface 631l of 1100b, and optical interface 631l of 1100a is connected to optical interface 631k of 1100b.

As shown in FIG. 13A and FIG. 13B, optical switch 1136c of FIG. 13A is configured to forward wavelengths from degree one 1310 on optical signal processor 1100a towards degrees three 1330 and four 1340 on optical signal processor 1100b, and optical switch 1136d of FIG. 13A is configured to forward wavelengths from degree two 1320 on optical signal processor 1100a towards degrees three 1330 and four 1340 on optical signal processor 1100b, and optical switch 1136c of FIG. 13B is configured to forward wavelengths from degree three 1330 on optical signal processor 1100b towards degrees one 1310 and two 1320 on optical signal processor 1100a, and optical switch 1136d of FIG. 13B is configured to forward wavelengths from degree four 1340 on optical signal processor 1100b towards degrees one 1310 and two 1320 on optical signal processor 1100a, and optical switches 1135a and 1136a of FIG. 13A are configured to forward wavelengths from degree three 1330 on optical signal processor 1100b towards degree one 1310 on optical signal processor 1100a, and optical switches 1135b and 1136b of FIG. 13A are configured to forward wavelengths from degree three 1330 on optical signal processor 1100b towards degree two 1320 on optical signal processor 1100a, and optical switch 1135c of FIG. 13A is configured to forward wavelengths from degree four 1340 on optical signal processor 1100b towards degree two 1320 on optical signal processor 1100a, and optical switch 1135d of FIG. 13A is configured to forward wavelengths from degree four 1340 on optical signal processor 1100b towards degree one 1310 on optical signal processor 1100a, and optical switches 1135a and 1136a of FIG. 13B are configured to forward wavelengths from degree one 1310 on optical signal processor 1100a towards degree three 1330 on optical signal processor 1100b, and optical switches 1135b and 1136b of FIG. 13B are configured to forward wavelengths from degree one 1310 on optical signal processor 1100a towards degree four 1340 on optical signal processor 1100b, and optical switch 1135c of FIG. 13B is configured to forward wavelengths from degree two 1320 on optical signal processor 1100a towards degree four 1340 on optical signal processor 1100b, and optical switch 1135d of FIG. 13B is configured to forward wavelengths from degree two 1320 on optical signal processor 1100a towards degree three 1330 on optical signal processor 1100b.

In FIG. 13A, wavelength equalizers 650b-d and 650i are used to pass and block individual wavelengths from degree two 1320, from degree three 1330, from degree four 1340 and from the directionless add/drop port one 1350a, to degree one 1310, while wavelength equalizers 650f-h and 650j are used to pass and block individual wavelengths from degree one 1310, from degree three 1330, from degree four 1340, and from the directionless add/drop port 1350a, to degree two 1320, while wavelength equalizers 650a and 650e, are used to pass and block individual wavelengths from degree one 1310, and from degree two 1320 to the add/drop port 1350a.

In FIG. 13B, wavelength equalizers 650b-d and 650i are used to pass and block individual wavelengths from degree one 1310, from degree two 1320, from degree four 1340, and from the directionless add/drop port one 1350b, to degree three 1330, while wavelength equalizers 650f-h and 650j are used to pass and block individual wavelengths from degree one 1310, from degree two 1320, from degree three 1330, and from the directionless add/drop port 1350b, to degree four 1340, while wavelength equalizers 650a and 650e, are used to pass and block individual wavelengths from degree three 1330, and from degree four 1340 to the add/drop port 1350b.

In FIG. 13A and FIG. 13B, the interfaces 631g, and 631h are not used.

Since each of the waveguide switches 1135a-d and 1136a-d in FIG. 12, FIG. 13A and FIG. 13B have two throw positions, each of the waveguide switches have two states. From inspection of FIG. 12, FIG.13A and FIG. 13B, it is evident that there are two configurations of switch settings used. The optical signal processor 1100 of 1200 utilizes a first switch setting configuration, while the optical signal processors 1100a and 1100b of 1300 use a second switch setting configuration. In 1300, the switch setting configuration of optical signal processor 1100a is identical to the switch setting configuration of optical signal processor 1100b, while the switch setting configuration of optical signal processor 1100 in 1200 differs from that of optical signal processors 1100a and 1100b of 1300.

Figure 14:
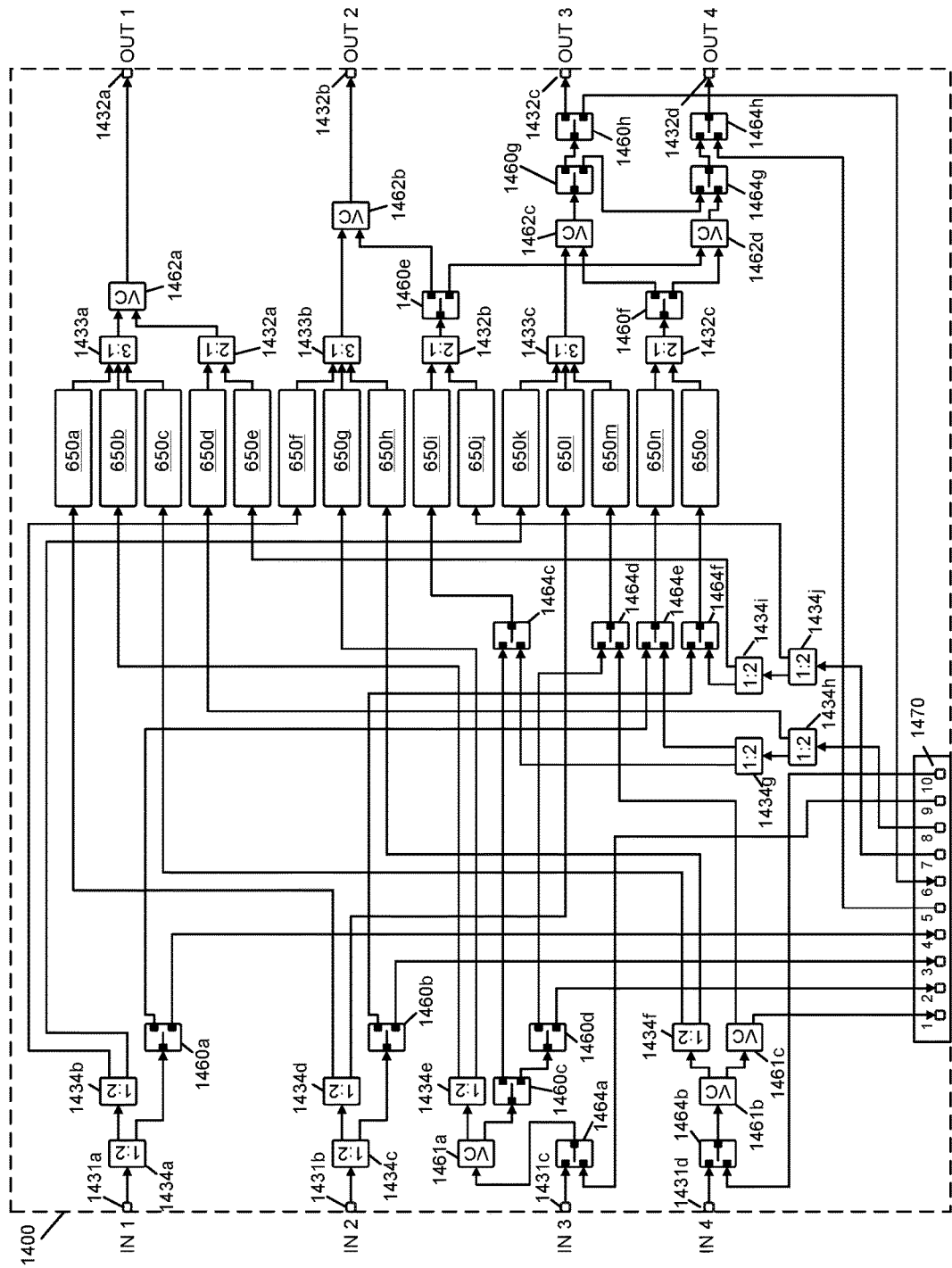
FIG. 14 is an illustration of a software programmable ROADM used to construct two, three, four, and five-degree optical nodes.

FIG. 14 depicts another optical signal processor (software programmable ROADM) 1400. The software programmable ROADM 1400, can be used to construct two-degree optical nodes, three-degree optical nodes, four-degree optical nodes, and five-degree optical nodes. Additionally, the software programmable ROADM 1400 provides either one or two directionless add/drop ports—depending upon the configuration of the ROADM. A single software programmable ROADM 1400 can be used to construct optical nodes having two or three optical degrees, while two of the software programmable ROADMs 1400 are required to construct optical nodes having four or five optical degrees. A two-degree optical node using a single software programmable ROADM 1400 can have up to two directionless add/drop ports, while a three-degree optical node using a single software programmable ROADM 1400 can have only one directionless add/drop port. Similarly, a four-degree optical node using two software programmable ROADMs 1400 can have up to two directionless add/drop ports, while a five-degree optical node using two software programmable ROADM 1400 can have only one directionless add/drop port. Table 1 summarizes the various node configurations and their properties.

TABLE 1

| Node Configuration | Number of Software Programmable ROADMs | Number of Optical Degrees Per ROADM | Total Number of Directionless Add/Drop Ports |
|---|---|---|---|
| Two-Degree | 1 | 2 | 2 |
| Three-Degree | 1 | 3 | 1 |
| Four-Degree | 2 | 2/2 | 2 |
| Five-Degree | 2 | 3/2 | 1 |

The software configurable ROADM 1400 comprises of: plurality of primary optical inputs 1431a-d, a plurality of primary optical outputs 1432a-d, a plurality of secondary optical inputs and outputs 1470, a plurality of wavelength equalizers (wavelength switches) 650a-o, a plurality of 1-by-2 waveguide switches 1460a-h, a plurality of 2-by-1 waveguide switches 1464a-h, a plurality of 1-to-2 fixed coupling ratio optical couplers 1434a j, a plurality of 2-to-1 fixed coupling ratio optical couplers 1432a-c, a plurality of 3-to-1 fixed coupling ratio optical couplers 1433a-c, a plurality of 1-to-2 variable coupling ratio optical couplers 1461a-c, and a plurality of 2-to-1 variable coupling ratio optical couplers 1462a-d. In addition, the various optical elements 1431a-d, 1432a-d, 1470, 650a-o, 1460a-h, 1464a-h, 1434a-j, 1432a-c, 1433a-c, 1461a-c and 1462a-d are interconnected with optical waveguides, as shown in FIG. 14. The optical components 1460a-h, 1464a-h, 1434a-j, 1432a-c, 1433a-c, 1461a-c and 1462a-d may be integrated on one or more common substrates in order to form one or more photonic integrated chips (PICs). Additionally, the optical components 1431a-d, 1432a-d, 1470, 650a-o, 1460a-h, 1464a-h, 1434a-j, 1432a-c, 1433a-c, 1461a-c and 1462a-d may be placed on a common electrical circuit pack, and each of the four primary optical inputs 1431a-d may be pair with the corresponding primary optical outputs 1432a-d with optical connections being made with dual-LC optical connectors, while the plurality of secondary optical inputs and outputs 1470 may be combined into one parallel MTP connector.

The three wavelength equalizers 650a-c and the optical coupler 1433a form a first 3×1 wavelength selective switch (WSS), while the three wavelength equalizers 650f-h and the optical coupler 1433b form a second 3×1 wavelength selective switch (WSS), and three wavelength equalizers 650k-m and the optical coupler 1433c form a third 3×1 wavelength selective switch (WSS). Similarly, the two wavelength equalizers 650d-e and the optical coupler 1432a form a first 2×1 wavelength selective switch (WSS), while the two wavelength equalizers 650i-j and the optical coupler 1432b form a second 2×1 wavelength selective switch (WSS), and the two wavelength equalizers 650n-o and the optical coupler 1432c form a third 2×1 wavelength selective switch (WSS). The six so formed wavelength selective switches can be used as standalone wavelength selective switches, or they can be combined to form larger wavelength selective switches. For instance, the five wavelength equalizers 650a-e are combinable using couplers 1433a, 1432a, and 1462a to form a 5×1 wavelength selective switch (WSS). Similarly, the five wavelength equalizers 650f-j are combinable using couplers 1433b, 1432b, and 1462b, as well as waveguide switch 1460e to form a 5×1 wavelength selective switch (WSS). This is accomplished by software programming waveguide switch 1460e to the "Up" position, so that the output of coupler 1432b connects to the lower input of coupler 1462b. Alternatively, the 2×1 WSS formed from wavelength equalizers 650i-j and coupler 1432b is combinable with the 2×1 WSS formed from wavelength equalizers 650n-o and coupler 1432c using coupler 1462d and waveguide switches 1460e-f to form a 4×1 WSS. This is accomplished by software programming both waveguide switches 1460e-f to the "Down" position, so that the outputs of couplers 1432b-c connect to the coupler 1462d.

For a given node configuration, a copy of the wavelengths applied to the primary optical inputs 1431a-d must be applied to the optical inputs of the formed WSSs attached to the primary optical outputs 1432a-d. In order to do this, the waveguide switches 1460a-d and 1464a-f are set accordingly. The couplers 1434a-f and 1461a-c are used to duplicate the wavelengths applied to the primary optical inputs 1431a-d, and then waveguide switches are used to route the wavelengths to the WSS output structures. The waveguide switches 1460g-h and 1464g-h are used to route WDM signals from the formed WSS structures to primary outputs 1432c-d and the secondary optical inputs and outputs 1470. When two software programmable ROADMs are used together to form larger optical nodes, couplers 1434g-j are used to duplicate the wavelengths applied to the secondary optical inputs of 1470, and waveguide switches 1464c-f are used to assist in the forwarding of these wavelengths to the WSS output structures.

Figure 15:
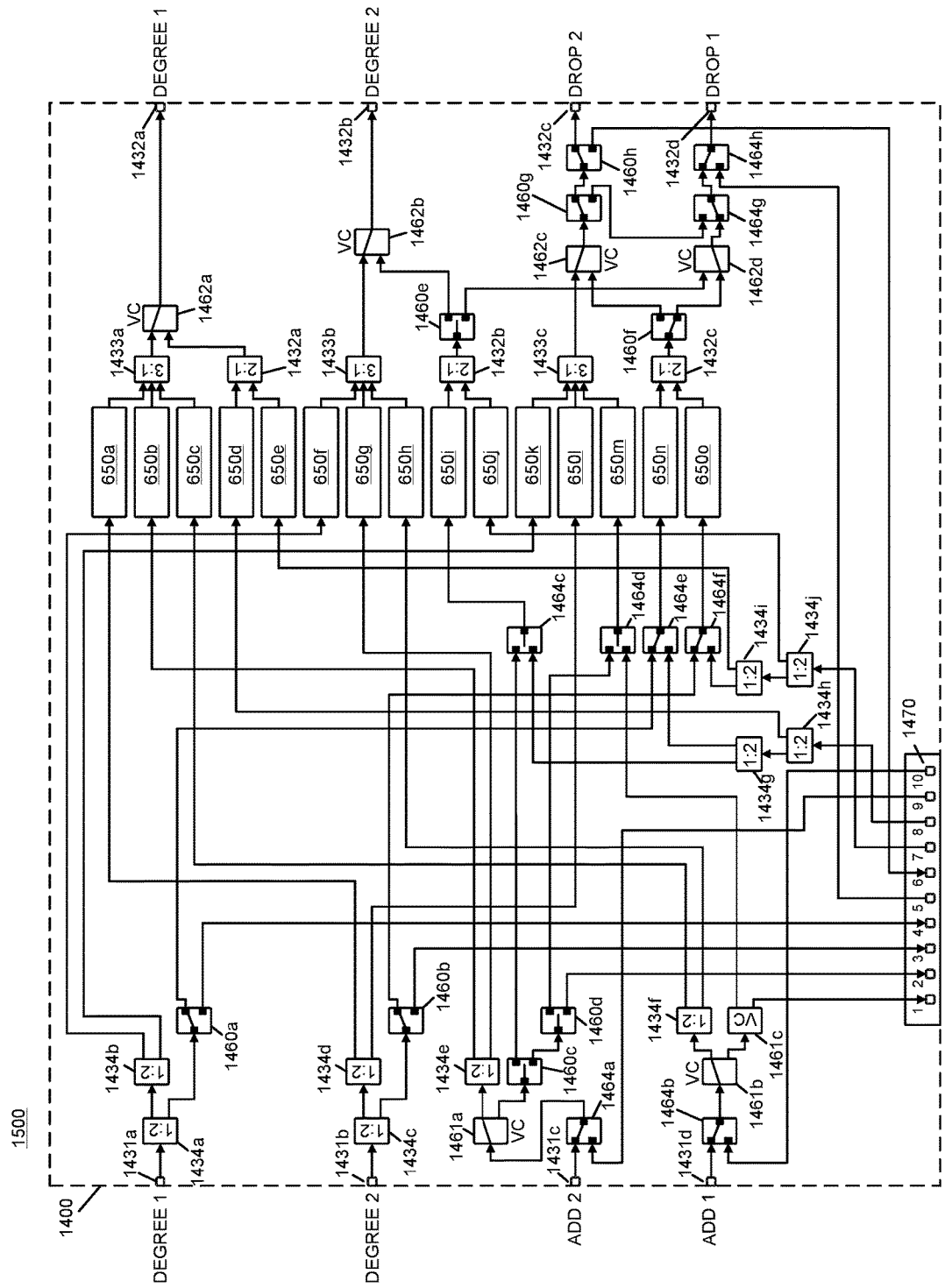
FIG. 15 illustrates the use of the FIG. 14 software programmable ROADM to construct a two-degree optical node with two directionless add/drop ports.

FIG. 15 illustrates the use of the software programmable ROADM 1400 in the two-degree node configuration 1500. This application requires a single software programmable ROADM 1400. The software programmable ROADM 1400 can be configured (i.e., programmed via software) to form a two-degree optical node with two directionless add/drop ports. Each of the two directionless add/drop ports 1431d/1432d and 1431c/1432c may be connected to optical multiplexer/demultiplexers (such as 585a-b) in order to filter the wavelengths of the add/drop ports. In FIG. 15, primary optical input 1431a is the DEGREE 1 input, primary optical input 1431b is the DEGREE 2 input, primary optical output 1432a is the DEGREE 1 output, and primary optical output 1432b is the DEGREE 2 output.

For the two-degree node with two directionless add/drop ports, the DEGREE 1 output WSS must be able to select wavelengths from the DEGREE 2 input 1431b and the ADD 1 input 1431d and the ADD 2 input 1431c. Therefore, a copy of the wavelengths applied to primary inputs 1431b-d must be forwarded to the DEGREE 1 output WSS. Since the DEGREE 1 output WSS is required to select wavelengths from three WDM signals, a 3×1 WSS needs to be formed and connected to the DEGREE 1 output 1432a. This 3×1 WSS is formed from wavelength equalizers 650a-c and coupler 1433a. Wavelength equalizer 650a selects wavelengths from the DEGREE 2 input 1431b, wavelength equalizer 650*b* selects wavelengths from the ADD 2 input 1431*c*, and wavelength equalizer 650*c* selects wavelengths from the ADD 1 input 1431*d*. A copy of the wavelengths from the DEGREE 2 input are forwarded to wavelength equalizer 650*a* via couplers 1434*c* and 1434*d*, while a copy of the wavelengths from the ADD 2 input are forwarded to wavelength equalizer 650*b* via couplers 1461*a* and 1434*e*, and a copy of the wavelengths from the ADD 1 input are forwarded to wavelength equalizer 650*c* via couplers 1461*b* and 1434*f*. Additionally, waveguide switch 1464*a* is configured (i.e., software programmed) to attach the ADD 2 input 1431*c* to the input of coupler 1461*a*, and similarly, waveguide switch 1464*b* is configured (i.e., software programmed) to attach the ADD 1 input 1431*d* to the input of coupler 1461*b*. Since only a 3×1 WSS is needed for the DEGREE 1 output, variable coupler 1462*a* is configured (i.e., software programmed) to forward all of the light from coupler 1433*a* to output 1432*a*, and no light from optical coupler 1432*a* is forwarded to output 1432*a*. When programmed in this way, coupler 1462*a* acts like a waveguide switch, and therefore is depicted as a switch in FIG. 15.

For the two-degree node with two directionless add/drop ports, the DEGREE 2 output WSS must be able to select wavelengths from the DEGREE 1 input 1431*a* and the ADD 1 input 1431*d* and the ADD 2 input 1431*c*. Therefore, a copy of the wavelengths applied to primary inputs 143*a,c-d* must be forwarded to the DEGREE 2 output WSS. Since the DEGREE 2 output WSS is required to select wavelengths from three WDM signals, a 3×1 WSS needs to be formed and connected to the DEGREE 2 output 1432*b*. This 3×1 WSS is formed from wavelength equalizers 650*f-h* and coupler 1433*b*. Wavelength equalizer 650*f* selects wavelengths from the DEGREE 1 input 1431*a*, wavelength equalizer 650*g* selects wavelengths from the ADD 2 input 1431*c*, and wavelength equalizer 650*h* selects wavelengths from the ADD 1 input 1431*d*. A copy of the wavelengths from the DEGREE 1 input are forwarded to wavelength equalizer 650*f* via couplers 1434*a* and 1434*b*, while a copy of the wavelengths from the ADD 2 input are forwarded to wavelength equalizer 650*g* via couplers 1461*a* and 1434*e*, and a copy of the wavelengths from the ADD 1 input are forwarded to wavelength equalizer 650*h* via couplers 1461*b* and 1434*f*. Additionally, waveguide switch 1464*a* is configured (i.e., software programmed) to attach the ADD 2 input 1431*c* to the input of coupler 1461*a*, and similarly, waveguide switch 1464*b* is configured (i.e., software programmed) to attach the ADD 1 input 1431*d* to the input of coupler 1461*b*. Since only a 3×1 WSS is needed for the DEGREE 2 output, variable coupler 1462*b* is configured (i.e., software programmed) to forward all of the light from coupler 1433*b* to output 1432*b*, and no light from optical coupler 1432*b* is forwarded to output 1432*b*. When programmed in this way, coupler 1462*b* acts like a waveguide switch, and therefore is depicted as a switch in FIG. 15.

For the two-degree node with two directionless add/drop ports, the DROP 2 output WSS must be able to select wavelengths from the DEGREE 1 input 1431*a* and the DEGREE 2 input 1431*b*. Therefore, a copy of the wavelengths applied to primary inputs 143*a-b* must be forwarded to the DROP 2 output WSS. Since the DROP 2 output WSS is required to select wavelengths from two WDM signals, a 2×1 WSS needs to be formed and connected to the DROP 2 output 1432*c*. This 2×1 WSS is formed from wavelength equalizers 650*k-l* and coupler 1433*c*. Wavelength equalizer 650*k* selects wavelengths from the DEGREE 1 input 1431*a*, and wavelength equalizer 650*l* selects wavelengths from the DEGREE 2 input 1431*b*. A copy of the wavelengths from the DEGREE 1 input are forwarded to wavelength equalizer 650*k* via couplers 1431*a* and 1434*b*, while a copy of the wavelengths from the DEGREE 2 input are forwarded to wavelength equalizer 650*l* via couplers 1434*b* and 1434*d*. (Since only a 2×1 WSS is needed for the DROP 2 output, a performance optimization could be made by replacing coupler 1433*c* with a variable coupler.) Since the DROP 2 output only requires a 2×1 WSS variable coupler 1462*c* is configured (i.e., software programmed) to forward all of the light from coupler 1433*c* to waveguide switch 1460*g*, and no light from optical coupler 1432*c* is forwarded to switch 1460*g*. When programmed in this way, coupler 1462*c* acts like a waveguide switch, and therefore is depicted as a switch in FIG. 15. Waveguide switches 1460*g-h* connects the output of coupler 1462*c* to the DROP 2 output 1432*c*.

For the two-degree node with two directionless add/drop ports, the DROP 1 output WSS must be able to select wavelengths from the DEGREE 1 input 1431*a* and the DEGREE 2 input 1431*b*. Therefore, a copy of the wavelengths applied to primary inputs 143*a-b* must be forwarded to the DROP 1 output WSS. Since the DROP 1 output WSS is required to select wavelengths from two WDM signals, a 2×1 WSS needs to be formed and connected to the DROP 1 output 1432*d*. This 2×1 WSS is formed from wavelength equalizers 650*n-o* and coupler 1432*c*. Wavelength equalizer 650*n* selects wavelengths from the DEGREE 1 input 1431*a*, and wavelength equalizer 650*o* selects wavelengths from the DEGREE 2 input 1431*b*. A copy of the wavelengths from the DEGREE 1 input are forwarded to wavelength equalizer 650*n* via coupler 1434*a* and waveguide switches 1460*a* and 1464*e*, while a copy of the wavelengths from the DEGREE 2 input are forwarded to wavelength equalizer 650*o* via coupler 1434*c* and waveguide switches 1460*b* and 1464*f*. Since the DROP 1 output only requires a 2×1 WSS variable coupler 1462*d* is configured (i.e., software programmed) to forward all of the light from coupler 1432*c* to waveguide switch 1464*g*, and no light from optical coupler 1432*b* is forwarded to switch 1464*g*. When programmed in this way, coupler 1462*d* acts like a waveguide switch, and therefore is depicted as a switch in FIG. 15. Waveguide switches 1460*f* and 1464*g-h* connects the output of coupler 1462*d* to the DROP 1 output 1432*d*.

For the two-degree node with two directionless add/drop ports, wavelength equalizers 650*d-e,i-j,m*, couplers 1434*g-j*, 1432*a-b*, 1461*c*, and waveguide switches 1460*c-d* and 1464*c-e* are not used.

Figure 16:
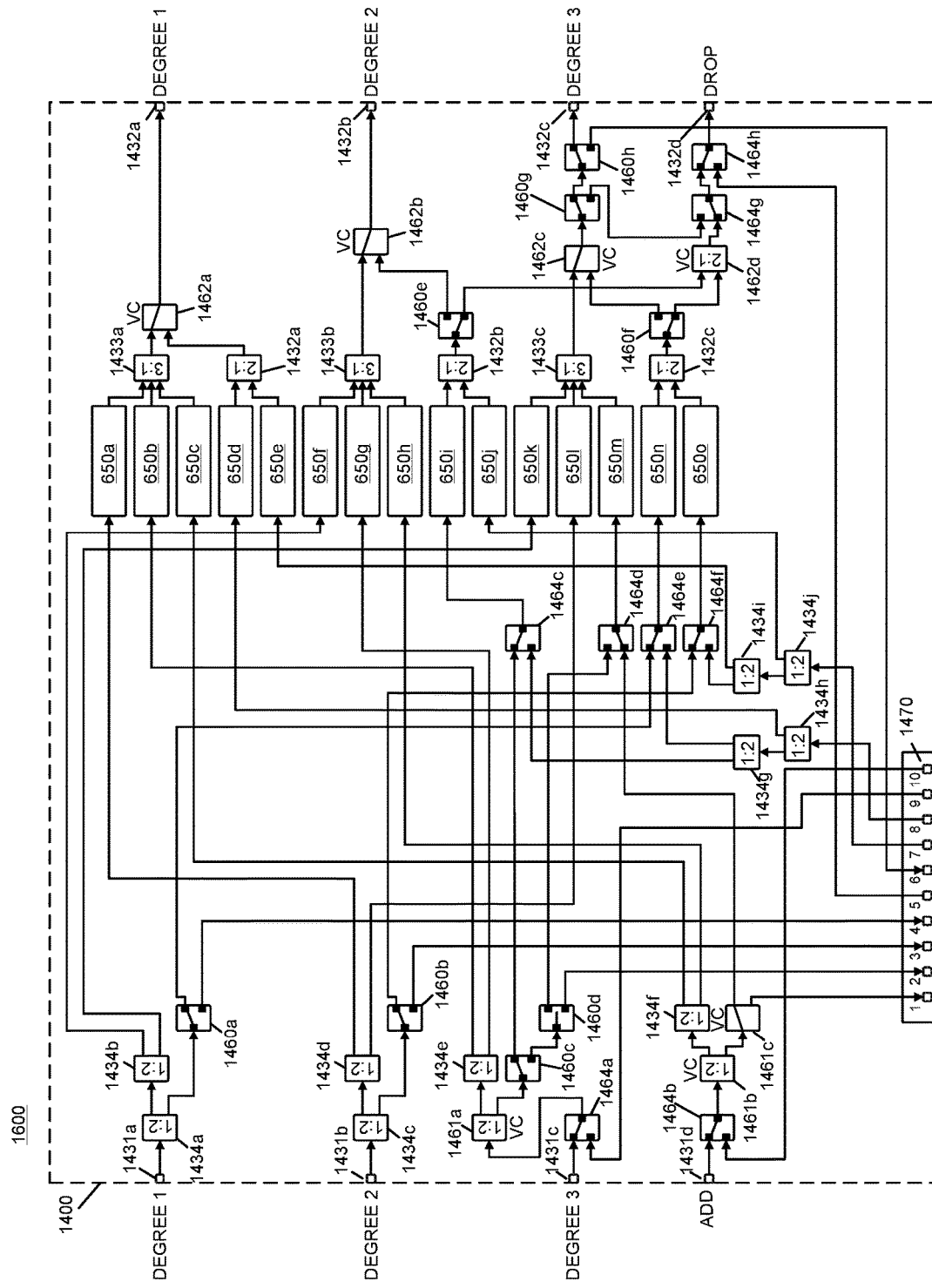
FIG. 16 illustrates the use of the FIG. 14 software programmable ROADM to construct a three-degree optical node with a single directionless add/drop port.

FIG. 16 illustrates the use of the software programmable ROADM 1400 in the three-degree node configuration 1600. This application requires a single software programmable ROADM 1400. The software programmable ROADM 1400 can be configured (i.e., programmed via software) to form a three-degree optical node with one directionless add/drop port. The directionless add/drop port 1431*d*/1432*d* may be connected to an optical multiplexer/demultiplexer (such as 585*a-b*) in order to filter the wavelengths of the add/drop port. In FIG. 16, primary optical input 1431*a* is the DEGREE 1 input, primary optical input 1431*b* is the DEGREE 2 input, primary optical input 1431*c* is the DEGREE 3 input, primary optical output 1432*a* is the DEGREE 1 output, primary optical output 1432*b* is the DEGREE 2 output, and primary optical output 1432*c* is the DEGREE 3 output. For the three-degree node with one directionless add/drop port, the DEGREE 1 output WSS must be able to select wavelengths from the DEGREE 2 input 1431*b* and the DEGREE 3 input 1431*c* and the ADD input 1431*d*. Therefore, a copy of the wavelengths applied to primary inputs 1431*b-d* must be forwarded to the DEGREE 1 output WSS. Since the DEGREE 1 output WSS is required to select wavelengths from three WDM signals, a 3×1 WSS needs to be formed and connected to the DEGREE 1 output 1432a. This 3×1 WSS is formed from wavelength equalizers 650a-c and coupler 1433a. Wavelength equalizer 650a selects wavelengths from the DEGREE 2 input 1431b, wavelength equalizer 650b selects wavelengths from the DEGREE 3 input 1431c, and wavelength equalizer 650c selects wavelengths from the ADD input 1431d. A copy of the wavelengths from the DEGREE 2 input are forwarded to wavelength equalizer 650a via couplers 1434c and 1434d, while a copy of the wavelengths from the DEGREE 3 input are forwarded to wavelength equalizer 650b via couplers 1461a and 1434e, and a copy of the wavelengths from the ADD input are forwarded to wavelength equalizer 650c via couplers 1461b and 1434f. Additionally, waveguide switch 1464a is configured (i.e., software programmed) to attach the DEGREE 3 input 1431c to the input of coupler 1461a, and similarly, waveguide switch 1464b is configured (i.e., software programmed) to attach the ADD input 1431d to the input of coupler 1461b. Since only a 3×1 WSS is needed for the DEGREE 1 output, variable coupler 1462a is configured (i.e., software programmed) to forward all of the light from coupler 1433a to output 1432a, and no light from optical coupler 1432a is forwarded to output 1432a. When programmed in this way, coupler 1462a acts like a waveguide switch, and therefore is depicted as a switch in FIG. 16.

For the three-degree node with one directionless add/drop port, the DEGREE 2 output WSS must be able to select wavelengths from the DEGREE 1 input 1431a and the DEGREE 3 input 1431c and the ADD input 1431d. Therefore, a copy of the wavelengths applied to primary inputs 143a,c-d must be forwarded to the DEGREE 2 output WSS. Since the DEGREE 2 output WSS is required to select wavelengths from three WDM signals, a 3×1 WSS needs to be formed and connected to the DEGREE 2 output 1432b. This 3×1 WSS is formed from wavelength equalizers 650f-h and coupler 1433b. Wavelength equalizer 650f selects wavelengths from the DEGREE 1 input 1431a, wavelength equalizer 650g selects wavelengths from the DEGREE 3 input 1431c, and wavelength equalizer 650h selects wavelengths from the ADD input 1431d. A copy of the wavelengths from the DEGREE 1 input are forwarded to wavelength equalizer 650f via couplers 1434a and 1434b, while a copy of the wavelengths from the DEGREE 3 input are forwarded to wavelength equalizer 650g via couplers 1461a and 1434e, and a copy of the wavelengths from the ADD input are forwarded to wavelength equalizer 650h via couplers 1461b and 1434f. Additionally, waveguide switch 1464a is configured (i.e., software programmed) to attach the DEGREE 3 input 1431c to the input of coupler 1461a, and similarly, waveguide switch 1464b is configured (i.e., software programmed) to attach the ADD input 1431d to the input of coupler 1461b. Since only a 3×1 WSS is needed for the DEGREE 2 output, variable coupler 1462b is configured (i.e., software programmed) to forward all of the light from coupler 1433b to output 1432b, and no light from optical coupler 1432b is forwarded to output 1432b. When programmed in this way, coupler 1462b acts like a waveguide switch, and therefore is depicted as a switch in FIG. 16.

For the three-degree node with one directionless add/drop port, the DEGREE 3 output WSS must be able to select wavelengths from the DEGREE 1 input 1431a and the DEGREE 2 input 1431b, and the ADD input 1431d. Therefore, a copy of the wavelengths applied to primary inputs 143a-b,d must be forwarded to the DEGREE 3 output WSS. Since the DEGREE 3 output WSS is required to select wavelengths from tthree WDM signals, a 3×1 WSS needs to be formed and connected to the DEGREE 3 output 1432c. This 3×1 WSS is formed from wavelength equalizers 650k-m and coupler 1433c. Wavelength equalizer 650k selects wavelengths from the DEGREE 1 input 1431a, wavelength equalizer 650l selects wavelengths from the DEGREE 2 input 1431b, and wavelength equalizer 650m selects wavelengths from the ADD input 1431d. A copy of the wavelengths from the DEGREE 1 input are forwarded to wavelength equalizer 650k via couplers 1434a and 1434b, while a copy of the wavelengths from the DEGREE 2 input are forwarded to wavelength equalizer 650l via couplers 1434c and 1434d, and a copy of the wavelengths from the ADD input are forwarded to wavelength equalizer 650l via couplers 1461b and 1461c. In addition, waveguide switch 1464d must be configured (i.e., software programmed) to connect the output of coupler 1461c to the input of wavelength equalizer 650m. Since, in this application, the variable coupler 1461c is not required to forward a copy of the ADD wavelengths to the secondary optical connectors 1470, coupler 1461c is configured to forward all its inputted optical power towards waveguide switch 1464d. By doing so, the OSNR (optical signal to noise ratio) performance of the node increases, due to lessening amplification needs. Since both outputs of coupler 1461b are used, variable coupler 1461b is configured (i.e., software programmed) to be a two-to-one coupler, wherein the optical power of the WDM signal inputted to coupler 1461b is split between the two outputs of the coupler. For this case more optical power is forwarded to coupler 1434f than coupler 1461c, as the power sent to coupler 1434f must be further split between its two outputs. Since the DEGREE 3 output only requires a 3×1 WSS variable coupler 1462c is configured (i.e., software programmed) to forward all of the light from coupler 1433c to waveguide switch 1460g, and no light from optical coupler 1432c is forwarded to switch 1460g. When programmed in this way, coupler 1462c acts like a waveguide switch, and therefore is depicted as a switch in FIG. 16. Waveguide switches 1460g-h connects the output of coupler 1462c to the DEGREE 3 output 1432c.

For the three-degree node with one directionless add/drop port, the DROP output WSS must be able to select wavelengths from the DEGREE 1 input 1431a, the DEGREE 2 input 1431b, and the DEGREE 3 input 1431c. Therefore, a copy of the wavelengths applied to primary inputs 143a-c must be forwarded to the DROP output WSS. Since the DROP output WSS is required to select wavelengths from three WDM signals, a 3×1 WSS needs to be formed and connected to the DROP output 1432d. This 3×1 WSS is formed from wavelength equalizers 650i,n-o and couplers 1432b, 1432c, and 1462d. Wavelength equalizer 650n selects wavelengths from the DEGREE 1 input 1431a, while wavelength equalizer 650o selects wavelengths from the DEGREE 2 input 1431b, and wavelength equalizer 650i selects wavelengths from the DEGREE 3 input 1431c. A copy of the wavelengths from the DEGREE 1 input are forwarded to wavelength equalizer 650n via coupler 1434a and waveguide switches 1460a and 1464e, while a copy of the wavelengths from the DEGREE 2 input are forwarded to wavelength equalizer 650o via coupler 1434c and waveguide switches 1460b and 1464f, and a copy of the wavelengths from the DEGREE 3 input are forwarded to wavelength equalizer 650i via coupler 1461a and waveguide switches 1460c and 1464c. Since wavelength equalizer 650j is not used in this application, system performance could be improved by replacing fixed ratio coupler 1432b with a variable ratio coupler. Since variable coupler 1462d combines optical signals from both of its inputs, variable coupler 1462d is configured to be a two-to-one coupler and not a switch (as was done in the application of FIG. 15). Waveguide switches 1460e-f are configured to forward WDM signals to the coupler 1462d, while waveguide switches 1464g-h connects the output of coupler 1462d to the DROP output 1432d.

For the three-degree node with one directionless add/drop port, wavelength equalizers 650d-e,i, couplers 1434g-j, 1432a, and waveguide switches 1460d are not used.

Figure 17A:
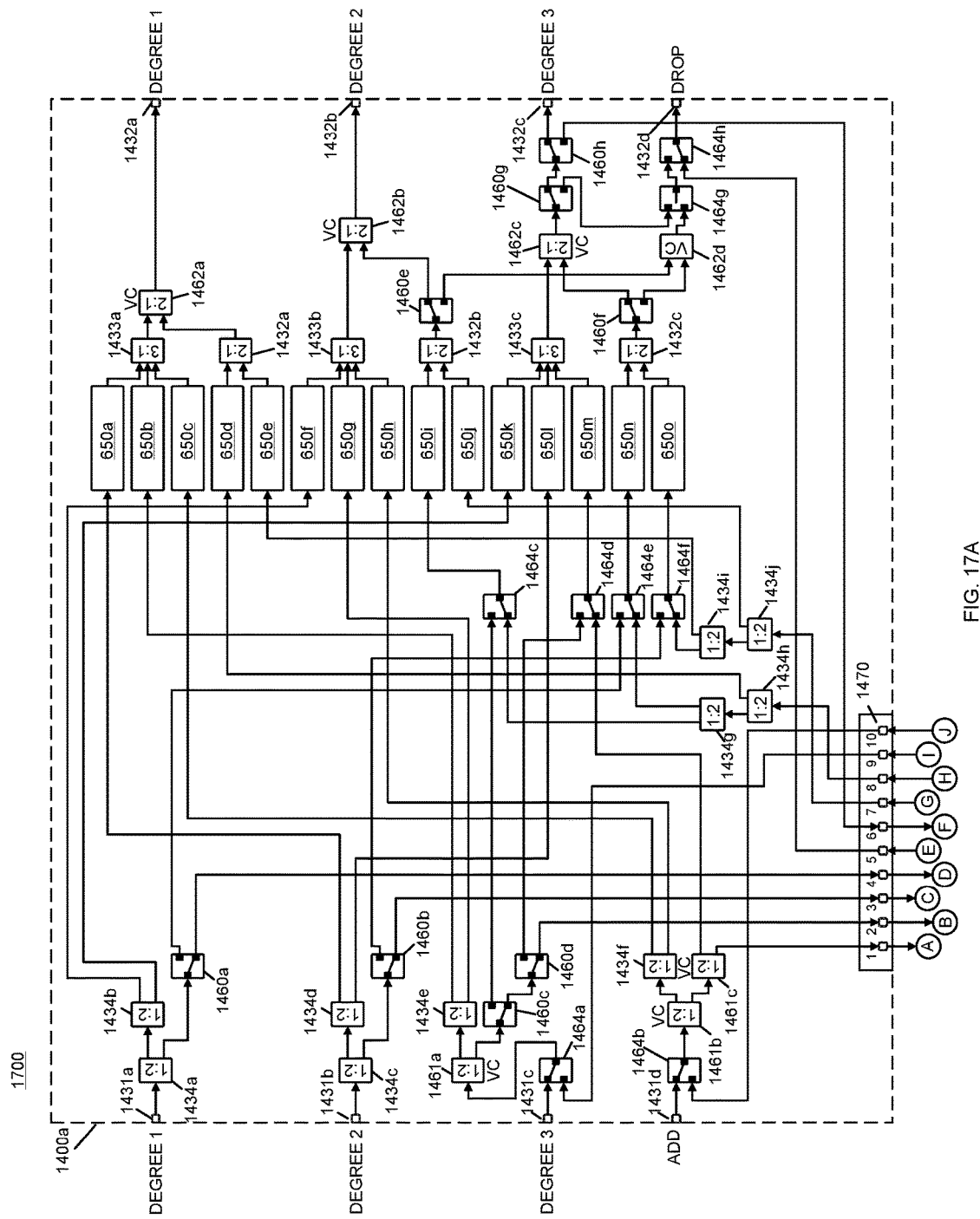
FIGS. 17A and 17B illustrate the use of two FIG. 14 software programmable ROADMs to construct a five-degree optical node with a single directionless add/drop port.
Figure 17B:
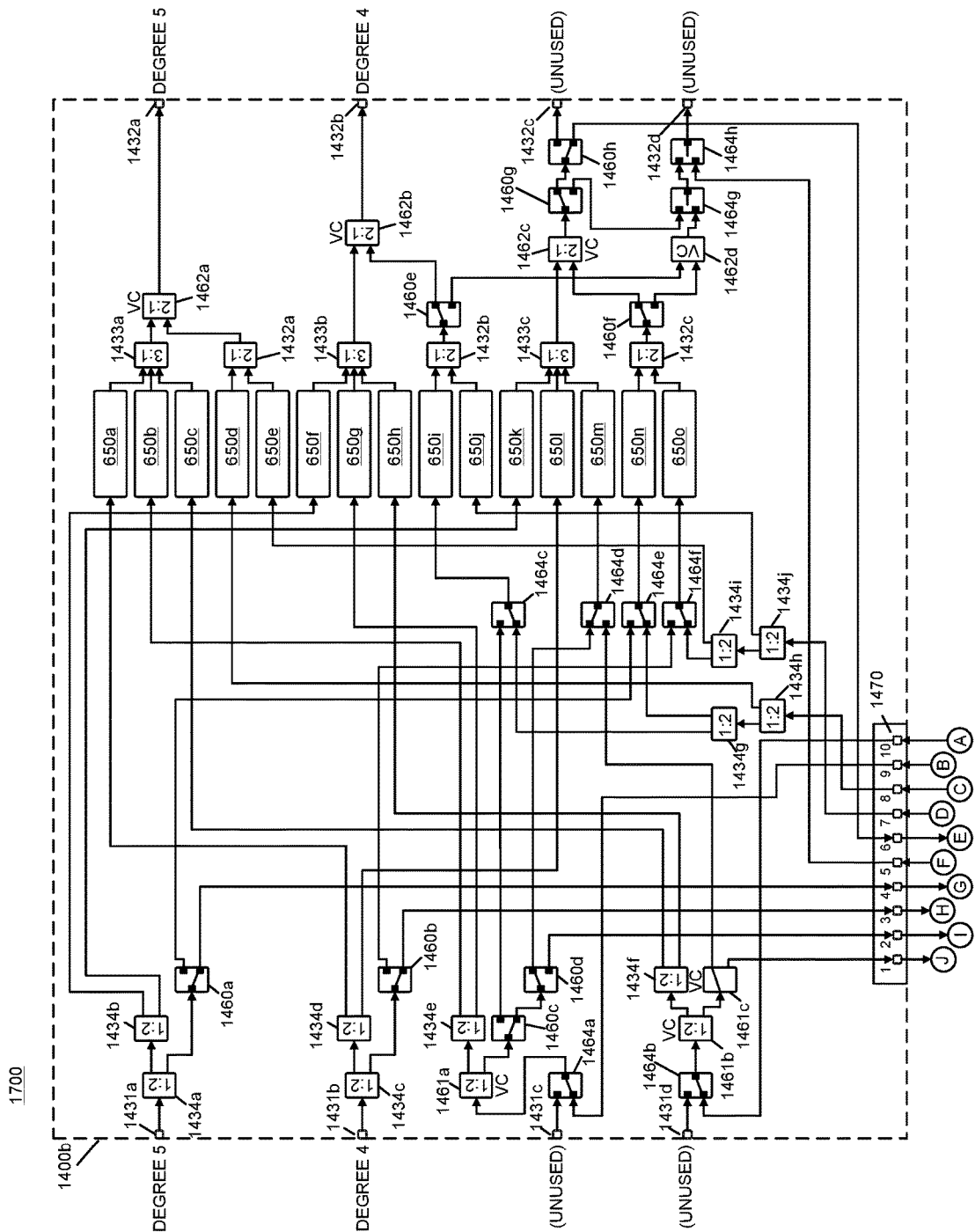

FIG. 17A and FIG. 17B illustrate the use of the software programmable ROADM 1400 in the five-degree node configuration 1700. This application requires a two software programmable ROADMs 1400. Software programmable ROADM 1400a provides interfaces for DEGREE 1, DEGREE 2, DEGREE 3, and the ADD/DROP port, while software programmable ROADM 1400b provides interfaces for DEGREE 4 and DEGREE 5. This partitioning of resources allows for the expansion from a three-degree optical node to a five degree optical node without the need to physically move the optical cables attached to the DEGREE 1, DEGREE 2, DEGREE 3, and the ADD/DROP optical ports of the first software programmable ROADM 1400a. If the secondary optical input output ports 1470 are implemented with a single MPO/MPT (Multiple-Fiber Push-On/Pull-Off) connector, then expanding a three-degree node to a five-degree node only requires adding a second software programmable ROADM 1400b and attaching a single Type B MPO/MTP cable between the two MPO/MTP ports 1470 of the two software programmable ROADMs 1400a-b. The Type B cable performs the optical signal cross needed to connect the two software programmable ROADMs 1400a-b according to the labeling of the 1470 signals illustrated in FIG. 17A and 17B. As shown, pin 1 of 1470 of 1400a is connected to pin 10 of 1470 of 1400b, pin 2 of 1470 of 1400a is connected to pin 9 of 1470 of 1400b, etc. (as illustrated via the lettering signal interconnects A-J).

Although only half of the primary optical inputs and outputs are utilized on the second software programmable ROADM 1400b, all of the wavelength equalizers on both ROADMs are used. Accordingly, the wavelength equalizers on ROADM 1400a are used to generate the DEGREE 1, DEGREE 2, and DEGREE 3 output signals, while the wavelength equalizers on ROADM 1400b are used to generate the DEGREE 4, DEGREE 5, and DROP output signals. The DROP output signal generated by the wavelength equalizers on ROADM 1400b in FIG. 17B is sent to the ROADM 1400a via the "E" optical signal of 1470 connecting the two ROADMs.

The input optical signals applied to primary optical inputs 1431a-d of 1400a of FIG. 17A are forwarded to 1400b of FIG. 17B via 1470. Similarly, the input optical signals applied to primary optical inputs 1431a-b of 1400b of FIG. 17B are forwarded to 1400a of FIG. 17A via 1470. In FIG. 17A, waveguide switches 1460a-d and variable optical couplers 1461b-c are configured (i.e., software programmed) to forward the input signals applied to inputs 1431a-d to 1470, while in FIG. 17B, waveguide switches 1460a-b are configured (i.e., software programmed) to forward the input signals applied to inputs 1431a-b to 1470. This results in coupler 1434j in FIG. 17A receiving the input signal applied to DEGREE 5, and coupler 1434h in FIG. 17A receiving the input signal applied to DEGREE 4, and waveguide switch 1464b in FIG. 17B receiving the input signal applied to ADD, and waveguide switch 1464a in FIG. 17B receiving the input signal applied to DEGREE 3, and coupler 1434h in FIG. 17B receiving the input signal applied to DEGREE 2, and coupler 1434j in FIG. 17B receiving the input signal applied to DEGREE 1. This exchange of primary input signals between the two ROADMs 1400a-b provides access to all six primary optical inputs signals (i.e., DEGREE 1 to 5, and ADD) on both 1400a and 1400b.

For the five-degree node with one directionless add/drop port, the DEGREE 1 output WSS must be able to select wavelengths from the DEGREE 2 input, the DEGREE 3 input, the DEGREE 4 input, the DEGREE 5 input, and the ADD input. The 5×1 WSS needed to support the DEGREE 1 output is formed from wavelength equalizers 650a-e and couplers 1433a, 1432b and 1462a in FIG. 17A. In FIG. 17A, wavelength equalizer 650a selects wavelengths from the DEGREE 2 input, wavelength equalizer 650b selects wavelengths from the DEGREE 3 input, wavelength equalizer 650c selects wavelengths from the ADD input, wavelength equalizer 650d selects wavelengths from the DEGREE 4 input (via coupler 1434h), wavelength equalizer 650e selects wavelengths from the DEGREE 5 input (via coupler 1434j). In a similar manner, the 5×1 WSS needed to support the DEGREE 2 output is formed from wavelength equalizers 650f-j in FIG. 17A, the 5×1 WSS needed to support the DEGREE 3 output is formed from wavelength equalizers 650k-o in FIG. 17A, the 5×1 WSS needed to support the DEGREE 5 output is formed from wavelength equalizers 650a-e in FIG. 17B, the 5×1 WSS needed to support the DEGREE 4 output is formed from wavelength equalizers 650f-j in FIG. 17B, and the 5×1 WSS needed to support the DROP output is formed from wavelength equalizers 650k-o in FIG. 17B. The waveguide switch settings and variable coupler settings to support the routing of input signals to the various wavelength equalizers are shown in FIG. 17A and 17B. FIG. 17A and FIG. 17B also illustrate the settings of the waveguide switches and variable couplers to route the signals from the wavelength equalizers. Table 2 summarizes which signals are used to generate each output signal, and the corresponding wavelength equalizers for the five-degree node with one directionless add/drop port of FIG. 17A and FIG.17B.

TABLE 2

Five Degrees & One Add/Drop Port

| Output Signal | Wavelength Equalizers Used & Corresponding Input Signal | | | | |
|---|---|---|---|---|---|
| DEGREE 1 | 650a of 1400a (DEGREE 2) | 650b of 1400a (DEGREE 3) | 650c of 1400a (ADD) | 650d of 1400a (DEGREE 4) | 650e of 1400a (DEGREE 5) |
| DEGREE 2 | 650f of 1400a (DEGREE 1) | 650g of 1400a (DEGREE 3) | 650h of 1400a (ADD) | 650i of 1400a (DEGREE 4) | 650j of 1400a (DEGREE 5) |
| DEGREE 3 | 650k of 1400a (DEGREE 1) | 650l of 1400a (DEGREE 2) | 650m of 1400a (ADD) | 650n of 1400a (DEGREE 4) | 650o of 1400a (DEGREE 5) |
| DEGREE 5 | 650a of 1400b (DEGREE 4) | 650b of 1400b (DEGREE 3) | 650c of 1400b (ADD) | 650d of 1400b (DEGREE 2) | 650e of 1400b (DEGREE 1) |
| DEGREE 4 | 650f of 1400b (DEGREE 5) | 650g of 1400b (DEGREE 3) | 650h of 1400b (ADD) | 650i of 1400b (DEGREE 2) | 650j of 1400b (DEGREE 1) |
| DROP | 650k of 1400b (DEGREE 5) | 650l of 1400b (DEGREE 4) | 650m of 1400b (DEGREE 3) | 650n of 1400b (DEGREE 2) | 650o of 1400b (DEGREE 1) |

In FIG. 17A and FIG. 17B, for the five-degree node with one add/drop port node 1700, coupler 1462d of 1400a, and waveguide switch 1464g of 1400a are not used, and coupler 1462d of 1400b, and waveguide switch 1464g of 1400b are not used.

Figure 18A:
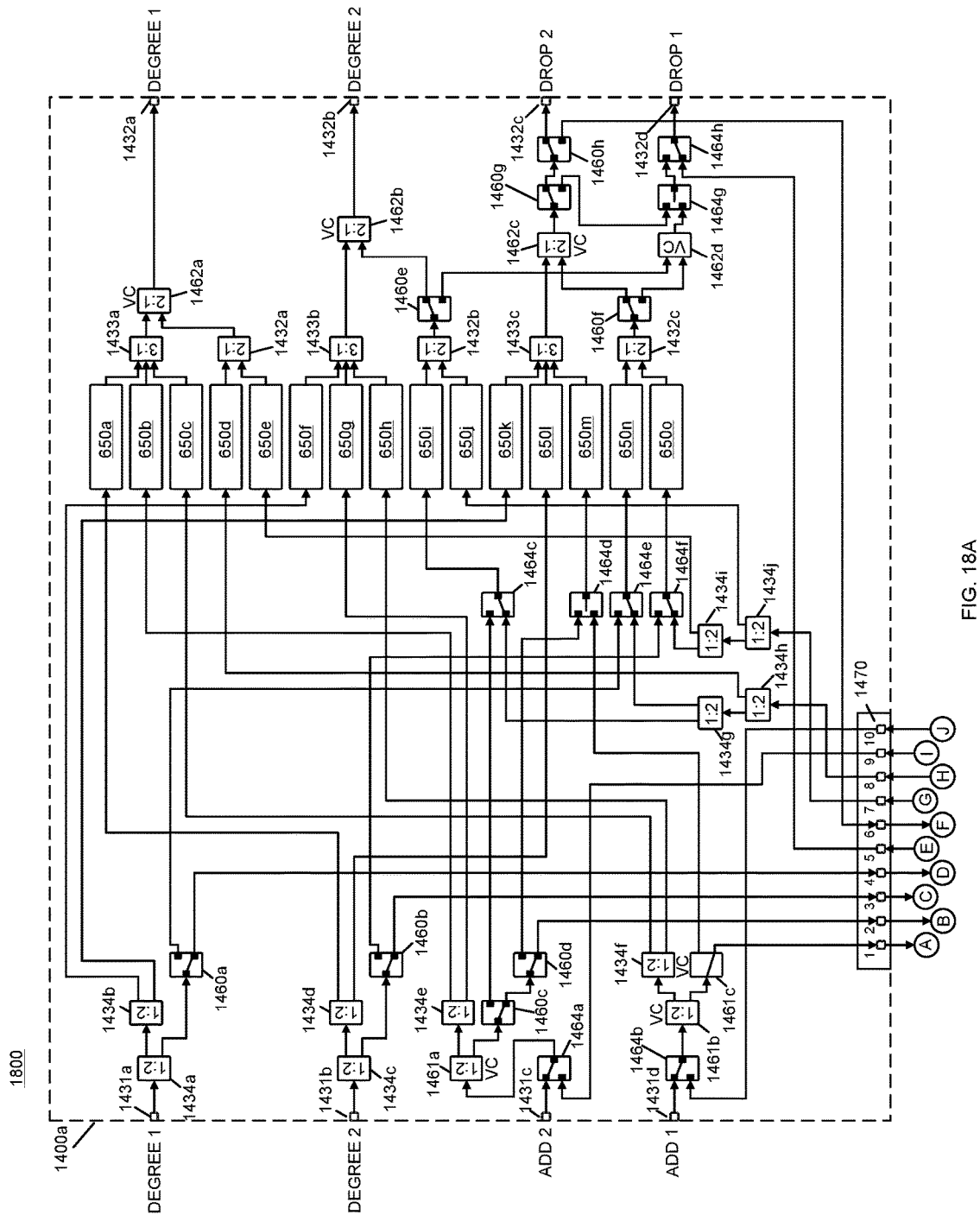
FIGS. 18A and 18B illustrate the use of two FIG. 14 software programmable ROADMs to construct a four-degree optical node with two directionless add/drop ports.
Figure 18B:
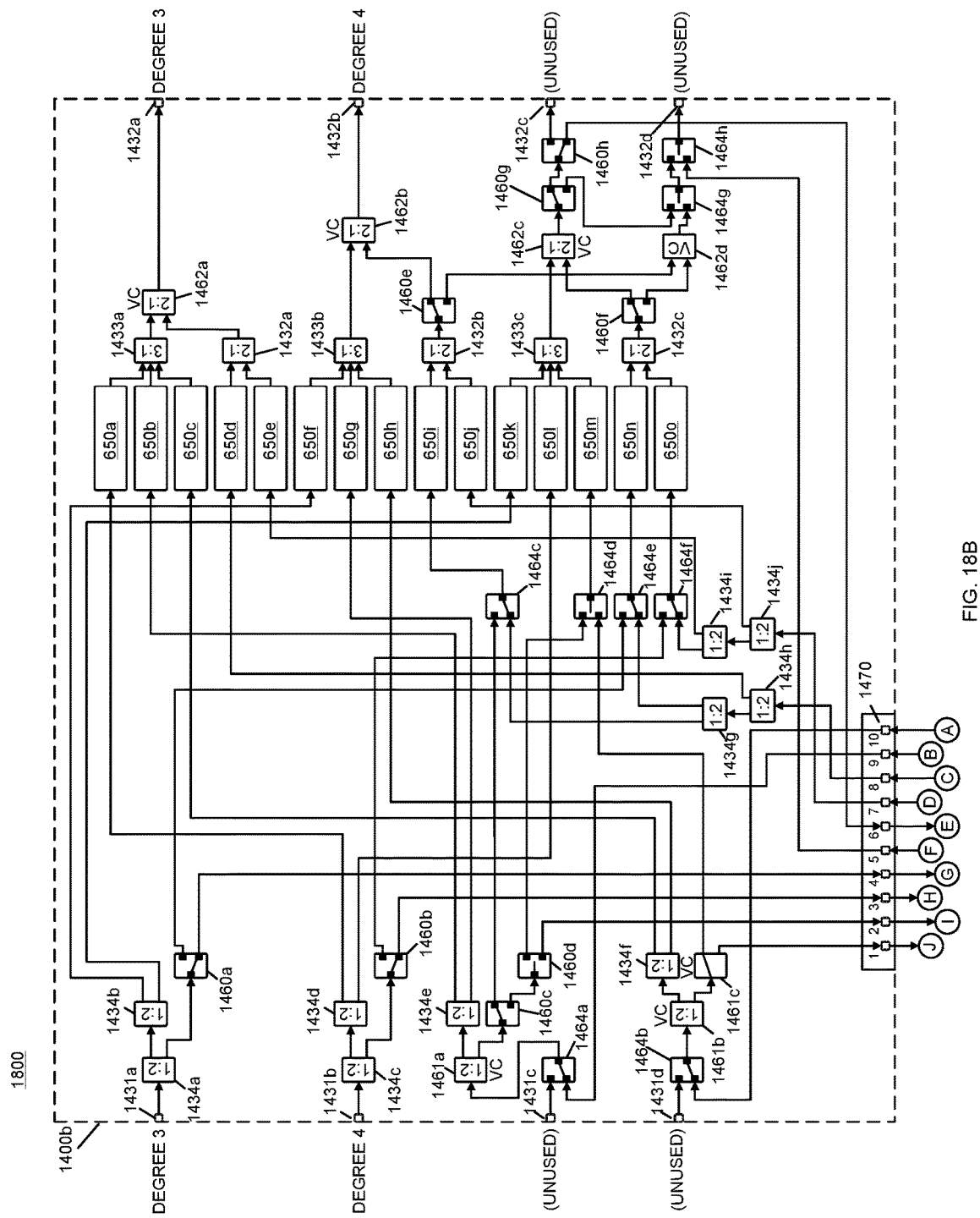

FIG. 18A and FIG. 18B illustrate the use of the software programmable ROADM 1400 in a first four-degree and two directionless add/drop ports node configuration 1800, requiring two software programmable ROADMs 1400. Software programmable ROADM 1400a provides interfaces for DEGREE 1, DEGREE 2, ADD/DROP port 1, and ADD/DROP port 2, while software programmable ROADM 1400b provides interfaces for DEGREE 3 and DEGREE 4. This partitioning of resources allows for the expansion from a two-degree optical node with two add/drop ports to a four-degree optical node without the need to physically move the optical cables attached to the DEGREE 1, DEGREE 2, ADD/DROP 1, and ADD/DROP 2 optical ports of the first software programmable ROADM 1400a. In this configuration, the wavelength equalizers used to generate the DROP 1 signal exiting 1400a reside on 1400b. Table 3 summarizes which signals are used to generate each output signal, and the corresponding wavelength equalizers for the four-degree node with two directionless add/drop ports of FIG. 18A and FIG. 18B.

TABLE 3

Four Degrees & Two Add/Drop Ports (Version 1)

| Output Signal | Wavelength Equalizers Used & Corresponding Input Signal | | | | |
| --- | --- | --- | --- | --- | --- |
| DEGREE 1 | 650a of 1400a (DEGREE 2) | 650b of 1400a (ADD 2) | 650c of 1400a (ADD 1) | 650d of 1400a (DEGREE 4) | 650e of 1400a (DEGREE 3) |
| DEGREE 2 | 650f of 1400a (DEGREE 1) | 650g of 1400a (ADD 2) | 650h of 1400a (ADD 1) | 650i of 1400a (DEGREE 4) | 650j of 1400a (DEGREE 3) |
| DROP 2 | 650k of 1400a (DEGREE 1) | 650l of 1400a (DEGREE 2) | 650m of 1400a (UNUSED) | 650n of 1400a (DEGREE 4) | 650o of 1400a (DEGREE 3) |
| DEGREE 3 | 650a of 1400b (DEGREE 4) | 650b of 1400b (ADD 2) | 650c of 1400b (ADD 1) | 650d of 1400b (DEGREE 2) | 650e of 1400b (DEGREE 1) |
| DEGREE 4 | 650f of 1400b (DEGREE 3) | 650g of 1400b (ADD 2) | 650h of 1400b (ADD 1) | 650i of 1400b (DEGREE 2) | 650j of 1400b (DEGREE 1) |
| DROP 1 | 650k of 1400b (DEGREE 3) | 650l of 1400b (DEGREE 4) | 650m of 1400b (UNUSED) | 650n of 1400b (DEGREE 2) | 650o of 1400b (DEGREE 1) |

The waveguide switch settings and variable coupler settings for the first version of the four-degree node with two add/drop ports are shown in FIG. 18A and FIG. 18B.

In FIG. 18A, wavelength equalizer 650m, coupler 1462d, and waveguide switches 1464d,g are not used. In FIG. 18B, wavelength equalizer 650m, coupler 1462d, and waveguide switches 1464d,g are not used.

Figure 19A:
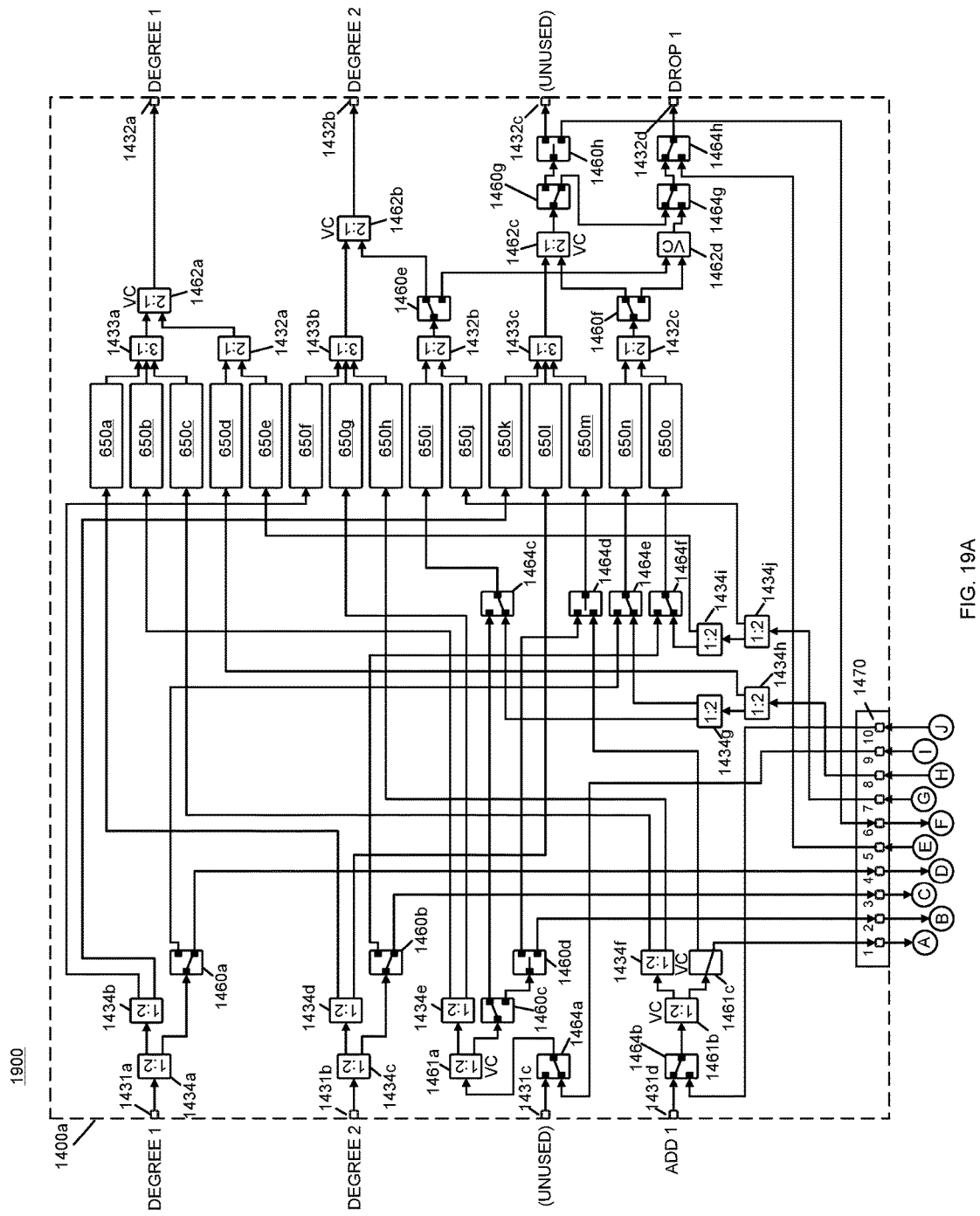
FIGS. 19A and 19B illustrate the use of two FIG. 14 software programmable ROADMs to construct another version of a four-degree optical node with two directionless add/drop ports.
Figure 19B:
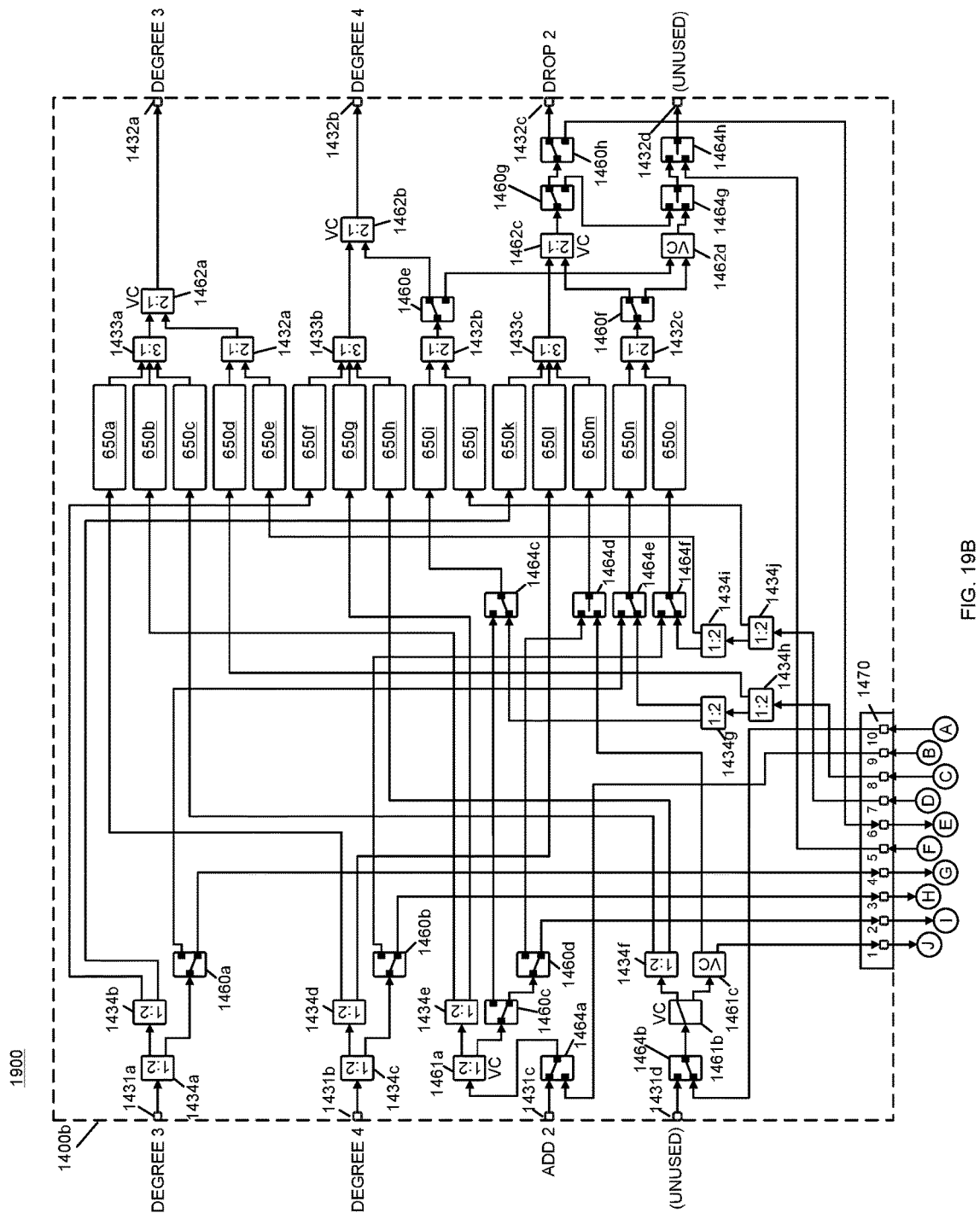

FIG. 19A and FIG. 19B illustrate the use of the software programmable ROADM 1400 in a second four-degree and two directionless add/drop ports node configuration 1900, requiring two software programmable ROADMs 1400. Software programmable ROADM 1400a provides interfaces for DEGREE 1, DEGREE 2, and ADD/DROP port 1, while software programmable ROADM 1400b provides interfaces for DEGREE 3, DEGREE 4, and ADD/DROP port 2. Table 4 summarizes which signals are used to generate each output signal, and the corresponding wavelength equalizers for the four-degree node with two directionless add/drop ports of FIG. 19A and FIG. 19B. Inspection of Table 4 shows it to be identical to Table 3.

In FIG. 19A, wavelength equalizer 650m, coupler 1462d, and waveguide switches 1464d,g are not used. In FIG. 19B, wavelength equalizer 650m, coupler 1462d, and waveguide switches 1464d,g are not used.

TABLE 4

Four Degrees & Two Add/Drop Ports (Version 2)

| Output Signal | Wavelength Equalizers Used & Corresponding Input Signal | | | | |
| --- | --- | --- | --- | --- | --- |
| DEGREE 1 | 650a of 1400a (DEGREE 2) | 650b of 1400a (ADD 2) | 650c of 1400a (ADD 1) | 650d of 1400a (DEGREE 4) | 650e of 1400a (DEGREE 3) |
| DEGREE 2 | 650f of 1400a (DEGREE 1) | 650g of 1400a (ADD 2) | 650h of 1400a (ADD 1) | 650i of 1400a (DEGREE 4) | 650j of 1400a (DEGREE 3) |
| DROP 1 | 650k of 1400a (DEGREE 1) | 650l of 1400a (DEGREE 2) | 650m of 1400a (UNUSED) | 650n of 1400a (DEGREE 4) | 650o of 1400a (DEGREE 3) |

TABLE 4-continued

Four Degrees & Two Add/Drop Ports (Version 2)

| Output Signal | Wavelength Equalizers Used & Corresponding Input Signal | | | | |
|---|---|---|---|---|---|
| DEGREE 3 | 650a of 1400b (DEGREE 4) | 650b of 1400b (ADD 2) | 650c of 1400b (ADD 1) | 650d of 1400b (DEGREE 2) | 650e of 1400b (DEGREE 1) |
| DEGREE 4 | 650f of 1400b (DEGREE 3) | 650g of 1400b (ADD 2) | 650h of 1400b (ADD 1) | 650i of 1400b (DEGREE 2) | 650j of 1400b (DEGREE 1) |
| DROP 2 | 650k of 1400b (DEGREE 3) | 650l of 1400b (DEGREE 4) | 650m of 1400b (UNUSED) | 650n of 1400b (DEGREE 2) | 650o of 1400b (DEGREE 1) |

Each of the two software programmable ROADMs 1100 and 1400 can be used to construct optical nodes of various sizes and configurations. Both software programmable ROADM 1100 and 1400 can be programmed to at least two different configurations in order to create optical nodes of at least two different sizes. In general, a software programmable ROADM comprises a plurality of wavelength switches (650a-j for 1100, and 650a-o for 1400), and a plurality of waveguide switches (1135a-d & 1136a-d for 1100, and 1460a-h & 1464a-h for 1400). For both 1100 and 1400, when the plurality of waveguide switches are set to a first switch configuration, the software programmable ROADM provides n degrees of an n-degree optical node, and when the waveguide switches are set to a second switch configuration, the software programmable ROADM provides k degrees of an m-degree optical node, where n>1, and where m>n, and where k>0, and where the second switch configuration is different from the first switch configuration. It can also be seen that when the plurality of waveguide switches of the software programmable ROADM are set to the first switch configuration, the software programmable ROADM provides wavelength switching for n degrees of the n-degree optical node, and wherein when the waveguide switches are set to the second switch configuration, the software programmable ROADM provides wavelength switching for k degrees of the m-degree optical node.

For software programmable ROADM 1100, the waveguide switches can be set (i.e., programmed) to a first switch configuration as shown in FIG. 12 in order to provide three degrees of a three-degree node (n=3). The waveguide switches of 1100 can also be set (i.e., programmed) to a second switch configuration as shown in FIG. 13 (1100a) in order to provide two degrees (k=2) of a four-degree node (m=4). For this case, m−n=4−3=1.

For software programmable ROADM 1400, the waveguide switches can be set (i.e., programmed) to a first switch configuration as shown in FIG. 15 in order to provide two degrees of a two-degree node (n=2). The waveguide switches of 1400 can also be set (i.e., programmed) to a second switch configuration as shown in FIG. 18A (1400a) in order to provide two degrees (k=2) of a four-degree node (m=4). For this case, m−n=4−2=2, and so m−n>1. Also, for this case k=n=2.

For software programmable ROADM 1400, the waveguide switches can be set (i.e., programmed) to a first switch configuration as shown in FIG. 15 in order to provide two degrees of a two-degree node (n=2). The waveguide switches of 1400 can also be set (i.e., programmed) to a second switch configuration as shown in FIG. 19A (1400a) in order to provide two degrees (k=2) of a four-degree node (m=4). For this case, m−n=4−2=2, and so m−n>1. Also, for this case k=n=2.

For software programmable ROADM 1400, the waveguide switches can be set (i.e., programmed) to a first switch configuration as shown in FIG. 16 in order to provide three degrees of a three-degree node (n=3). The waveguide switches of 1400 can also be set (i.e., programmed) to a second switch configuration as shown in FIG. 17A (1400a) in order to provide three degrees (k=3) of a five-degree node (m=5). For this case, m−n=5−3=2, and so m−n>1. Also, for this case k=n=3.

For software programmable ROADM 1400, the waveguide switches can be set (i.e., programmed) to a first switch configuration as shown in FIG. 15 in order to provide two degrees of a two-degree node (n=2). The waveguide switches of 1400 can also be set (i.e., programmed) to a second switch configuration (as shown in FIG. 16 in order to provide three degrees (k=3) of a three-degree node (m=3). For this case, m−n=3−2=1. Also, for this case k>n, and k=m.

By examining the various figures, for all of the above examples, the second switch configuration is different from the first switch configuration. Also, the plurality of wavelength switches within the software programmable ROADM are operable to selectively switch individual wavelengths, and the plurality of waveguide switches are not operable to selectively switch individual wavelengths.

For software programmable ROADM applications that require two software programmable ROADMs, when setting the waveguide switches to the second switch configuration, there are three waveguide switch configurations. The first switch configuration is the switch configuration used when the software programmable ROADM is used in a stand-alone ROADM application (such as shown in FIG. 15, or such as shown in FIG. 16). The second switch configuration is the switch configuration used by the first software programmable ROADM of a configuration that uses two software programmable ROADMs. The third switch configuration is the switch configuration used by the second software programmable ROADM of the configuration that uses two software programmable ROADMs.

A first example of the three switch configuration settings is illustrated in FIG. 15, FIG. 18A, and FIG. 18B. For this example, the waveguide switches of soft ROADM 1400 are set to a first switch configuration (as shown in FIG. 15, for the 2-degree node configuration). In FIG. 18A, the waveguide switches are set to a second switch configuration (to provide the first two degrees of the four-degree node). And in FIG. 18B, the waveguide switches are set to a third switch configuration (to provide the second two degrees of the four-degree node). For this example, the third switch configuration is deferent from the second switch configuration. The software programmable ROADM using the third switch configuration (1400b in FIG. 18B) provides two degrees of the four-degree optical node.

A second example of the three switch configuration settings is illustrated in FIG. 16, FIG. 17A, and FIG. 17B. For this example, the waveguide switches of soft ROADM 1400 are set to a first switch configuration (as shown in FIG.

16, for the 3-degree node configuration). In FIG. 17A, the waveguide switches are set to a second switch configuration (to provide the first three degrees of the five-degree node). And in FIG. 17B, the waveguide switches are set to a third switch configuration (to provide the last two degrees of the five-degree node). For this example, the third switch configuration is deferent from the second switch configuration. The software programmable ROADM using the third switch configuration (1400b in FIG. 18B) provides two degrees of the five-degree optical node.

A third example of the three switch configuration settings is illustrated in FIG. 12, FIG. 13A, and FIG. 13B. For this example, the waveguide switches of soft ROADM 1100 are set to a first switch configuration (as shown in FIG. 12, for the 3-degree node configuration). In FIG. 13A, the waveguide switches are set to a second switch configuration (to provide the first two degrees of the four-degree node). And in FIG. 13B, the waveguide switches are set to a third switch configuration (to provide the last two degrees of the four-degree node). For this example, the third switch configuration is identical to the second switch configuration. The software programmable ROADM using the third switch configuration (1100b in FIG. 13B) provides two degrees of the four-degree optical node.

For the above examples, the second software programmable ROADM of the two-ROADM configuration provides m−k degrees of the m-degree optical node. For the first example n=2, m=4, and k=2, and so the second software programmable ROADM provides m−k=4−2=2 degrees. For the second example n=3, m=5, and k=3, and so the second software programmable ROADM provides m−k=5−3=2 degrees. For the third example n=3, m=4, and k=2, and so the second software programmable ROADM provides m−k=4−2=2 degrees.

The presented software programmable ROADMs also provide one or more directionless add/drop ports. In general, an optical degree may be substituted for a directionless add/drop port, or a directionless add/drop port may be substituted for an optical degree. For instance, when the plurality of waveguide switches are set to a first switch configuration, the software programmable ROADM 1400 of FIG. 15 (1500) provides two optical degrees and two directionless add/drop ports, and when the plurality of waveguide switches are set to a second switch configuration, the software programmable ROADM 1400 of FIG. 16 (1600) provides three optical degrees and one directionless add/drop port. In general, it can be stated that, in some cases, when the plurality of waveguide switches of a software programmable ROADM are set to a first switch configuration, the software programmable ROADM provides n degrees and q directionless add/drop ports of an optical node, and wherein when the plurality of waveguide switches are set to a second switch configuration the software programmable ROADM provides n+j degrees and q−j directionless add/drop ports of an optical node, wherein q>0, and wherein j>0. For the example first and second switch configurations of 1500 and 1600, n=2, and q=2, and j=1, so that for the first switch configuration, the software programmable ROADM 1400 provides n=2 degrees and q=2 directionless add/drop ports of an optical node, and when set to the second switch configuration, the software programmable ROADM 1400 provides n+j=2+1=3 degrees and q−j=2−1=1 directionless add/drop port of an optical node.

A method of constructing an optical node having n optical degrees is as follows. For a given software programmable ROADM there is a threshold number of optical degrees i, wherein two software programmable ROADMs must be used to construct the optical node having n optical degrees (rather than just one software programmable ROADM). If the number of optical degree n is less than i, then a single software programmable ROADM can be used to construct the optical node, and the software programmable ROADM will have its set of waveguide switches set to a first configuration to construct the optical node having n number of optical degrees, wherein n<i. However, if the number of optical degrees n is greater than or equal to i, then two software programmable ROADMs must be used to construct the optical node, and the first software programmable ROADM of the two software programmable ROADMs will have its set of waveguide switches set to a second configuration to construct the optical node having n number of optical degrees, wherein n≥i. For the case where n≥i, the second software programmable ROADM used to construct the optical node must have its waveguide switches configured to a third switch configuration. The two software programmable ROADMs used when n≥i may be identical, and they may be optically connected together using a single parallel optical cable. The method described above may simply be stated as, a method of constructing an optical node having n number of optical degrees comprising: configuring a set of waveguide switches to a first switch configuration on a software programmable ROADM) if n<i, and configuring the set of waveguide switches to a second switch configuration on the software programmable ROADM if n≥i. The method further comprises configuring a second set of waveguide switches to a third switch configuration on a second software programmable ROADM if n>i. The method further comprising optically connecting the software programmable ROADM to the second software programmable ROADM using a single parallel optical cable if n≥i.\

Figure 20:
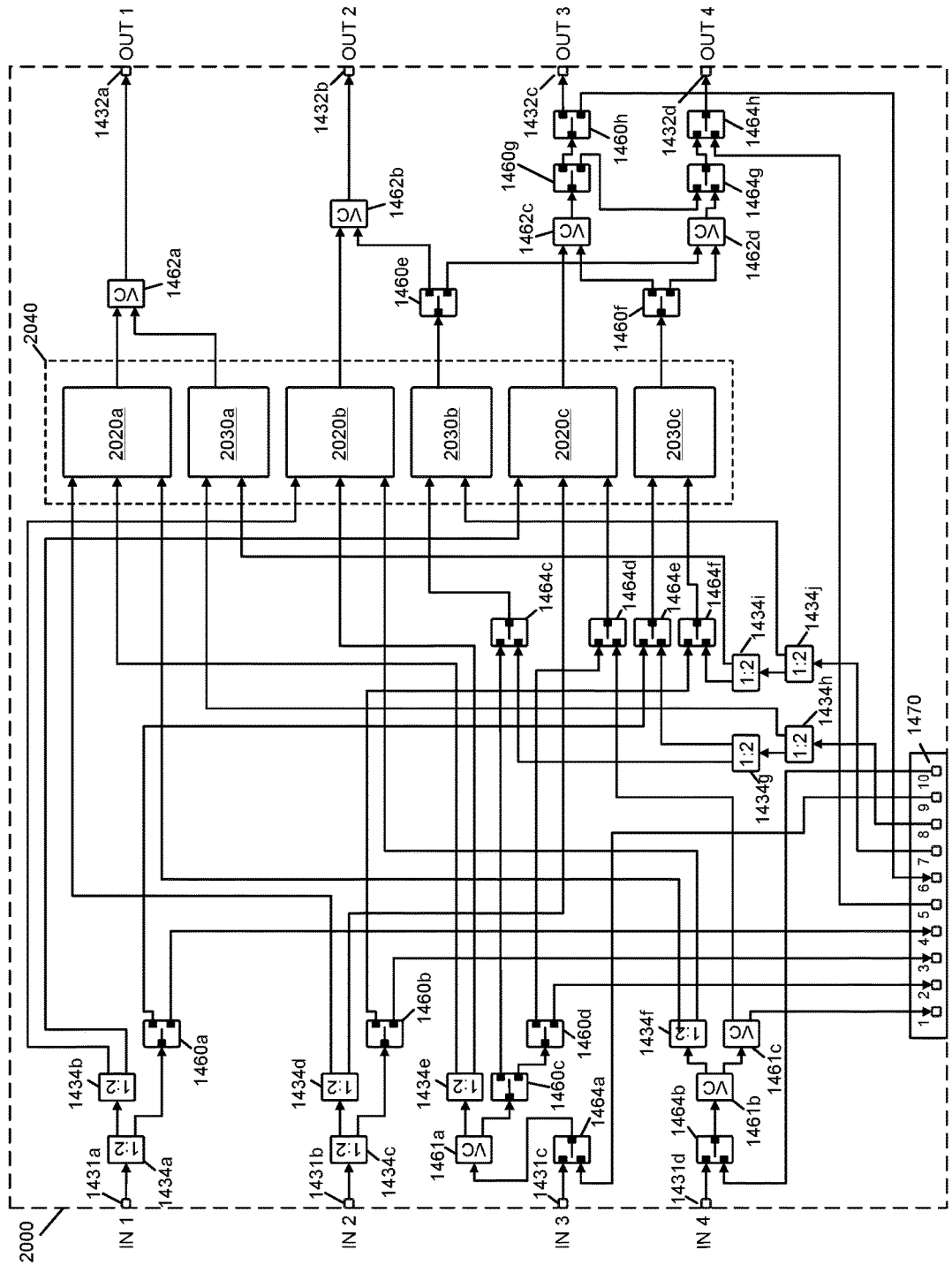
FIG. 20 is an illustration of a second software programmable ROADM used to construct two, three, four, and five-degree optical nodes.

FIG. 20 illustrates a software programmable ROADM 2000 that is identical to the software programmable ROADM 1400, except that the wavelength equalizers (wavelength switches) have been replaced by 3×1 2020a-c and 2×1 2030a-c wavelength selective switches. More specifically, the WSS formed by 650a-c and coupler 1433a has been replaced by 3×1 WSS 2020a, the WSS formed by 650d-e and coupler 1432a has been replaced by 2×1 WSS 2030a, the WSS formed by 650f-h and coupler 1433b has been replaced by 3×1 WSS 2020b, the WSS formed by 650i-j and coupler 1432b has been replaced by 2×1 WSS 2030b, the WSS formed by 650k-m and coupler 1433c has been replaced by 3×1 WSS 2020c, and the WSS formed by 650n-o and coupler 1432c has been replaced by 2×1 WSS 2030c.

The plurality of wavelength switches in the software programmable ROADM 2000 comprises of a set of p×1 wavelength selective switches and a set of r×1 wavelength selective switches, wherein r>p. For the software programmable ROADM 2000, r=3, and p=2. Alternatively, a software programmable ROADM may comprise of a single set of r×1 wavelength selective switches.

Figure 21:
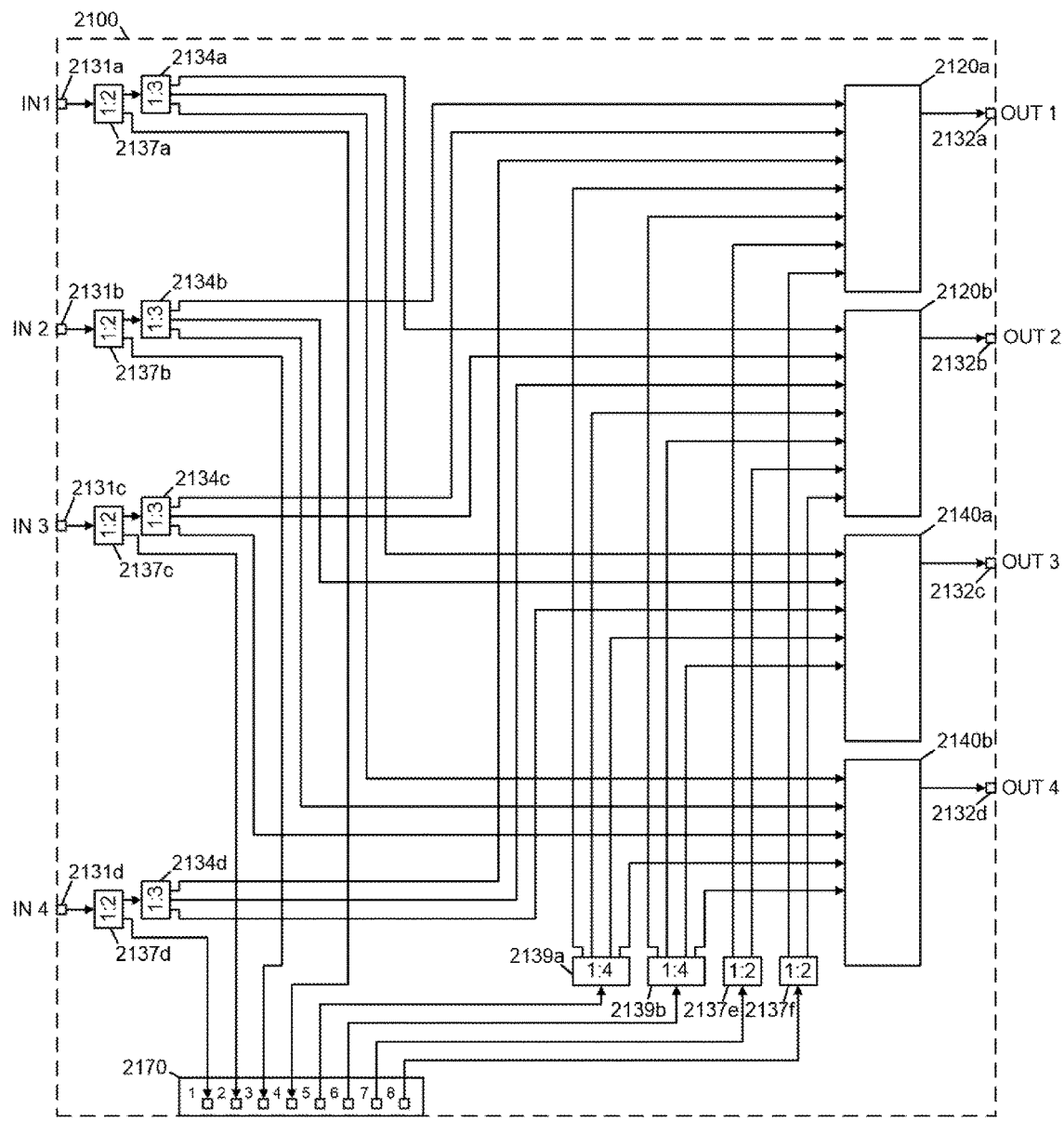
FIG. 21 is an illustration of a ROADM used to construct two, three, four, and five-degree optical nodes.

FIG. 21 is an illustration of ROADM 2100 used to construct two, three, four, and five-degree optical nodes. The ROADM 2100 passively interconnects optical couplers 2137a-f, 2134a-d, 2139a-b, and WSS devices 2120a-b, 2140a-b. For wavelength switching, the ROADM 2100 uses two 7×1 WSS devices and two 5×1 WSS, instead of the fifteen wavelength equalizers used in the software programmable ROADM 1400, and instead of the three 3×1 WSS devices and three 2×1 WSS devices used in software programmable ROADM 2000. Like the ROADM 1400, the ROADM 2100 has four primary optical inputs 2131a-d, four primary optical outputs 2132a-d, and a plurality of secondary optical inputs and outputs 2170. In most of the applications of the ROADM 2100, the wavelength switching capability of the four WSS devices 2120a-b, 2140a-b is very underutilized, as will be illustrated.

Figure 22:
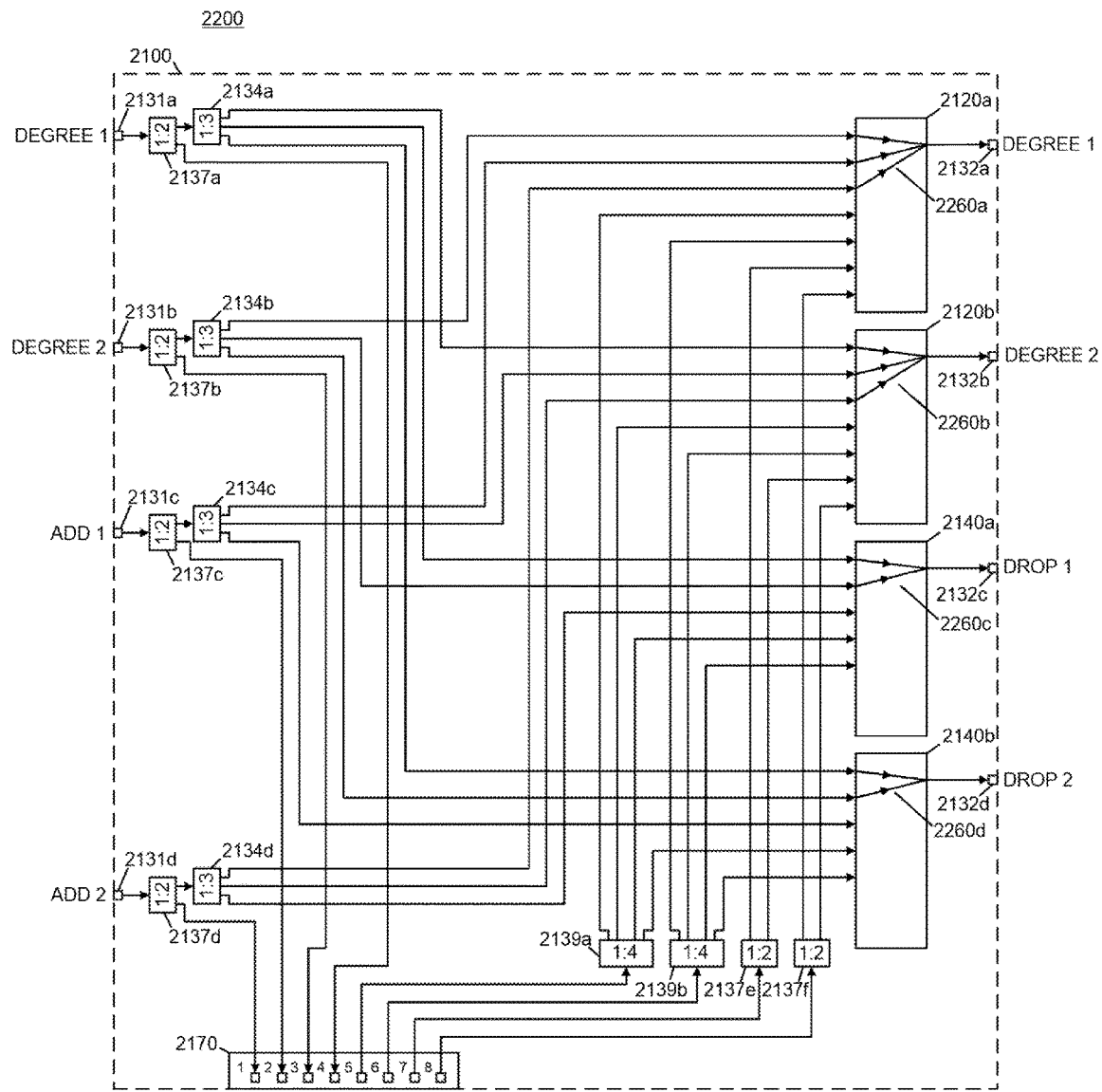
FIG. 22 illustrates the use of the FIG. 21 ROADM to construct a two-degree optical node with two directionless add/drop ports.

FIG. 22 illustrates the use of the FIG. 21 ROADM 2100 to construct a two-degree optical node with two directionless add/drop ports 2200. Within the WSS devices 2120a-b, 2140a-b, the solid lines connecting WSS inputs to a corresponding WSS output indicates which WSS inputs are used for the two-degree optical node with two directionless add/drop ports. As shown, only 10 of the 24 inputs are used, resulting in a very inefficient use of wavelength switching resources.

Figure 23:
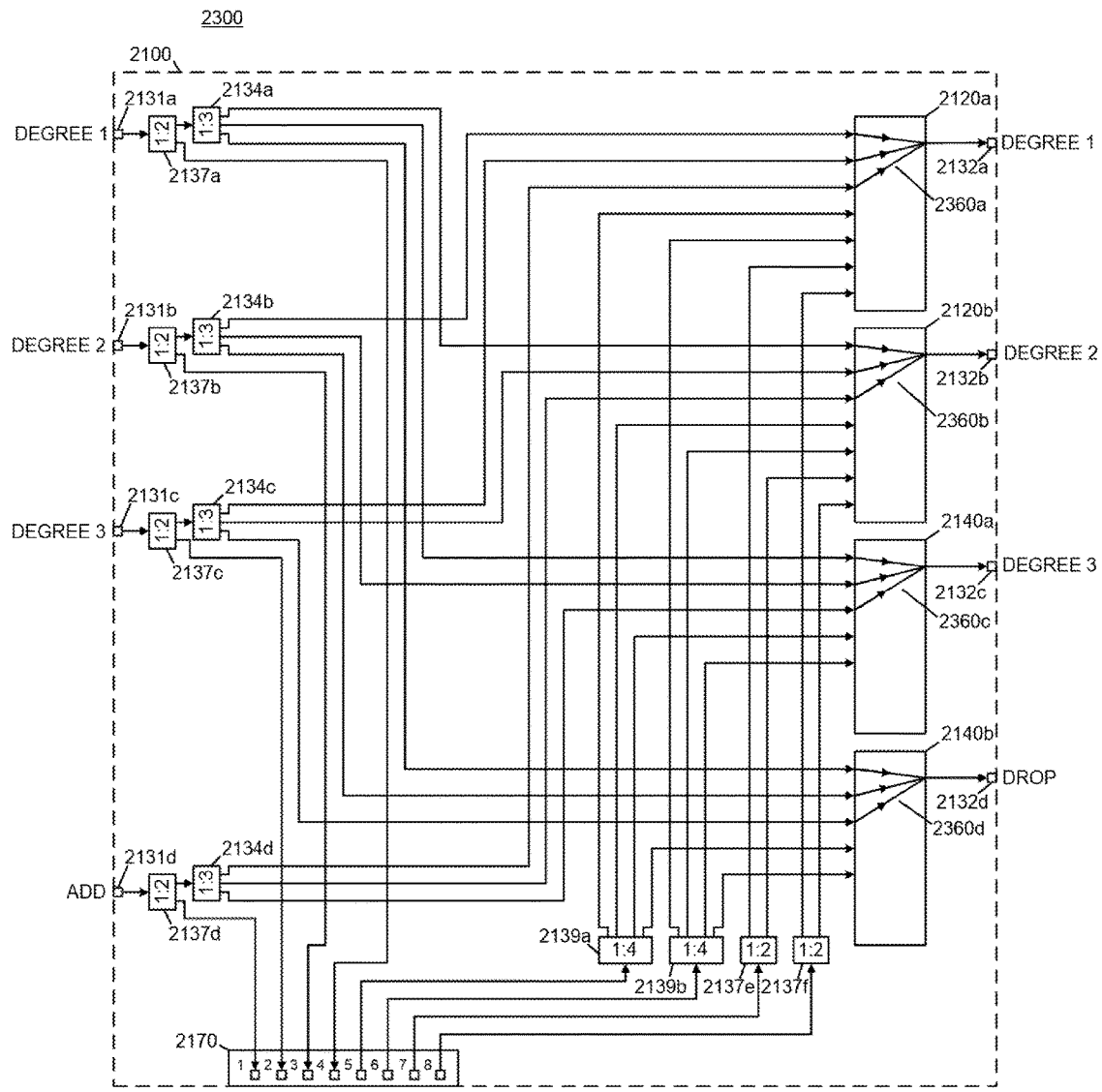
FIG. 23 illustrates the use of the FIG. 21 ROADM to construct a three-degree optical node with a single directionless add/drop port.

FIG. 23 illustrates the use of the FIG. 21 ROADM 2300 to construct a three-degree optical node with a single directionless add/drop port 2300. Within the WSS devices 2120a-b, 2140a-b, the solid lines connecting WSS inputs to a corresponding WSS output indicates which WSS inputs are used for the three-degree optical node with one directionless add/drop port. As shown, only 12 of the 24 inputs are used, resulting in a very inefficient use of wavelength switching resources.

Figure 24A:
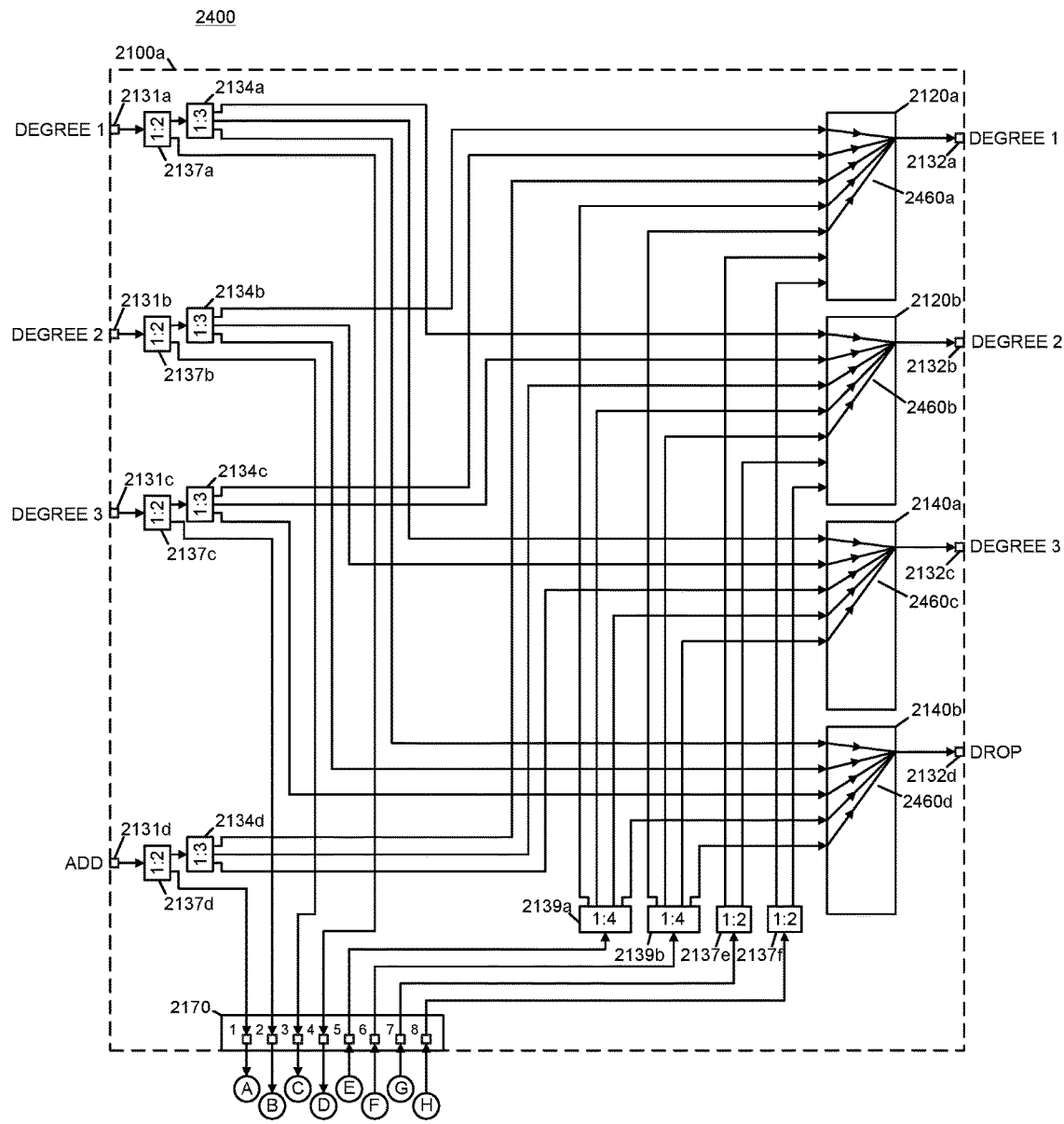
FIGS. 24A and 24B illustrate the use of two FIG. 21 ROADMs to construct a five-degree optical node with a single directionless add/drop port.
Figure 24B:
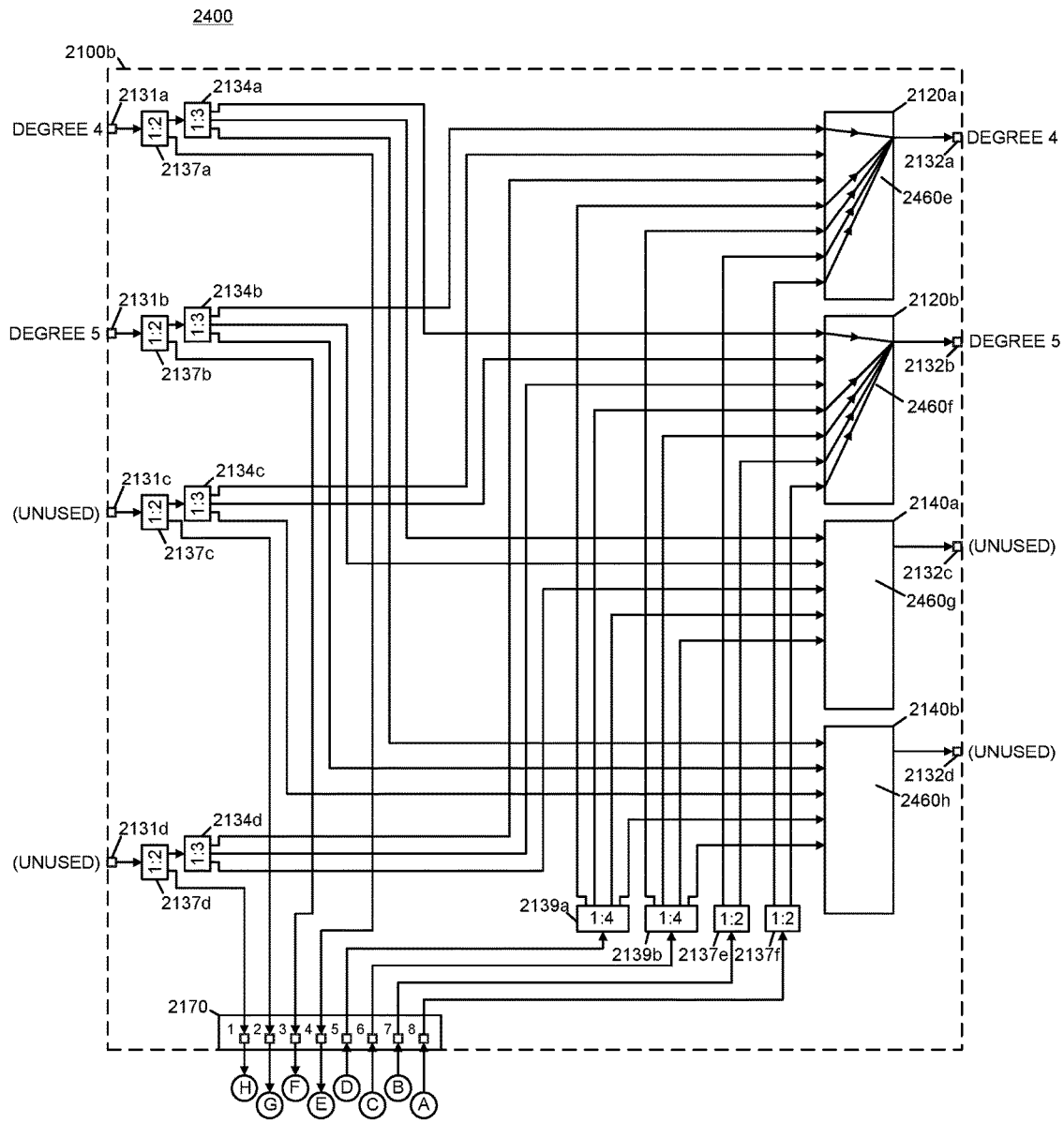

FIGS. 24A and 24B illustrate the use of two FIG. 21 ROADMs 2100a-b to construct a five-degree optical node with a single directionless add/drop port 2400. The two ROADMs are connected to together using the secondary optical inputs and outputs 2170, as indicated. The solid lines within the WSS devices indicate that 20 of 24 WSS inputs are used on 2100a, but only 10 of 24 WSS inputs are used on 2100b.

Figure 25A:
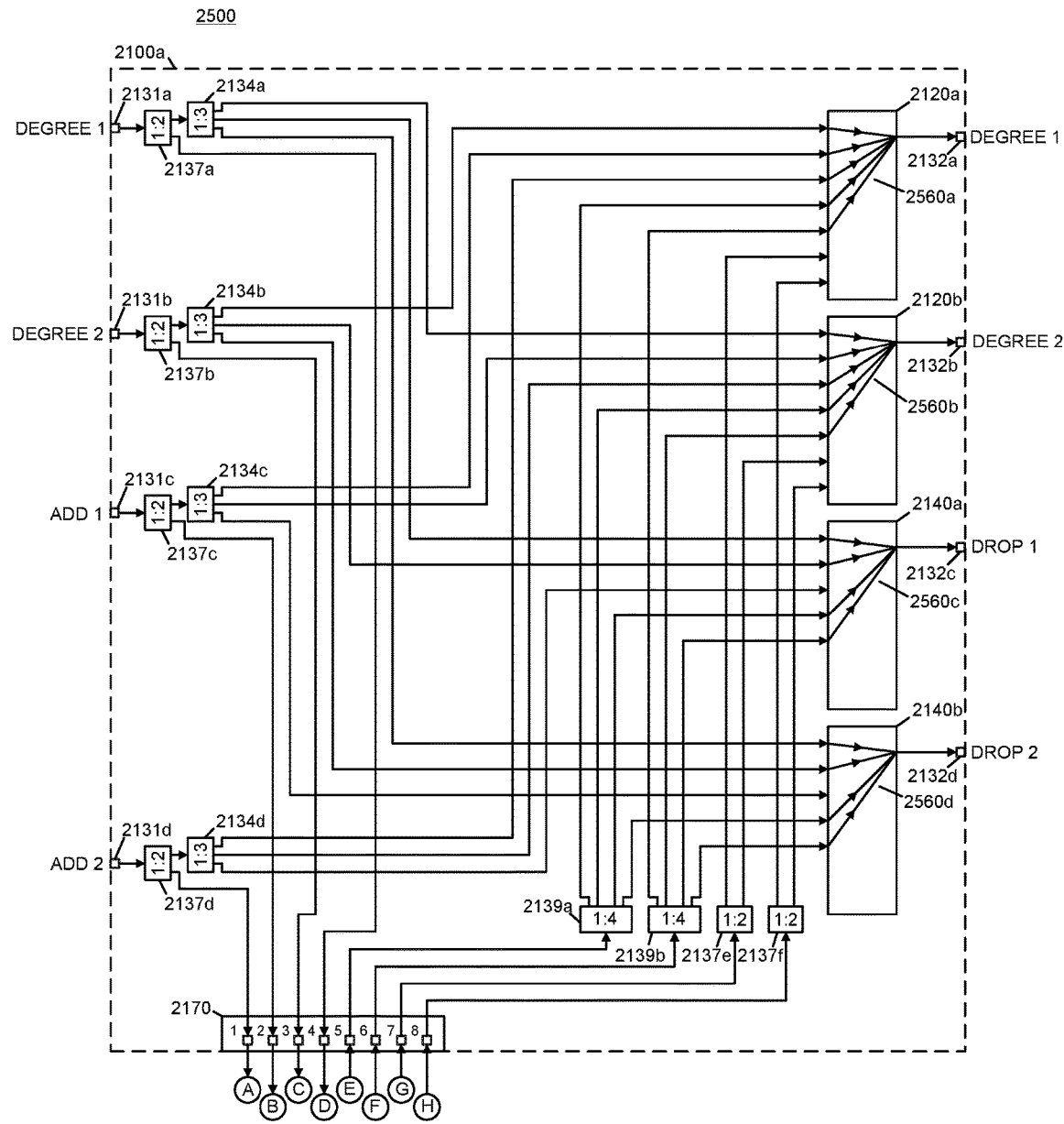
FIGS. 25A and 25B illustrate the use of two FIG. 21 ROADMs to construct a four-degree optical node with two directionless add/drop ports.
Figure 25B:
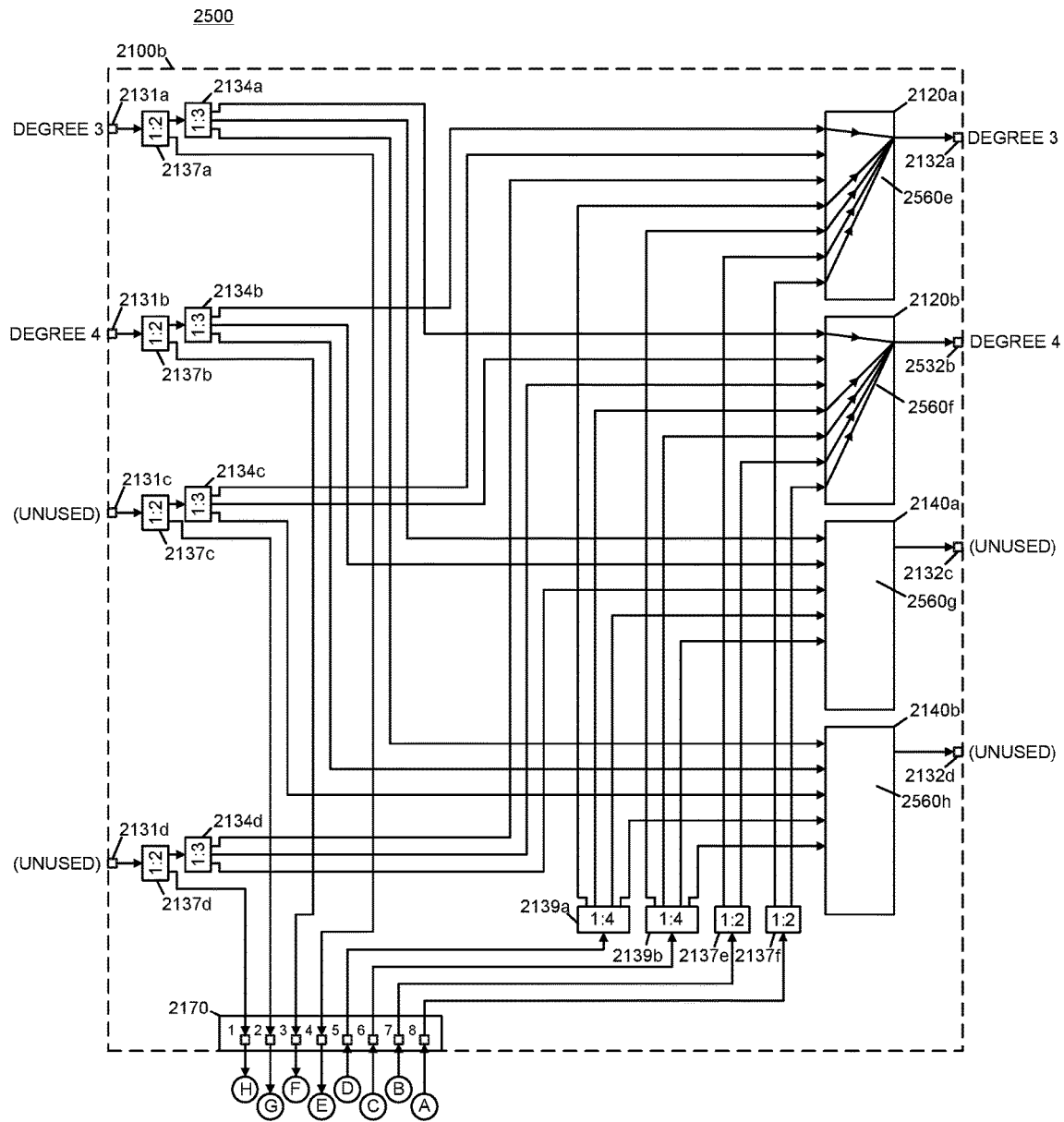

FIGS. 25A and 25B illustrate the use of two FIG. 21 ROADMs 2100a-b to construct a four-degree optical node with two directionless add/drop ports 2500. The solid lines within the WSS devices indicate that 18 of 24 WSS inputs are used on 2100a, but only 10 of 24 WSS inputs are used on 2100b.

Figure 26A:
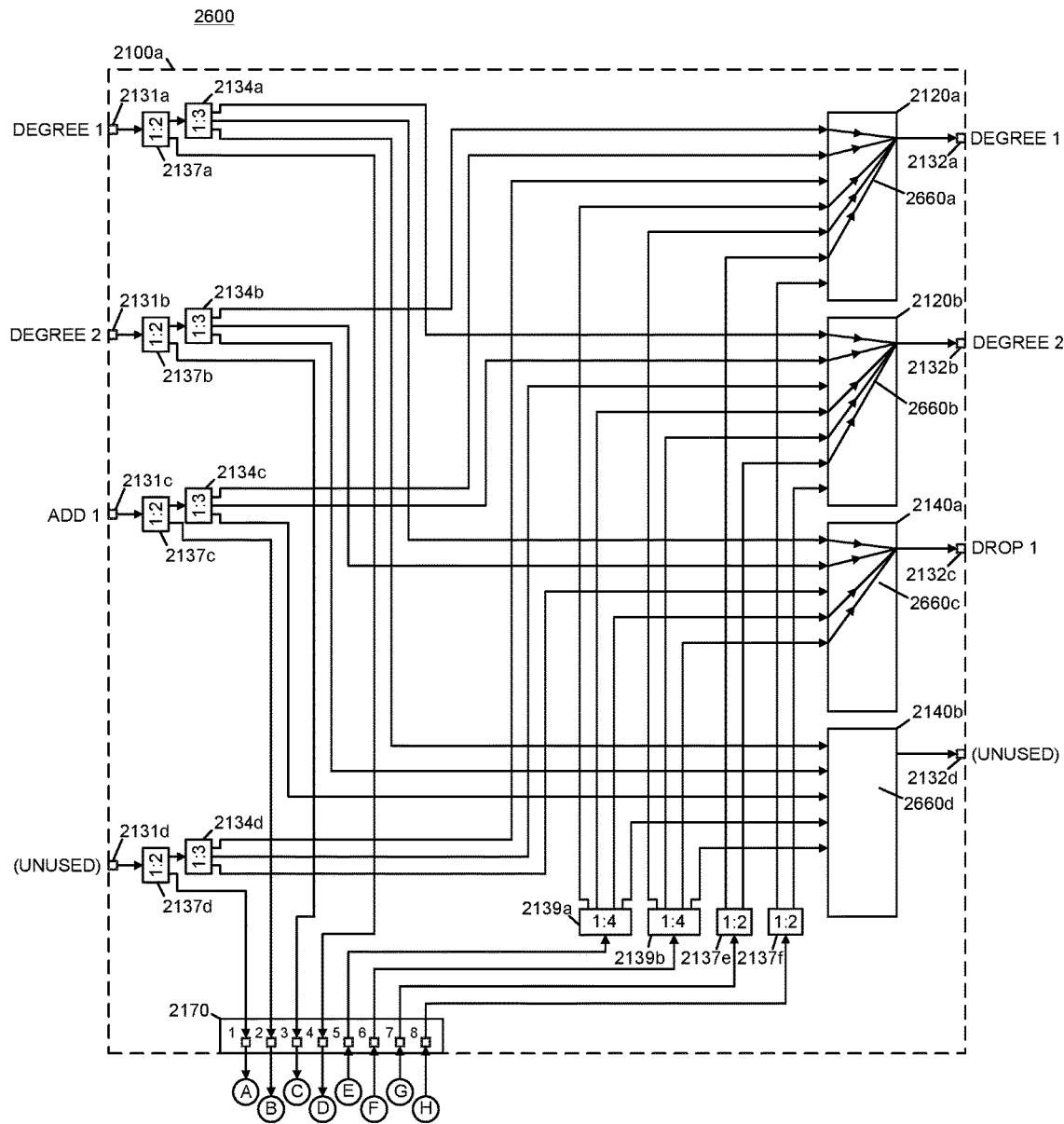
FIGS. 26A and 26B illustrate the use of two FIG. 21 ROADMs to construct another version of a four-degree optical node with two directionless add/drop ports.
Figure 26B:
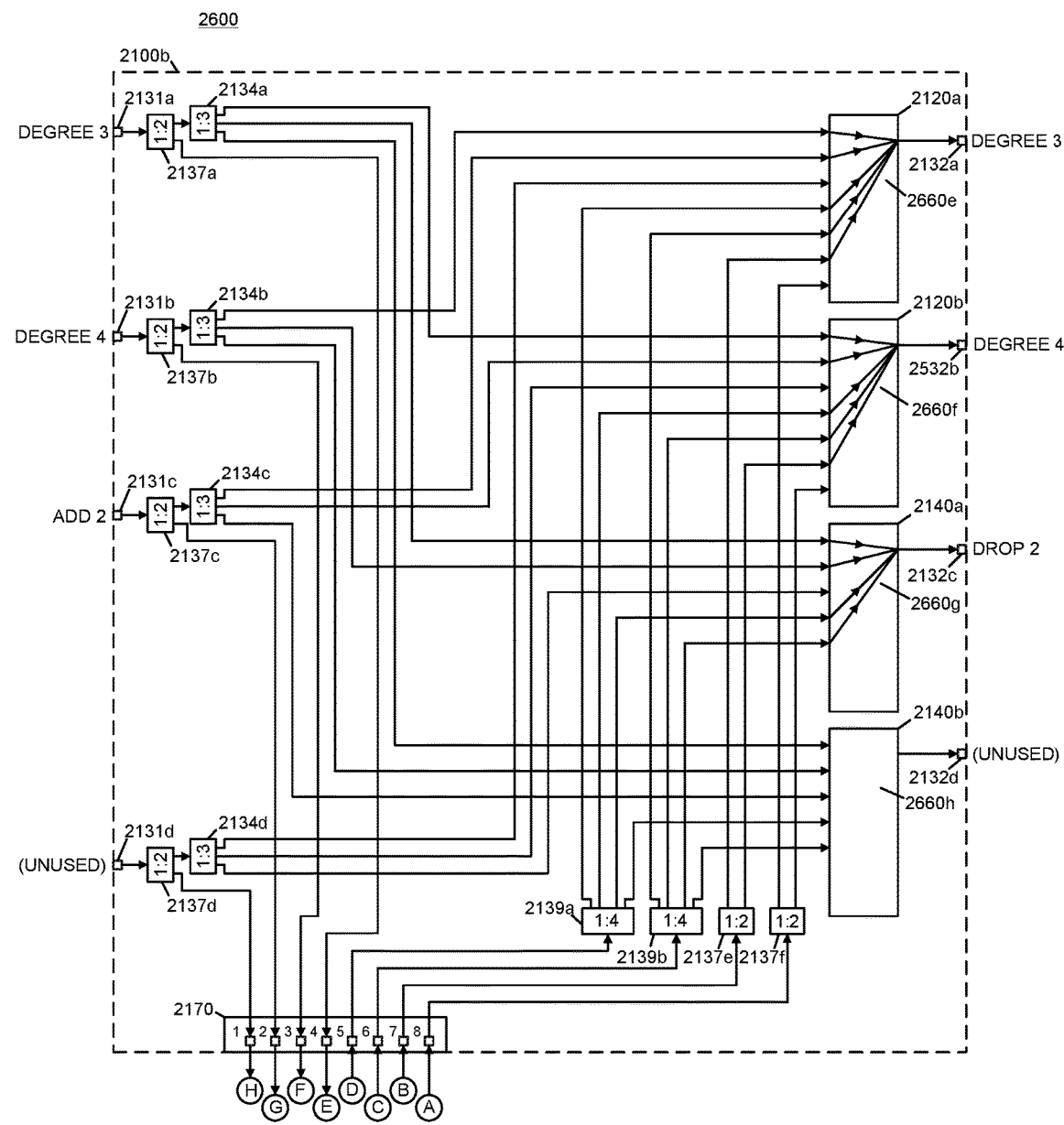

FIGS. 26A and 26B illustrate the use of two FIG. 21 ROADMs 2100a-b to construct another version of a four-degree optical node with two directionless add/drop ports 2600. The solid lines within the WSS devices indicate that only 14 of 24 WSS inputs are used on 2100a, and only 14 of 24 WSS inputs are used on 2100b.

Figure 27:
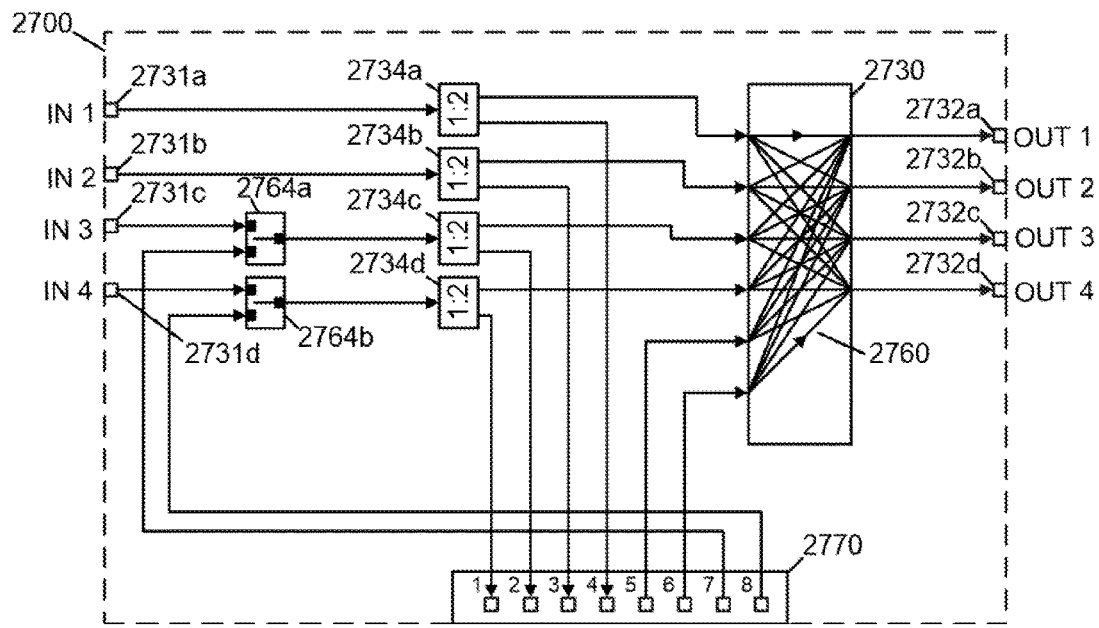
FIG. 27 is an illustration of a software programmable ROADM used to construct two, three, four, and five-degree optical nodes.

FIG. 27 is an illustration of another software programmable ROADM 2700 used to construct two, three, four, and five-degree optical nodes. To perform wavelength switching, ROADM 2700 uses a single N×M wavelength selective switch (WSS) 2730, where N=6, and M=4. The solid lines within the WSS 2730 indicate the available paths through the WSS. As shown, a path exists between each input and each output. The software programmable ROADM 2700 further comprises fixed ratio 1 to 2 optical couplers 2734a-d, waveguide switches 2764a-b, primary optical inputs and outputs 2731a-d & 2732a-d, and secondary optical inputs and outputs 2770.

Figure 28:
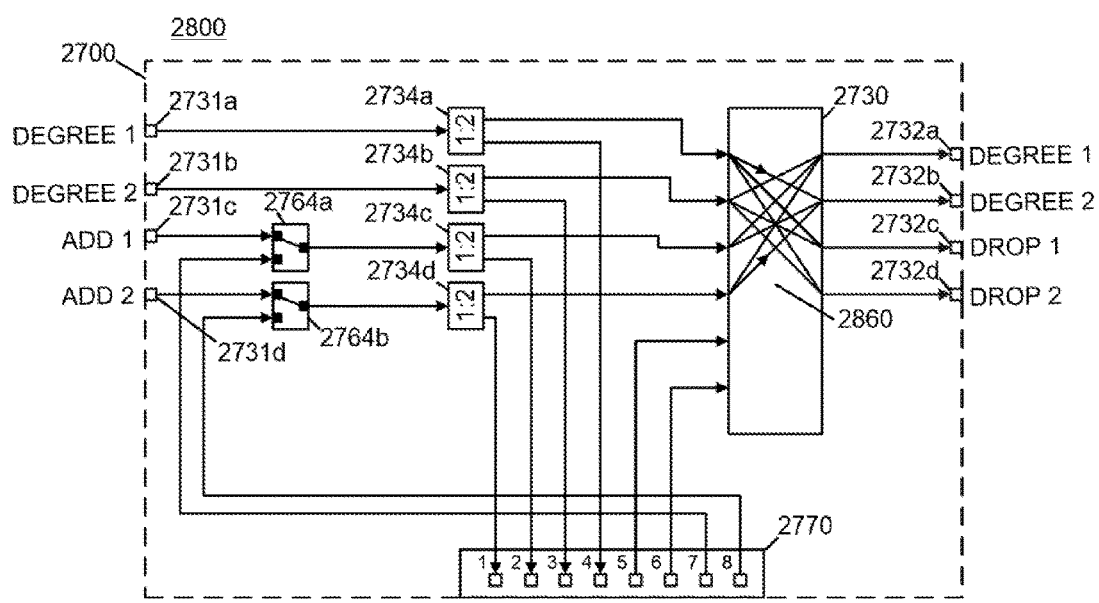
FIG. 28 illustrates the use of the FIG. 27 software programmable ROADM to construct a two-degree optical node with two directionless add/drop ports.

FIG. 28 illustrates the use of the FIG. 27 software programmable ROADM 2700 to construct a two-degree optical node with two directionless add/drop ports 2800. The solid lines through the WSS 2730 indicates the paths through the WSS used for this application. As shown, only 10 of the 24 paths are used. The waveguide switches 2764a-b are set to a first switch configuration (both in the "UP" position), connecting the two ADD ports 2731c-d to the WSS via the couplers.

Figure 29:
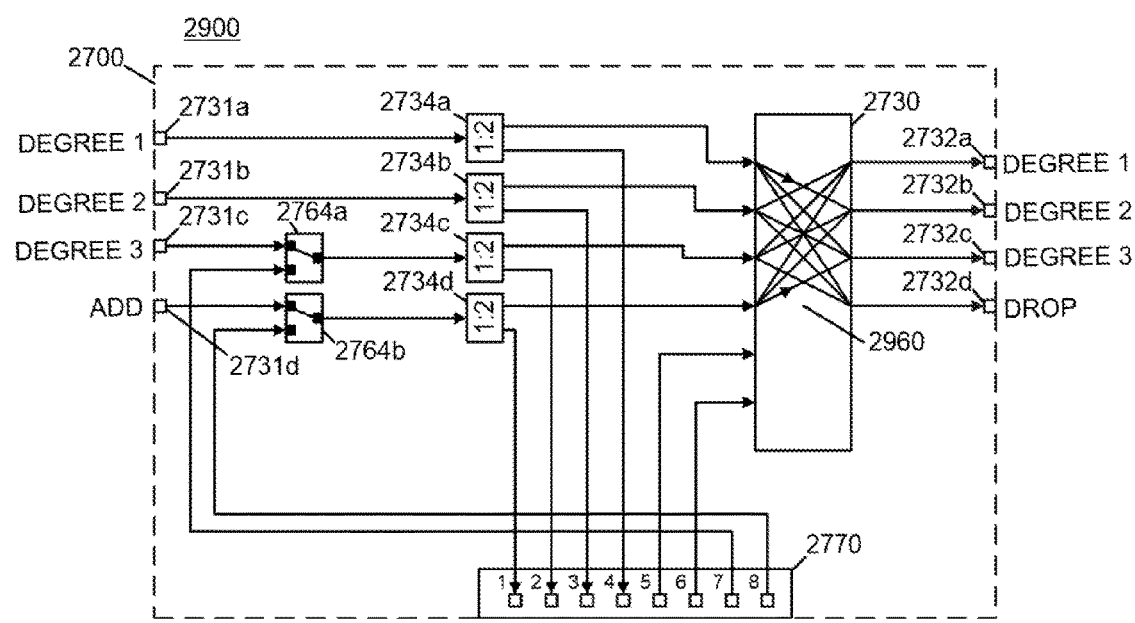
FIG. 29 illustrates the use of the FIG. 27 software programmable ROADM to construct a three-degree optical node with a single directionless add/drop port.

FIG. 29 illustrates the use of the FIG. 27 software programmable ROADM 2700 to construct a three-degree optical node with a single directionless add/drop port 2900. The solid lines through the WSS 2730 indicate that only 12 of 24 paths are used. The waveguide switches 2764a-b are set to the same switch configuration used for the 2800 optical node.

Figure 30:
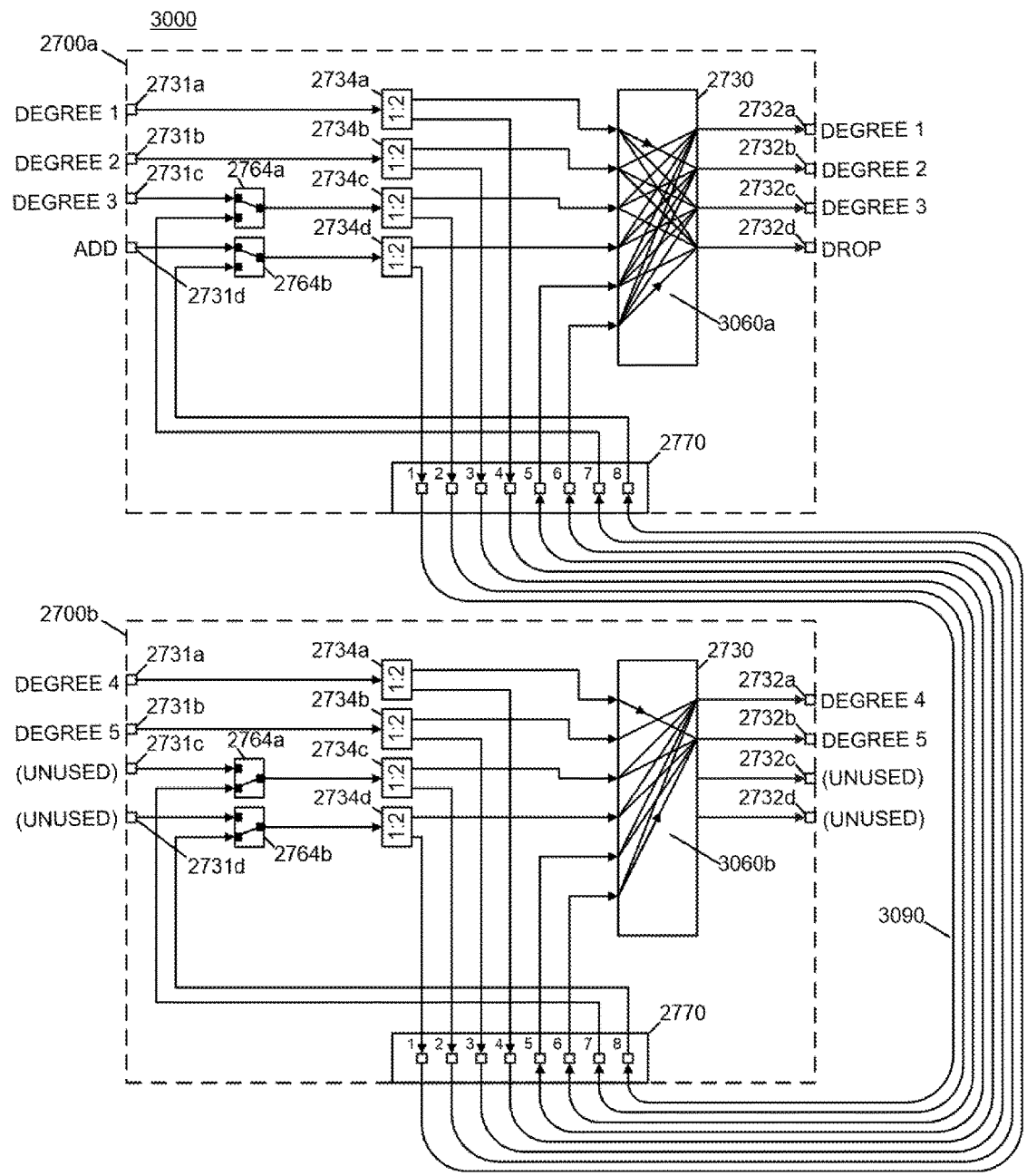
FIG. 30 illustrates the use of two FIG. 27 software programmable ROADMs to construct a five-degree optical node with a single directionless add/drop port.

FIG. 30 illustrates the use of two FIG. 27 software programmable ROADMs 2700a-b to construct a five-degree optical node with a single directionless add/drop port 3000. The two ROADMs 2700a-b are interconnected via their secondary optical ports 2770. The solid lines through the WSS devices 2730 indicate that 20 of 24 paths are used within the WSS of 2700a, and only 10 of 24 paths are used within the WSS of 2700b. For ROADM 2700a, waveguide switches 2764a-b are set to the same switch configuration used for the 2800 and 2900 optical nodes, while in ROADM 2700b, the waveguide switches 2764a-b are set to a second switch configuration (both in the "DOWN" position).

Figure 31:
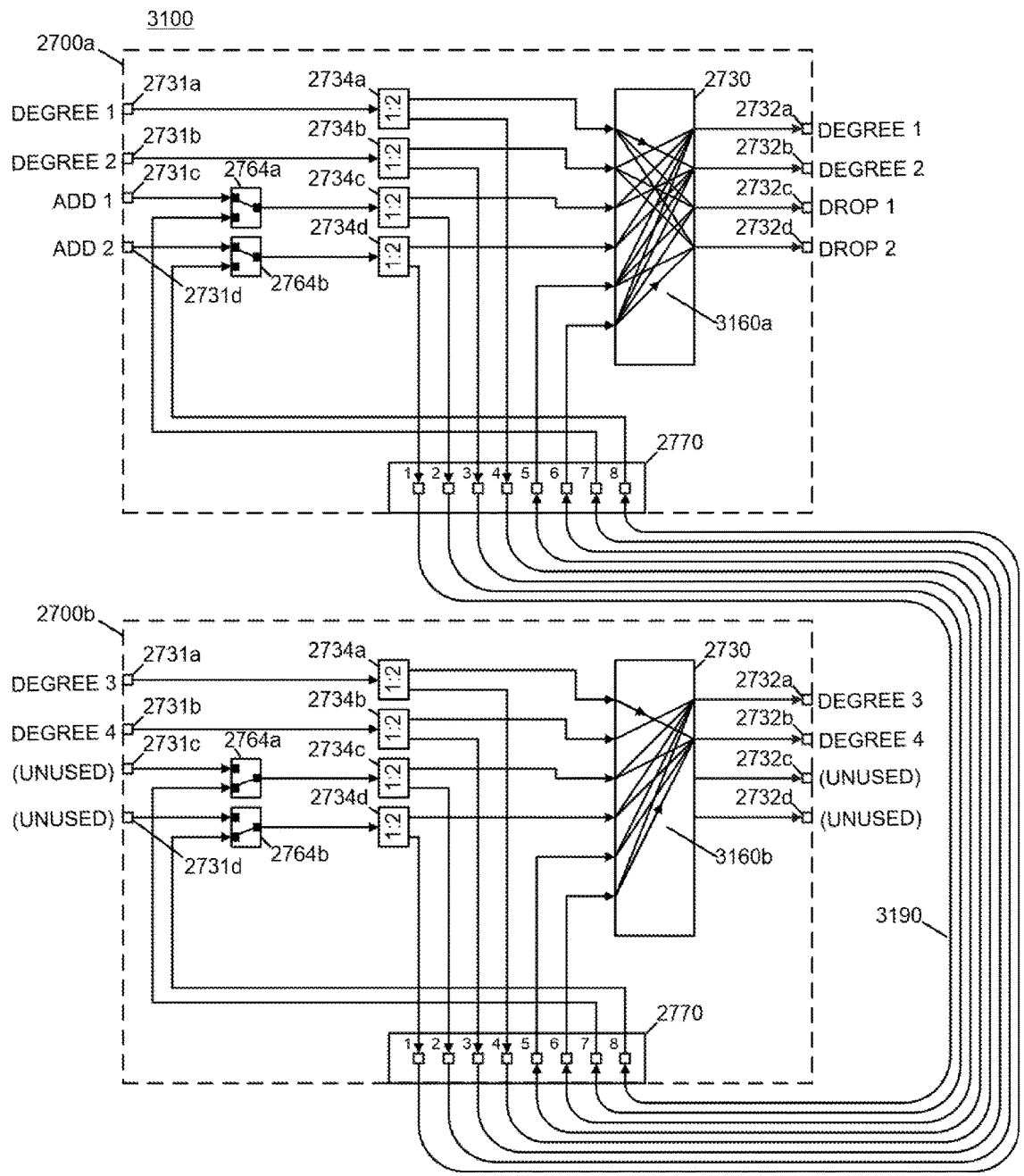
FIG. 31 illustrates the use of two FIG. 27 software programmable ROADMs to construct a four-degree optical node with two directionless add/drop ports.

FIG. 31 illustrates the use of two FIG. 27 software programmable ROADMs 2700a-b to construct a four-degree optical node with two directionless add/drop ports 3100. The solid lines through the WSS devices 2730 indicate that 18 of 24 paths are used within the WSS of 2700a, and only 10 of 24 paths are used within the WSS of 2700b. For ROADM 2700a, waveguide switches 2764a-b are set to the same switch configuration used for the 2800 and 2900 optical nodes, while in ROADM 2700b, the waveguide switches 2764a-b are set to the second switch configuration (both in the "DOWN" position), like in optical node 3000.

Figure 32:
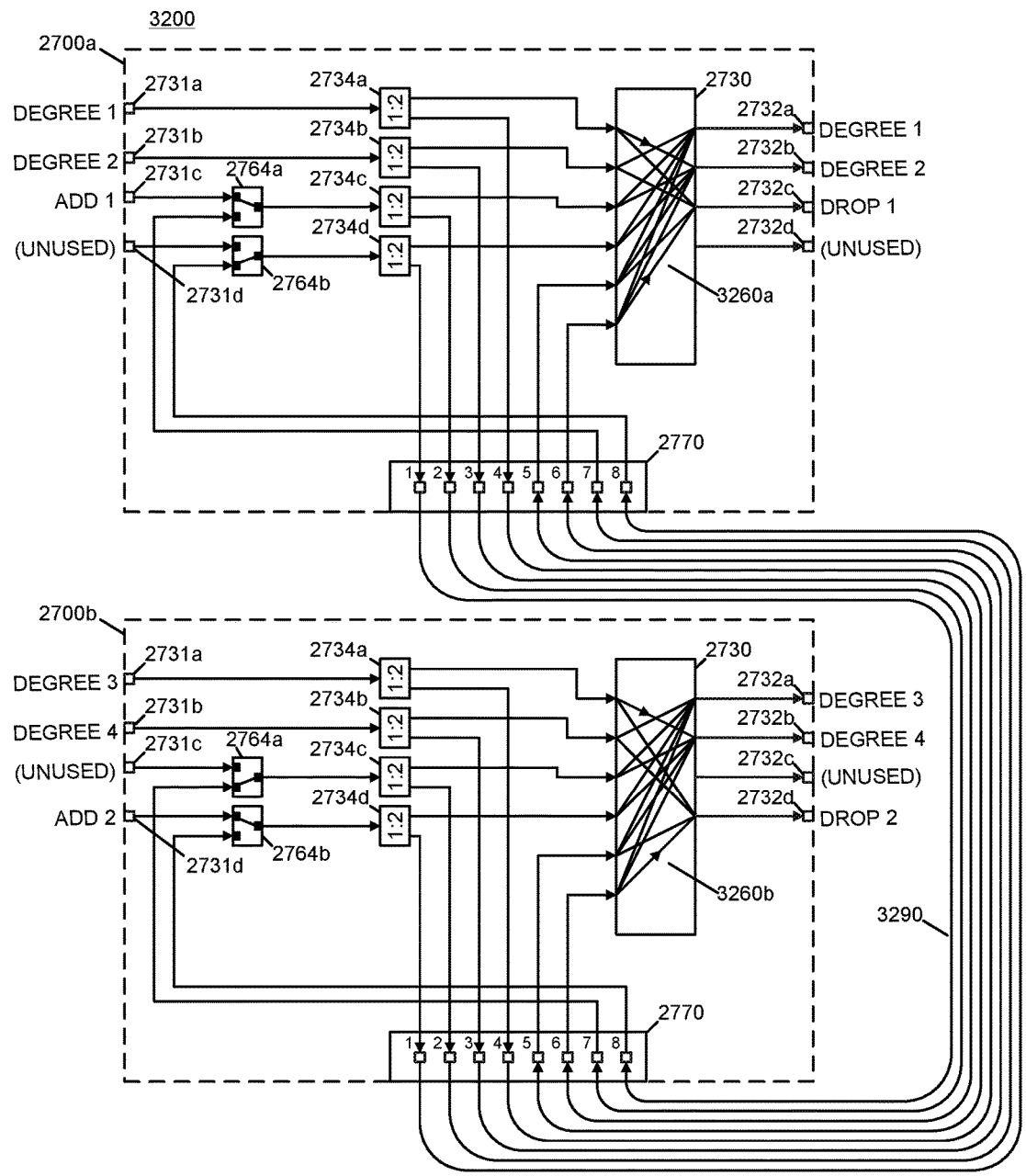
FIG. 32 illustrates the use of two FIG. 27 software programmable ROADMs to construct another version of a four-degree optical node with two directionless add/drop ports.

FIG. 32 illustrates the use of two FIG. 27 software programmable ROADMs 2700a-b to construct another version of a four-degree optical node with two directionless add/drop ports 3200. The solid lines through the WSS devices 2730 indicate that only 14 of 24 paths are used within each of the two WSSs. For ROADM 2700a, waveguide switches 2764a-b are set to third switch configuration (2764a in the "UP" position, and 2764b in the "DOWN" position), while for ROADM 2700b, waveguide switches 2764a-b are set to fourth switch configuration (2764a in the "DOWN" position, and 2764b in the "UP" position).

Figure 33:
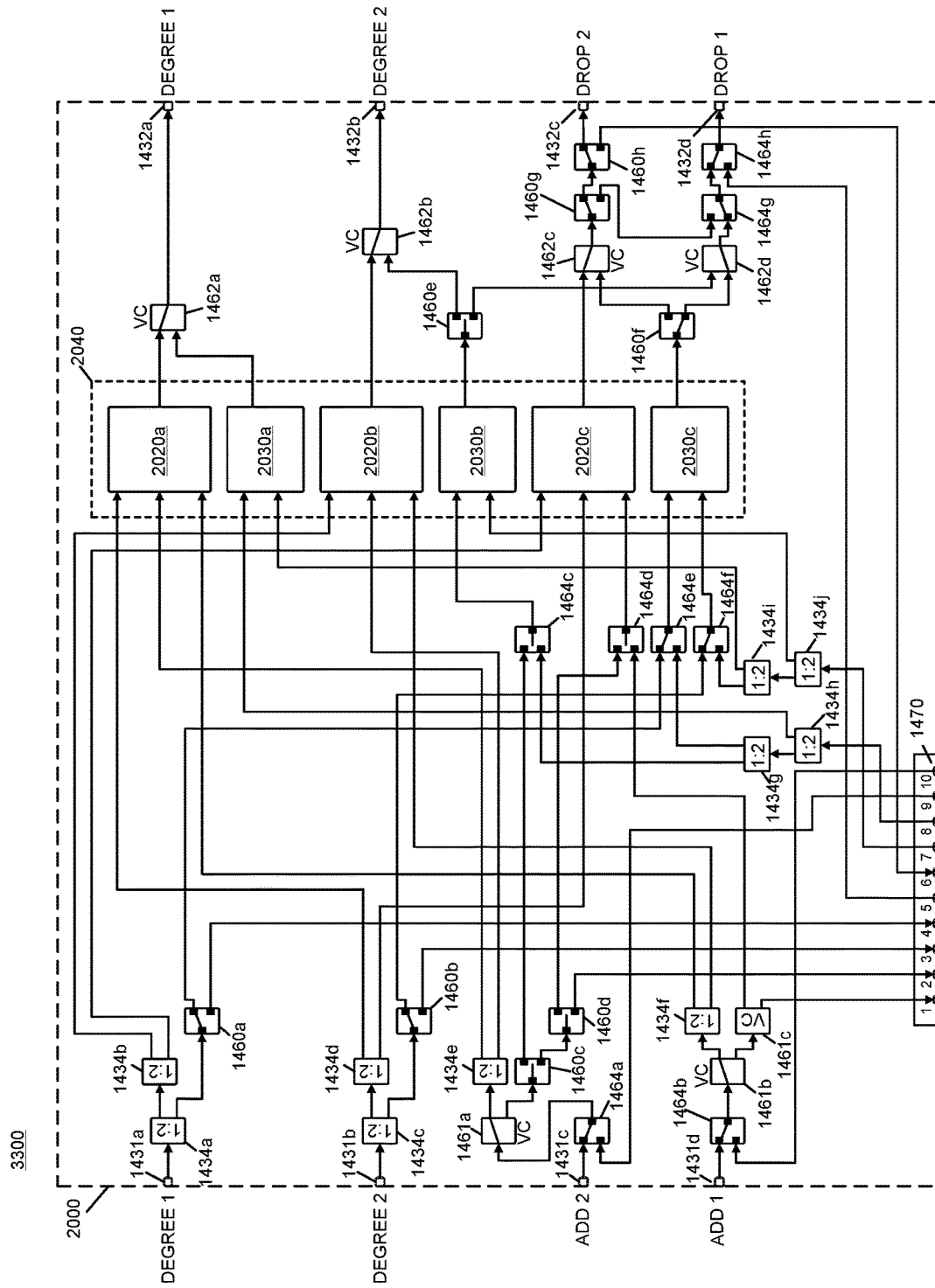
FIG. 33 illustrates the use of the FIG. 20 software programmable ROADM to construct a two-degree optical node with two directionless add/drop ports.

FIG. 33 illustrates the use of the FIG. 20 software programmable ROADM 2000 to construct a two-degree optical node with two directionless add/drop ports 3300, and is substantially similar to the optical node 1500.

Figure 34:
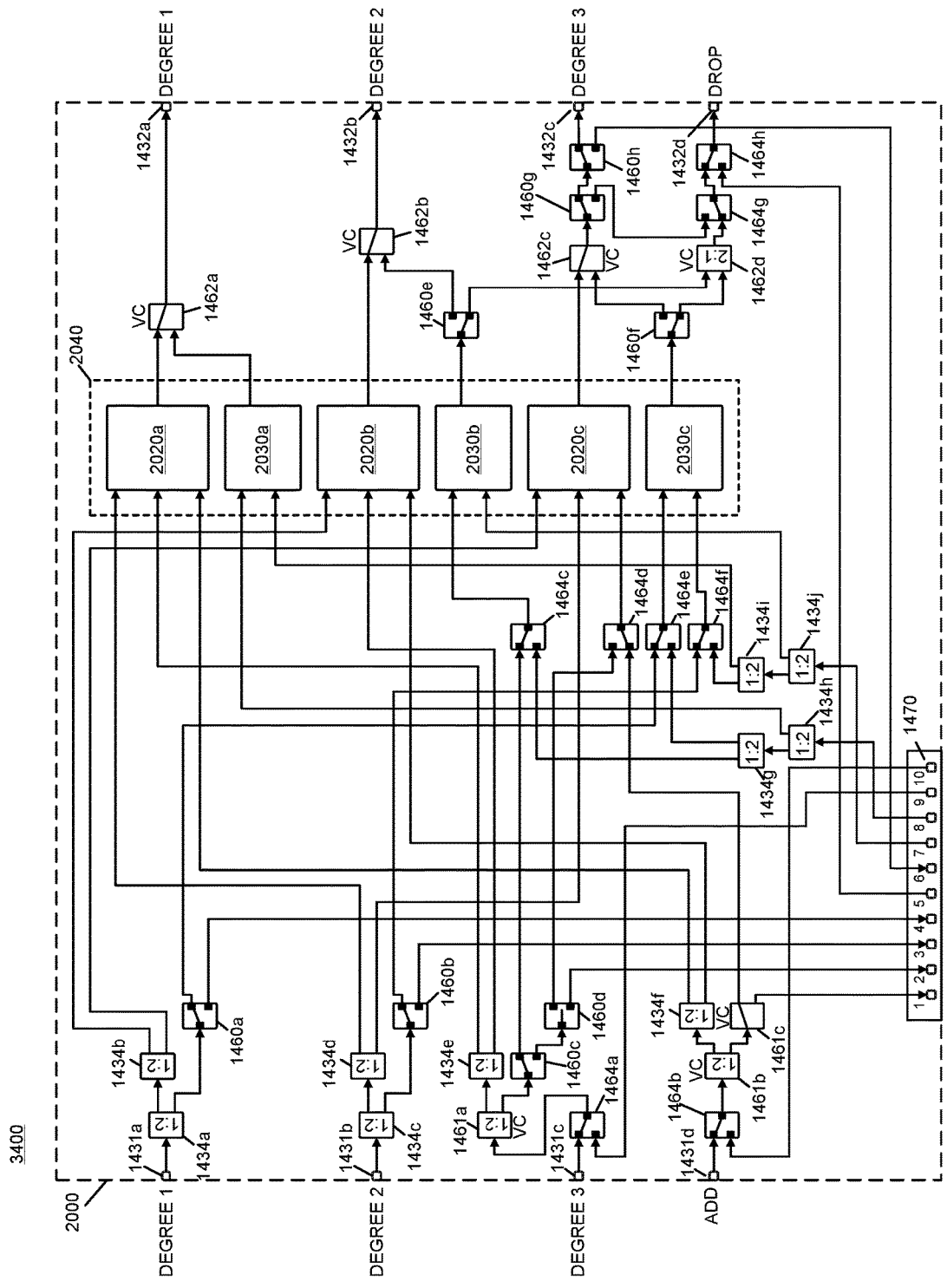
FIG. 34 illustrates the use of the FIG. 20 software programmable ROADM to construct a three-degree optical node with a single directionless add/drop port.

FIG. 34 illustrates the use of the FIG. 20 software programmable ROADM 2000 to construct a three-degree optical node with a single directionless add/drop port 3400, and is substantially similar to the optical node 1600.

Figure 35A:
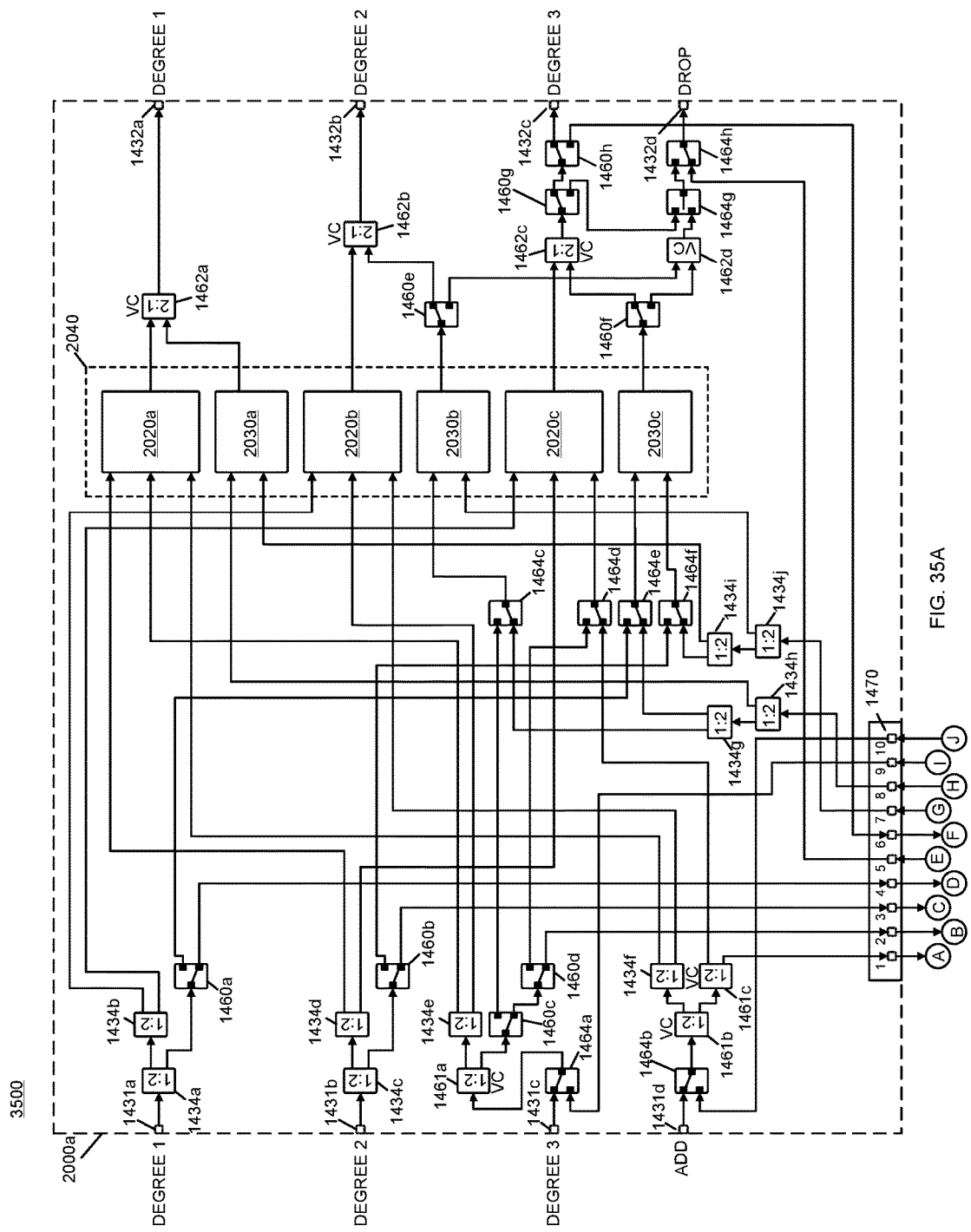
FIGS. 35A and 35B illustrate the use of two FIG. 20 software programmable ROADMs to construct a five-degree optical node with a single directionless add/drop port.
Figure 35B:
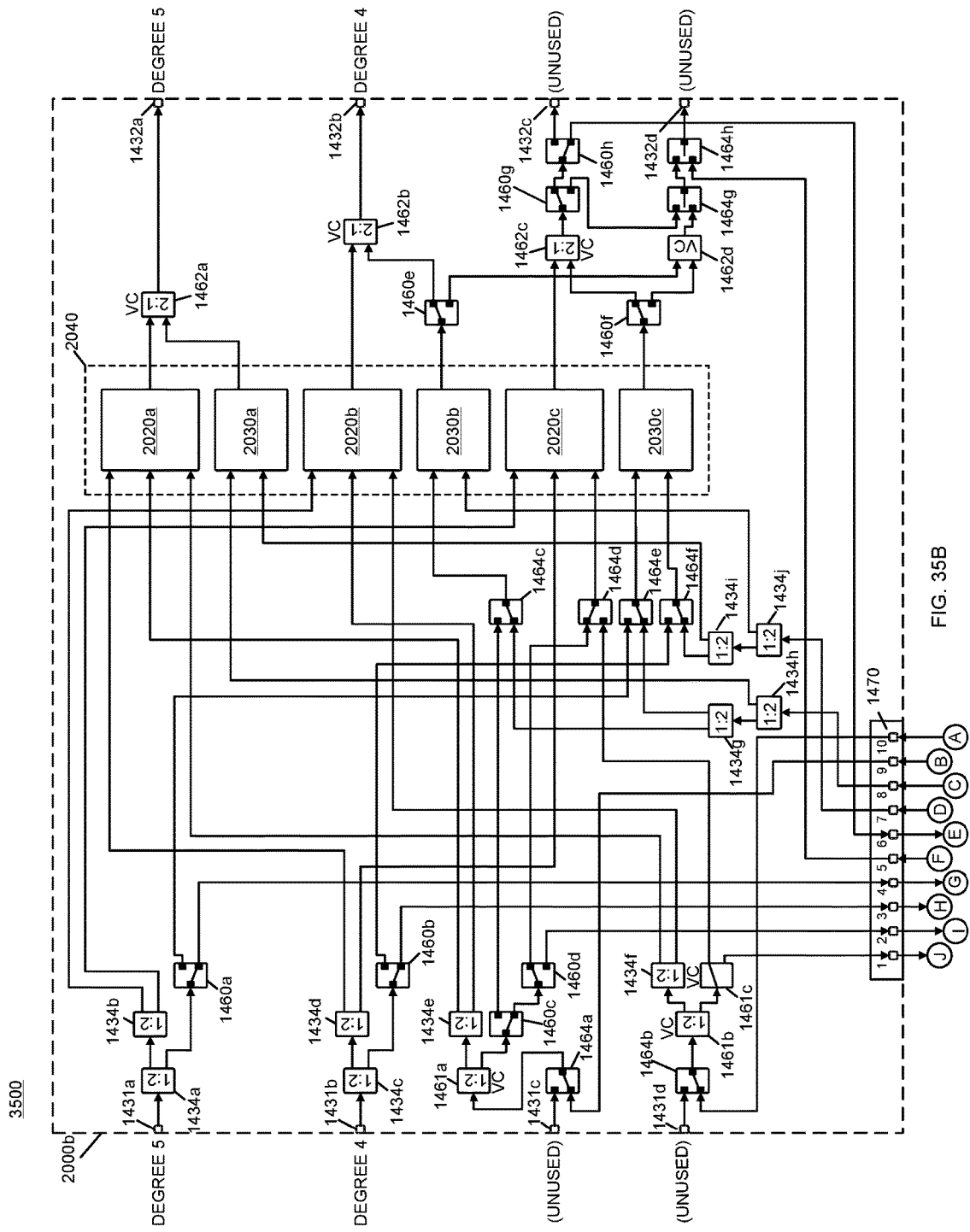

FIGS. 35A and 35B illustrate the use of two FIG. 20 software programmable ROADMs 2000a-b to construct a five-degree optical node with a single directionless add/drop port 3500, and is substantially similar to the optical node 1700.

Figure 36A:
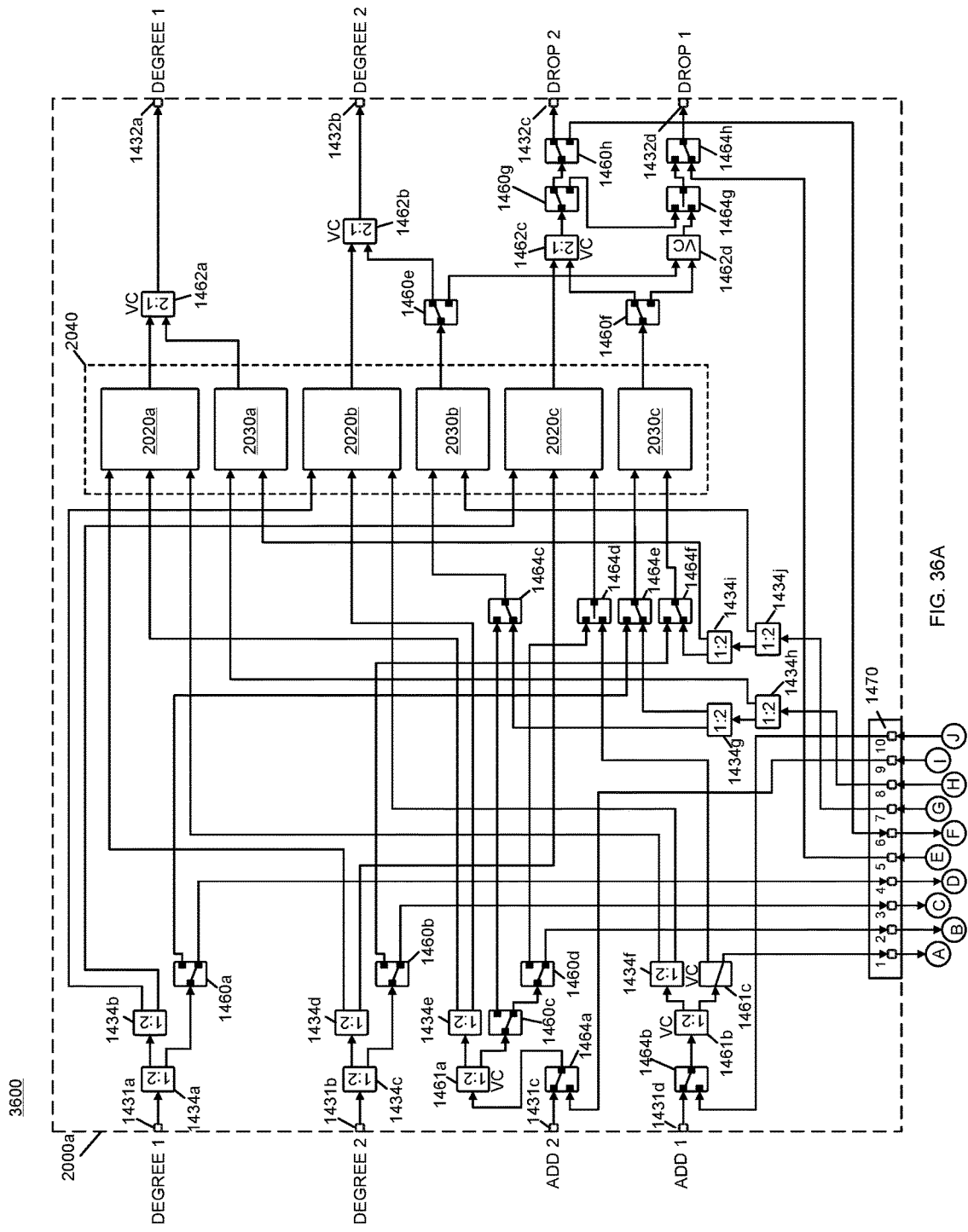
FIGS. 36A and 36B illustrate the use of two FIG. 20 software programmable ROADMs to construct a four-degree optical node with two directionless add/drop ports.
Figure 36B:
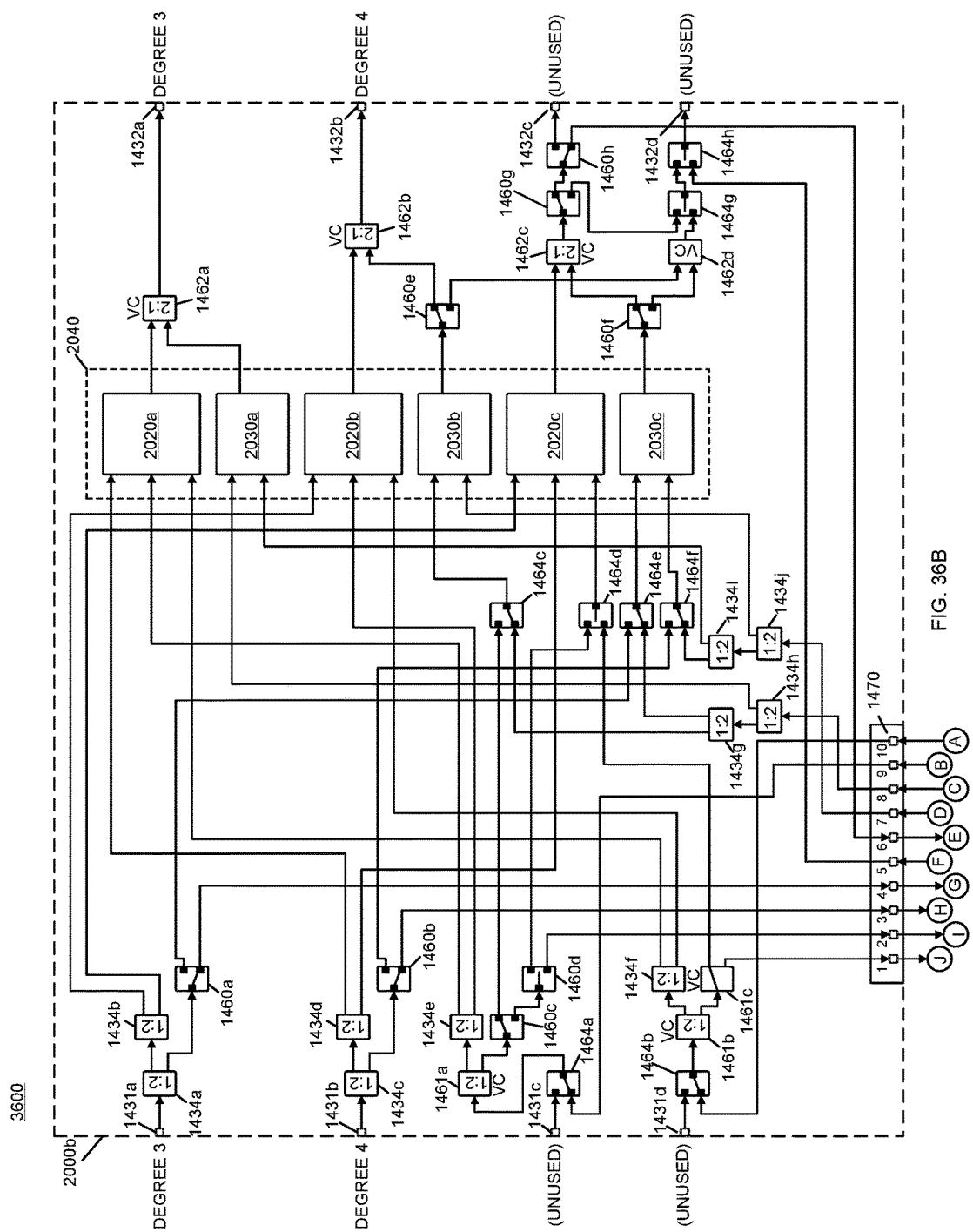

FIGS. 36A and 36B illustrate the use of two FIG. 20 software programmable ROADMs 2000a-b to construct a four-degree optical node with two directionless add/drop ports 3600, and is substantially similar to the optical node 1800.

Figure 37A:
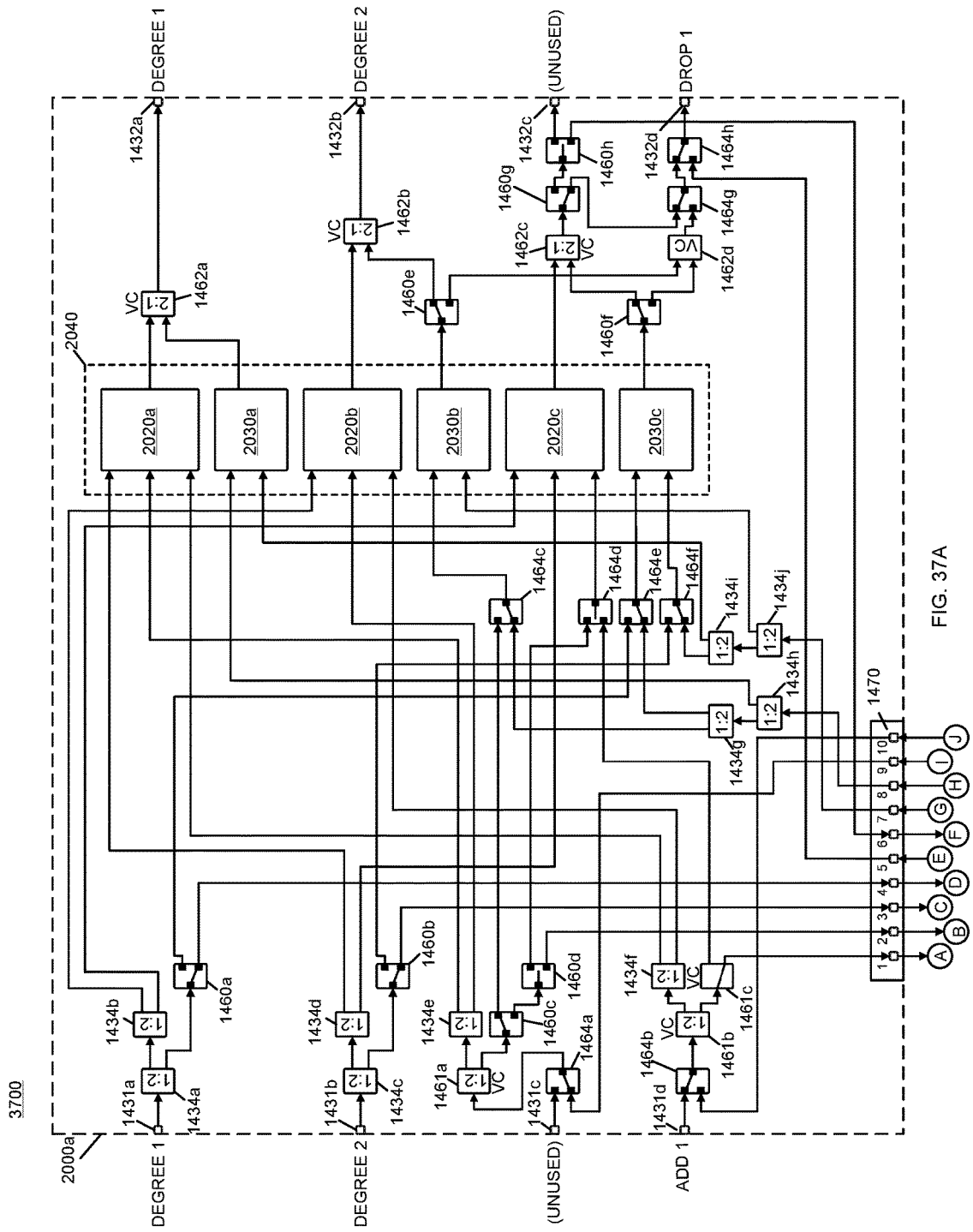
FIGS. 37A and 37B illustrate the use of two FIG. 20 software programmable ROADMs to construct another version of a four-degree optical node with two directionless add/drop ports.
Figure 37B:
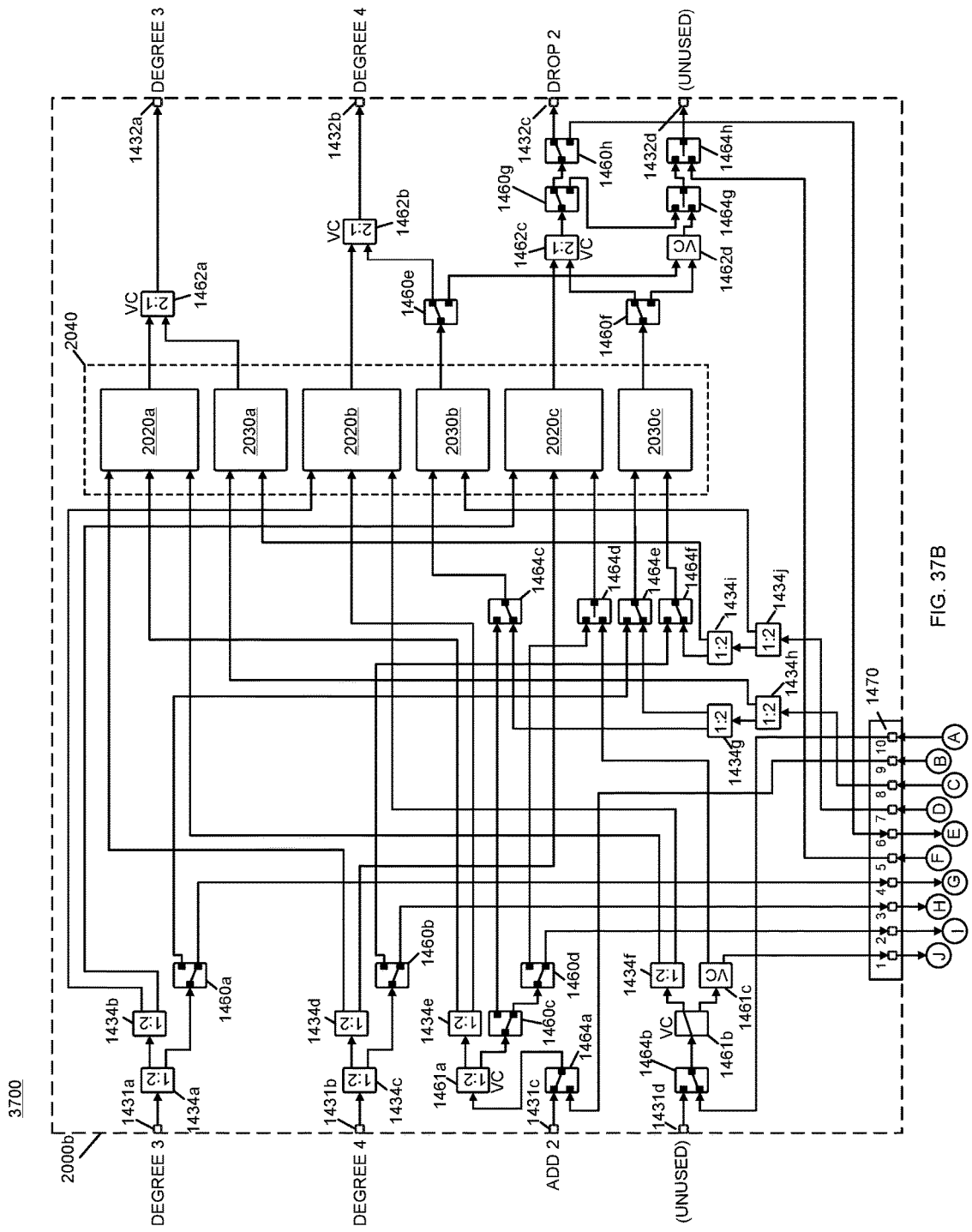

FIGS. 37A and 37B illustrate the use of two FIG. 20 software programmable ROADMs 2000a-b to construct another version of a four-degree optical node with two directionless add/drop ports 3700, and is substantially similar to the optical node 1900.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:

1. A software programmable reconfigurable optical add drop multiplexer (ROADM) comprising:
a first wavelength switch having a first optical input and a first optical output, wherein the first wavelength switch is operable to pass and block individual wavelengths from the first optical input to the first optical output;
a second wavelength switch having a second optical input and a second optical output, wherein the second wavelength switch is operable to pass and block individual wavelengths from the second optical input to the second optical output,
wherein the first wavelength switch has only one optical input and only one optical output, and wherein the second wavelength switch has only one optical input and only one optical output; and
a variable optical coupler having a first coupling ratio and a second coupling ratio, wherein the variable optical coupler comprises: a first variable optical coupler input used to receive light from the first wavelength switch, a second variable optical coupler input used to receive light from the second wavelength switch, and a variable optical coupler output,
wherein when using the first coupling ratio, the variable optical coupler passes light from the first wavelength switch to the variable optical coupler output and blocks light from the second wavelength switch to the variable optical coupler output, and wherein when using the second coupling ratio, the variable optical coupler passes a portion of the light from the first wavelength switch to the variable optical coupler output and passes a portion of light from the second wavelength switch to the variable optical coupler output.

2. The software programmable ROADM of claim 1, further comprising a ROADM optical output, wherein the variable optical coupler output is used to forward wavelengths to the ROADM optical output.

3. The software programmable ROADM of claim 1, further comprising a waveguide switch that is programmable to perform a first function and a second function and resides between the second wavelength switch and the variable optical coupler, wherein when the waveguide switch is programmed to perform the second function, wavelengths are forwarded from the second wavelength switch to the variable optical coupler, and wherein when the waveguide switch is programmed to perform the first function, wavelengths are forwarded from the second wavelength switch away from the variable optical coupler.

4. The software programmable ROADM of claim 3, wherein the waveguide switch comprises: a waveguide switch input, a first waveguide switch output, and a second waveguide switch output, wherein the waveguide switch is operable to direct an inputted wavelength division multiplexed signal from the waveguide switch input to the first waveguide switch output when programmed for the first function and operable to direct the inputted wavelength division multiplexed signal from the waveguide switch input to the second waveguide switch output when programmed for the second function.

5. The software programmable ROADM of claim 3, wherein when the waveguide switch is programmed to perform the second function, the variable optical coupler uses the second coupling ratio, and wherein when the waveguide switch is programmed to perform the first function, the variable optical coupler uses the first coupling ratio.

6. The software programmable ROADM of claim 3, further comprising:
a third wavelength switch having a third optical input and a third optical output, wherein the third wavelength switch is operable to pass and block individual wavelengths from the third optical input to the third optical output; and
a second optical coupler,
wherein when the waveguide switch is programmed to perform the second function, wavelengths from the second wavelength switch are combined with wavelengths from the first wavelength switch using the variable optical coupler, and wherein when the waveguide switch is programmed to perform the first function, wavelengths from the second wavelength switch are combined with wavelengths from the third wavelength switch using the second optical coupler.

7. The software programmable ROADM of claim 3, further comprising:
a first ROADM optical output; and
a second ROADM optical output,
wherein when the waveguide switch is programmed to perform the second function, wavelengths are forwarded from the second wavelength switch to the first ROADM optical output, and wherein when the waveguide switch is programmed to perform the first function, wavelengths are forwarded from the second wavelength switch to the second ROADM optical output.

8. The software programmable ROADM of claim 7, wherein the variable optical coupler output is used to forward wavelengths from the first wavelength switch to the first ROADM optical output.

9. A software programmable reconfigurable optical add drop multiplexer (ROADM) comprising:
a first wavelength switch having a first optical input and a first optical output, wherein the first wavelength switch is operable to pass and block individual wavelengths from the first optical input to the first optical output;
a second wavelength switch having a second optical input and a second optical output, wherein the second wavelength switch is operable to pass and block individual wavelengths from the second optical input to the second optical output;
an optical coupler comprising: a first optical coupler input used to receive light from the first wavelength switch, a second optical coupler input used to receive light from the second wavelength switch, and an optical coupler output;
a waveguide switch that is programmable to perform a first function and a second function and resides between the second wavelength switch and the optical coupler, wherein when the waveguide switch is programmed to perform the second function, wavelengths are forwarded from the second wavelength switch to the optical coupler, and wherein when the waveguide switch is programmed to perform the first function, wavelengths are forwarded from the second wavelength switch away from the optical coupler;
a third wavelength switch having a third optical input and a third optical output, wherein the third wavelength switch is operable to pass and block individual wavelengths from the third optical input to the third optical output; and
a second optical coupler used to receive light from the second wavelength switch and the third wavelength switch, wherein when the waveguide switch is programmed to perform the first function, the second optical coupler combines wavelengths from the second wavelength switch and the third wavelength switch, and the optical coupler does not combine wavelengths from the second wavelength switch and the first wavelength switch, and wherein when the waveguide switch is programmed to perform the second function, the optical coupler combines wavelengths from the second wavelength switch and the first wavelength switch, and the second optical coupler does not combine wavelengths from the second wavelength switch and the third wavelength switch.

10. The software programmable ROADM of claim 9, wherein the first wavelength switch has only one optical input and only one optical output, and wherein the second wavelength switch has only one optical input and only one optical output.

11. The software programmable ROADM of claim 9, wherein the waveguide switch comprises: a waveguide switch input, a first waveguide switch output, and a second waveguide switch output, wherein the waveguide switch is operable to direct an inputted wavelength division multiplexed signal from the waveguide switch input to the first waveguide switch output when programmed for the first function and operable to direct the inputted wavelength division multiplexed signal from the waveguide switch input to the second waveguide switch output when programmed for the second function.

12. The software programmable ROADM of claim 9, further comprising:
  a first ROADM optical output; and
  a second ROADM optical output,
  wherein when the waveguide switch is programmed to perform the second function, wavelengths are forwarded from the second wavelength switch to the first ROADM optical output, and wherein when the waveguide switch is programmed to perform the first function, wavelengths are forwarded from the second wavelength switch to the second ROADM optical output.

13. The software programmable ROADM of claim 9, further comprising a second waveguide switch that is programmable to perform a first switching function and a second switching function, wherein when the second waveguide switch is programmed to perform the first switching function, a first wavelength division multiplexed signal is forwarded to the second wavelength switch, and wherein when the second waveguide switch is programmed to perform the second switching function, a second wavelength division multiplexed signal is forwarded to the second wavelength switch.

14. A software programmable reconfigurable optical add drop multiplexer (ROADM) comprising:
  a first wavelength switch having a first optical input and a first optical output, wherein the first wavelength switch is used to pass and block individual wavelengths from the first optical input to the first optical output;
  a second wavelength switch having a second optical input and a second optical output, wherein the second wavelength switch is used to pass and block individual wavelengths from the second optical input to the second optical output,
  wherein the first wavelength switch has only one optical input and only one optical output, and wherein the second wavelength switch has only one optical input and only one optical output; and
  a variable optical coupler having a first coupling ratio and a second coupling ratio, wherein the variable optical coupler comprises: a first variable optical coupler input used to receive light from the first wavelength switch, a second variable optical coupler input used to receive light from the second wavelength switch, and a variable optical coupler output,
  wherein when using the first coupling ratio, wavelengths are forwarded from the first wavelength switch to the variable optical coupler output and wavelengths are blocked from the second wavelength switch to the variable optical coupler output, and wherein when using the second coupling ratio, wavelengths are forwarded from the first wavelength switch to the variable optical coupler output and wavelengths are forwarded from the second wavelength switch to the variable optical coupler output.

15. The software programmable ROADM of claim 14, further comprising a waveguide switch that is programmable to perform a first function and a second function and resides between the second wavelength switch and the variable optical coupler, wherein when the waveguide switch is programmed to perform the second function, wavelengths are forwarded from the second wavelength switch to the variable optical coupler, and wherein when the waveguide switch is programmed to perform the first function, wavelengths are forwarded from the second wavelength switch away from the variable optical coupler.

16. The software programmable ROADM of claim 15, wherein the waveguide switch comprises: a waveguide switch input, a first waveguide switch output, and a second waveguide switch output, wherein the waveguide switch is operable to direct an inputted wavelength division multiplexed signal from the waveguide switch input to the first waveguide switch output when programmed for the first function and operable to direct the inputted wavelength division multiplexed signal from the waveguide switch input to the second waveguide switch output when programmed for the second function.

17. The software programmable ROADM of claim 16, wherein the waveguide switch is not operable to simultaneously direct some of the wavelengths from the inputted wavelength division multiplexed signal to the first waveguide switch output and some of the wavelengths from the inputted wavelength division multiplexed signal to the second waveguide switch output.

18. The software programmable ROADM of claim 16, wherein when the waveguide switch is programmed to perform the second function, the variable optical coupler uses the second coupling ratio, and wherein when the waveguide switch is programmed to perform the first function, the variable optical coupler uses the first coupling ratio.

\* \* \* \* \*